United States Patent [19]

Poland

[11] 4,153,937
[45] May 8, 1979

[54] MICROPROCESSOR SYSTEM HAVING HIGH ORDER CAPABILITY

[75] Inventor: Sydney W. Poland, Arlington, Tex.

[73] Assignee: Texas Instruments Incorporated, Dallas, Tex.

[21] Appl. No.: 783,903

[22] Filed: Apr. 1, 1977

Related U.S. Application Data

[63] Continuation-in-part of Ser. No. 714,464, Aug. 16, 1976.

[51] Int. Cl.² .................. G06F 3/08; G06F 15/02
[52] U.S. Cl. ........................... 364/706; 364/200; 364/900
[58] Field of Search ............... 235/156; 364/200, 900, 364/706

[56] References Cited

U.S. PATENT DOCUMENTS

| | | | |
|---|---|---|---|
| 3,593,313 | 7/1971 | Tomaszewski et al. | 340/172.5 |
| 3,760,171 | 9/1973 | Wang et al. | 235/156 |
| 3,859,636 | 1/1975 | Cook | 340/172.5 |
| 3,942,156 | 3/1976 | Mock et al. | 340/172.5 |
| 3,953,833 | 4/1976 | Shapiro | 340/172.5 |
| 3,971,925 | 7/1976 | Wenninger et al. | 235/156 |

OTHER PUBLICATIONS

"National's Scientific Calculator HAS Long-Term All-Semiconductor Memory", *Electronics*, Jun. 10, 1976, pp. 29-30.

*Primary Examiner*—Jerry Smith
*Attorney, Agent, or Firm*—Stephen S. Sadacca; James T. Comfort

[57] ABSTRACT

A microprocessor system with high order capabilities is provided with the two non-volatile memories which are read-only-memories (ROMs) in the disclosed embodiment. A first ROM stores the microcode for controlling the operation of the microprocessor circuits. The second ROM, which is preferably disposed in a module or cartridge, stores a plurality of program codes which are used to address the first ROM. The second ROM's module may be inserted into a receptacle for interconnecting it with the remainder of the microprocessor system. Preferably, a plurality of such second ROMs are available for selectively plugging into the microprocessor system.

Further, a particular embodiment of the microprocessor system with high order capabilities for use as an electronic calculator with high order capabilities is disclosed in great detail.

27 Claims, 20 Drawing Figures

| I12 | I11 | I10 | I9 | I8 | I7 | I6 | I5 | I4 | I3 | I2 | I1 | |
|---|---|---|---|---|---|---|---|---|---|---|---|---|
| 0 | 1 | 0 | 1 | 0 | 0 | 0 | 0 | 1 | 1 | 0 | 0 | LOAD LSD OF KEYBOARD REG WITH R5 (R5 KR) |
| 0 | 1 | 0 | 1 | 0 | 0 | 0 | 0 | 0 | 1 | 0 | 0 | LOAD R5 WITH LSD OF KEYBOARD REG (KR R5) |
| 0 | 1 | 0 | 1 | 0 | 0 | 0 | 0 | 0 | 1 | 1 | 0 | LOAD KEYBOARD REG WITH EXT (EXT KR) |
| 0 | 0 | 0 | 0 | 0 | 0 | 0 | 0 | 1 | 0 | 1 | 1 | PREG |
| 0 | 1 | 0 | 1 | 0 | 0 | 0 | 0 | 0 | 1 | 1 | 0 | FETCH |
| 0 | 1 | 0 | 1 | 0 | 0 | 0 | 1 | 1 | 1 | 1 | 0 | FETCH HIGH |
| 0 | 1 | 0 | 1 | 0 | 0 | 0 | 0 | 1 | 1 | 1 | 0 | LOAD PC |
| 0 | 1 | 0 | 1 | 0 | 0 | 0 | 1 | 0 | 1 | 1 | 0 | UNLOAD PC |

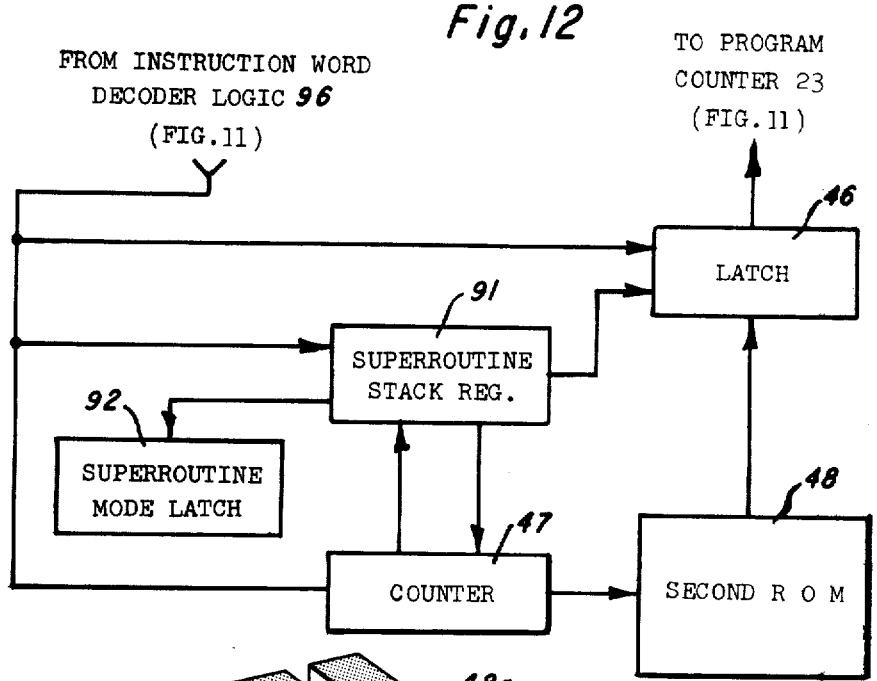
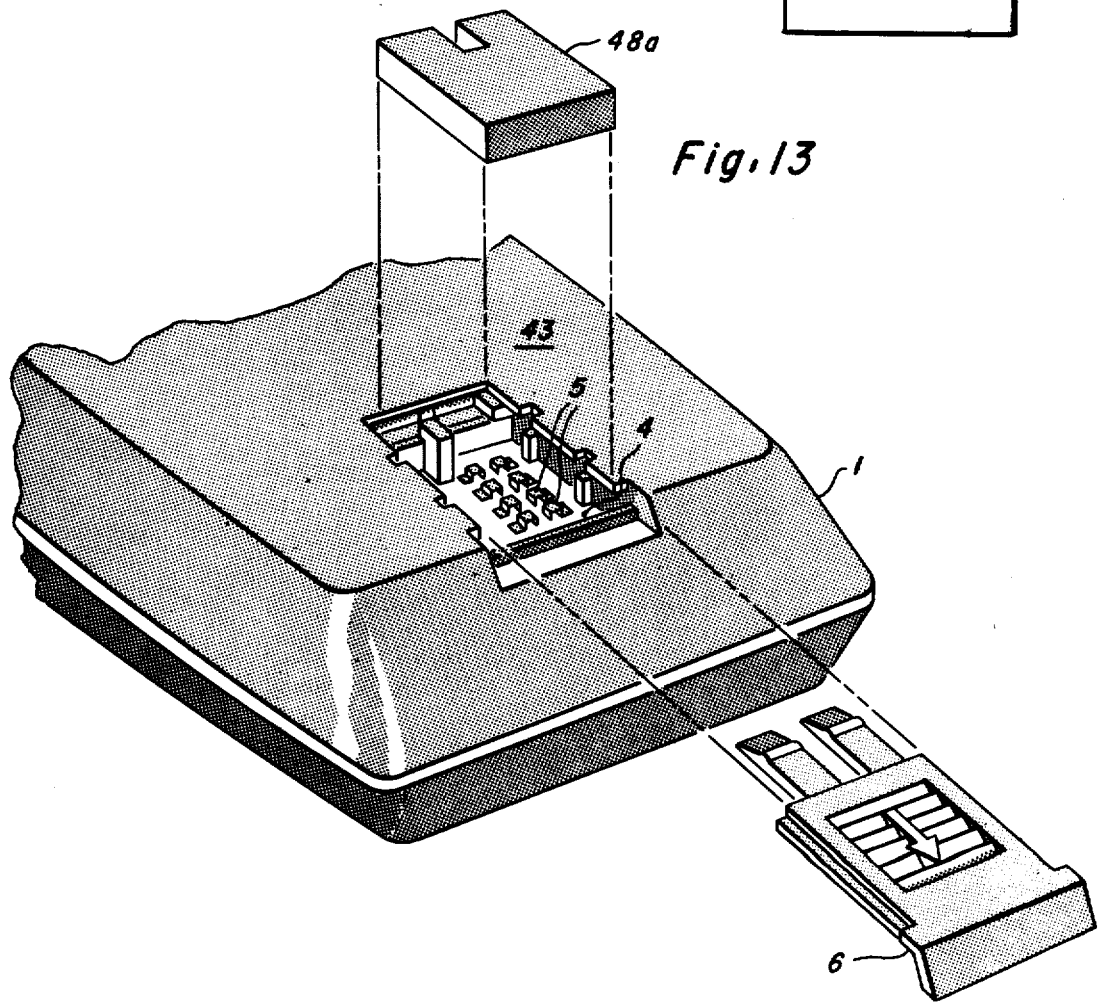

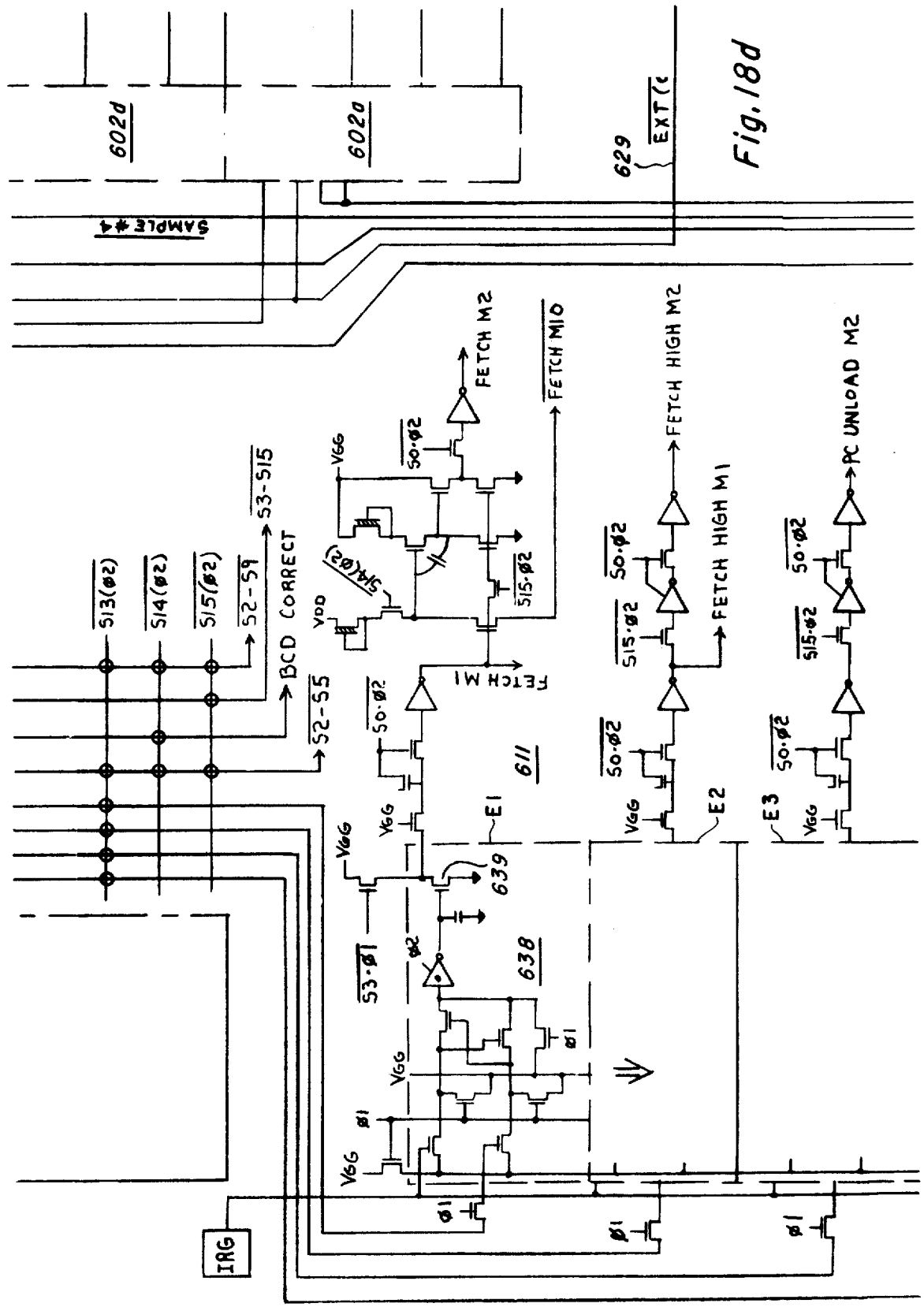

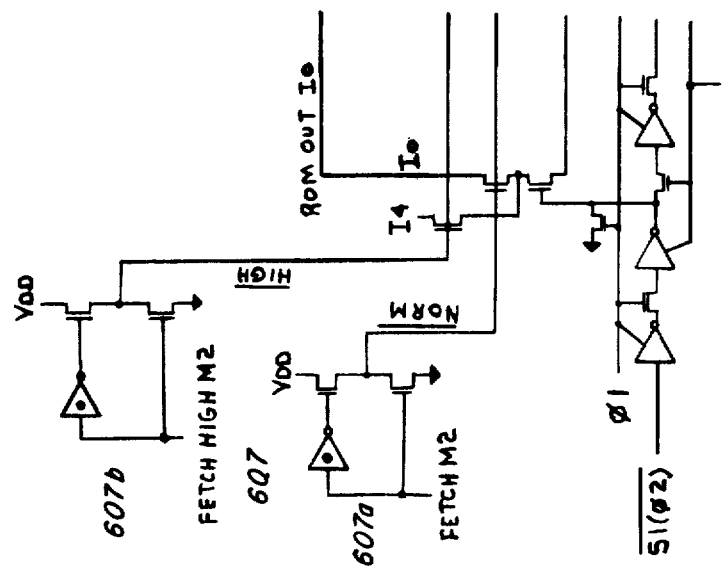
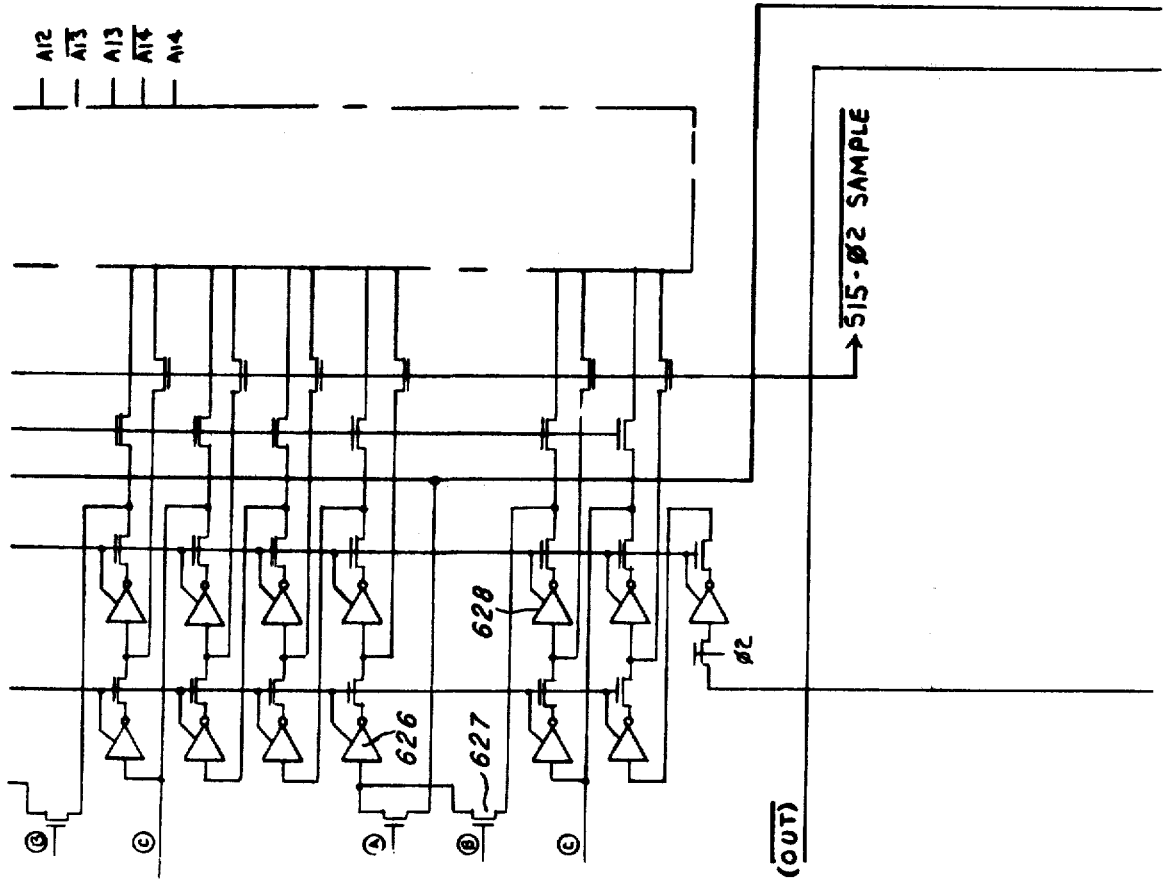
Fig. 18e

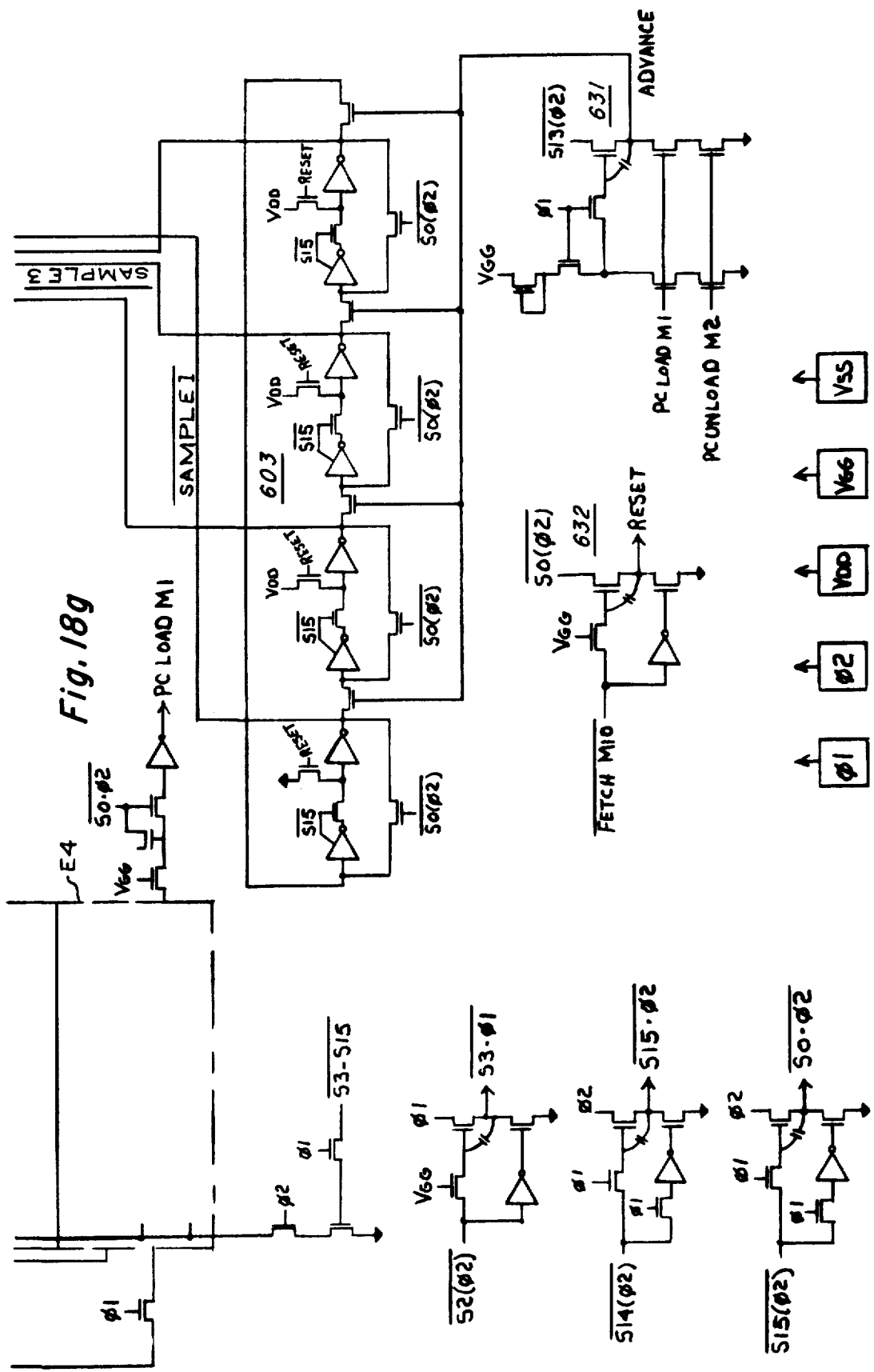

MICROPROCESSOR SYSTEM HAVING HIGH ORDER CAPABILITY

This application is a continuation-in-part of Ser. No. 714,464 filed Aug. 16, 1976.

BACKGROUND OF THE INVENTION

This invention relates to microprocessor systems and more specifically to electronic calculators having the capability of solving higher order or complex mathematic problems. It should become evident, moreover, that my invention has utility in other applications making use of microprocessor technology, such as video games, to increase the level of sophistication of the functions performed by the microprocessor.

Electronic calculators have evolved from comparatively simple machines which add, subtract, multiply and divide the data entered into the calculator to machines which can perform sophisticated financial and mathematical operations such as, for example, changing polar coordinates to rectangular coordinates or solving compound or annuity interest problems. The calculator systems developed to date have had a single or multiple read-only-memory (ROM's) in which groups of instruction words are stored as microcode. The different groups of instruction words stored in the ROM cause the calculator's arithmetic unit, memory and display to cooperate to perform desired mathematical operations when instruction words are read out of the ROM. The ROM is addressed or controlled by a keyboard or other input means associated with the electronic calculator or microprocessor system. Thus, the depression of a key causes a selected group of instruction words to be read out of the ROM and these instruction words are provided to circuits controlling the inputting of data, the storage of data and the manipulation of data to perform the operation or function invoked by the key depressed. Thus, the instruction words generated by the ROM cause data to be entered, stored, and manipulated using, for instance, an arithmetic unit to perform such functions as adding, subtracting, multiplying dividing or performing higher order or complex mathematical operations on the data.

Each instruction word typically has a length of eight to sixteen binary bits, although microprocessors having longer or shorter instruction words are well within the state of the art. The performance of even a relatively simple operation, such as adding two floating point numbers, requires a group of many instruction words. For instance, the addition of two floating point numbers may require as many as 75 instruction words having thirteen bits each, thus absorbing 975 bits of ROM area to be able of performing such a simple operation. Similarly, the subtraction operation has a comparable set of instruction words and so on for other operations and functions. Of course, portions of such sets may be shared for certain operations.

Modern electronic calculators now perform sophisticated arithmetic and financial computations such as, for example, squaring, taking square roots, converting from polar to rectangular coordinates, computing logarithms and trigometric relationships, compounding interest, and other such computations. These computations have typically been implemented into the electronic calculator by increasing the size of the ROM to accomodate the larger number of instruction words associated with these higher order computations. While the size of commercially available ROM's has increased during the past several years, the library of computational programs desired to be implemented in an electronic calculator has grown at even a faster rate. For example, it is desirable to have an electronic calculator capable of performing an entire library of computations related to electrical engineering, mechanical engineering, surveying, or the like. However, an electronic engineering library of computations could comprise, for instance, 45 computational programs or more, each of which require as many as 600 instruction words implemented in a read-only-memory. Thus an entire computational library would include for example, on the order of 27,000 instruction words of thirteen bits each which would require many conventional chips to implement the electrical engineering library in a conventional calculator. Of course, using a large number of chips can significantly increase the cost of an electronic calculator as well as making the packaging for hand-held use more difficult and unduly increasing power consumption.

In the prior art it is also known that an electronic calculator may be provided with the ability to perform higher order calculators by making the calculator programmable and storing the program in a Random Access Memory (RAM) or on a magnetic tape or card. But, in this case, the program is not permanently stored in the calculator, but must be read into the calculator's memories at least each separate time the calculator is energized; thus, such a program is not directly accessible from the calculator's keyboard.

It is an object, therefore, of this invention to improve electronic calculators and microprocessors.

It is another object of this invention to increase the number of computational programs stored in an electronic calculator without correspondingly increasing the size of the ROM(s) implemented in the electronic calculator.

It is a further object of this invention to make such computational programs directly accessible from the calculator's keyboard.

It is another object of this invention to store a large number of computational programs in the hand-held electronic calculator using a small number of chips.

It is yet another object of this invention to selectively equip an electronic calculator or microprocessor with different libraries of higher order function, which functions may be accessed from the calculator's keyboard and/or from a program stored in a programmable calculator.

It is still another object of this invention that the particular library with which a calculator is equipped may be changed by the end user thereof.

The aforementioned objects are satisfied as is now described. Generally, and in accordance with the preferred embodiment of the invention, an electronic calculator is equipped with first and second ROM's. The first ROM stores a plurality of groups of instruction words, each group effective for controlling an arithmetic unit to perform basic arithmetic operations such as adding, subtracting, multiplying and dividing, taking square roots, forming logarithmic and trigonometric operations and so forth in response to the operation of the first set of keys on a calculator keyboard. Each of these groups of these instruction words contains on the order of 75 to 200 instruction words. Thus, the first ROM is used as a main ROM as in a conventional calculator microprocessor. The second ROM stores a plurality of sets of program codes. Each set of program codes are capable of performing a higher order mathematical program and are read out of the second ROM in response to operation of a second set of keys on the calculator keyboard. Each program code (which comprises eight binary bits in the embodiment disclosed) is effective for addressing a group of instruction words stored in the first ROM in much the same manner as depression of a key in the first set of keys. Thus, a set of program codes may mimic the depression of a plurality of keys in the first set of keys. Therefore, each higher order mathematical program is preferably a series of the basic arithmetic operations stored in the first ROM combined with operations for entry of data and/or constants. The second ROM reads out program codes which serve to address the groups of instruction words stored in the first ROM. By using the second ROM to store such higher order calculational programs, a second set of keys can be used to input commands triggering a long chain of basic arithmetic operations, including data entry operations, without the chance of human error and at a much greater speed than a human operator. Thus, the second ROM, in the preferred embodiment, stores sets of program codes, each program code effective for addressing the first ROM in much the same manner as a single depression of a key in the first set of keys; therefore, a set of such program codes may be advantageously utilized for a large number of higher order calculational programs in an electronic calculator. Since the second ROM must only store on the order of eight bits, or so, to select or address an entire group of instruction words, it should be evident to one trained in the art by utilizing the second ROM herein disclosed that great economies can be effected in total ROM area, when compared with prior art techniques. While I have referred to first and second sets of keys on the calculator keyboard, it is well known that a single physical key may be used to perform several functions and therefore the keys referred to in the first and second sets may be physically the same keys.

In a further aspect, the second ROM is preferably provided by a chip or chips which may be temporarily plugged into the calculator or mocroprocessor system by the end user thereof. Preferably, the calculator or microprocessor system is operated with one or more such second ROM chips, which chips are selected from a group of chips for operation in the calculator or microprocessor system by the end user thereof, according to the end user's particular needs at any given time. In the embodiment disclosed, a major portion of the second ROM is provided by a plugged-in chip and minor portion is provided by a permanently wired-in chip. Thus, in the embodiment disclosed, the end user may select which higher order functions are performable according to which particular second ROM chip is plugged into the calculator while a few high order functions stored in the permanently wired chip is inherently a part of the calculator system disclosed. The second ROM is disposed in a module for ease of handling by the end user of the calculator or microprocessor.

While a calculator system is disclosed herein in detail, it should be evident to those skilled in the art that my invention may also be used in applications other than calculators where a microprocessor with high order capability may be advantageously utilized.

BRIEF DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the drawings, wherein:

FIG. 2 is a simplified block diagram of a multi-chip calculator system which may be utilized in practicing the present invention;

FIGS. 3a-3b are detailed block diagrams of the arithmetic chip featured in FIG. 2;

FIG. 4 is a detailed block diagram of the SCOM chip featured in FIG. 2;

FIGS. 5a-5e depict in representative form the instruction words decoded by the arithmetic and SCOM chips;

FIG. 5f depicts the originization of the EXT signal;

FIG. 5g depicts the first ROM address as stored in the address register;

FIGS. 6a-6b are timing diagrams showing the timing of various parts of the multi-chip system;

FIGS. 8a-8d are a composite schematic diagram of the arithmetic chip of FIG. 2;

FIGS. 9a-9e are a composite schematic diagram of the SCOM chip of FIG. 2;

FIGS. 10a-10r are schematics of certain circuits used in FIGS. 8a-8d and 9a-9e;

FIG. 12 is a block diagram of another embodiment of the invention which may be utilized with a modern electronic calculator of the type depicted in FIG. 11;

FIG. 13 is a pictorial view of an electronic calculator having an opening for removeably receiving a packaged second second ROM chip;

FIGS. 18a-18i form a composite schematic diagram of the second ROM chip; and

LOCATION OF THE DRAWINGS

FIGS. 1, 5h, 7, and 11-19 accompany this patent. FIGS. 2, 3a-3b, 4, 5a-5g, 6a-6b, 8a-8d, 9a-9e and 10a-10r are hereby incorporated by reference from U.S. Pat. No. 3,900,722, entitled "Multi-Chip Calculator System Having Cycle and Subcycle Timing Generators", which issued on Aug. 19, 1975 to Michael J.

Cochran and Charles P. Grant, Jr. and which is assigned to the assignee of this invention.

CONCEPTUAL DESCRIPTION

Figure 1:
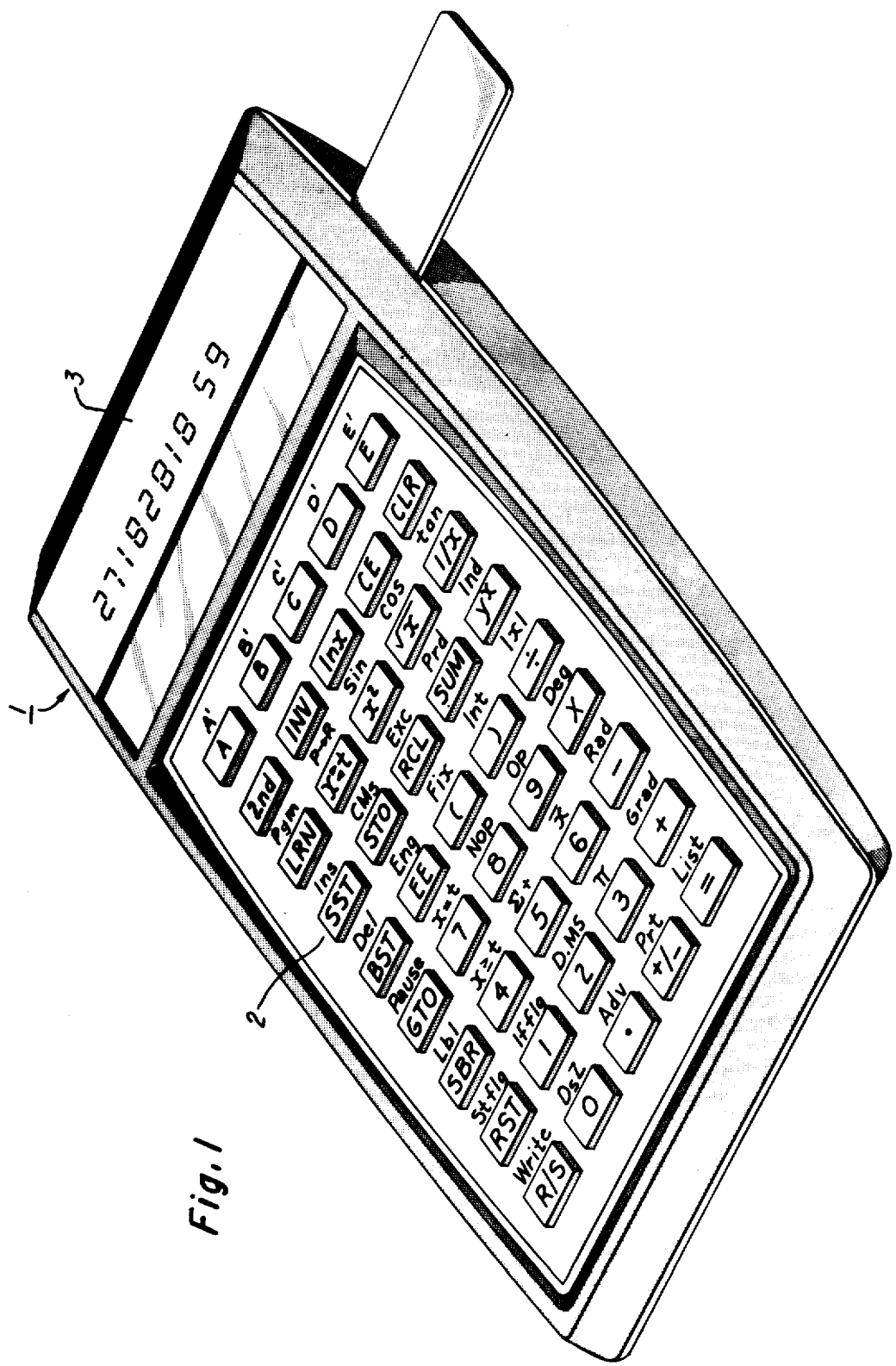
FIG. 1 is a pictorial view of an electronic portable calculator of the type which may embody the invention.
Figures 5H, 7:
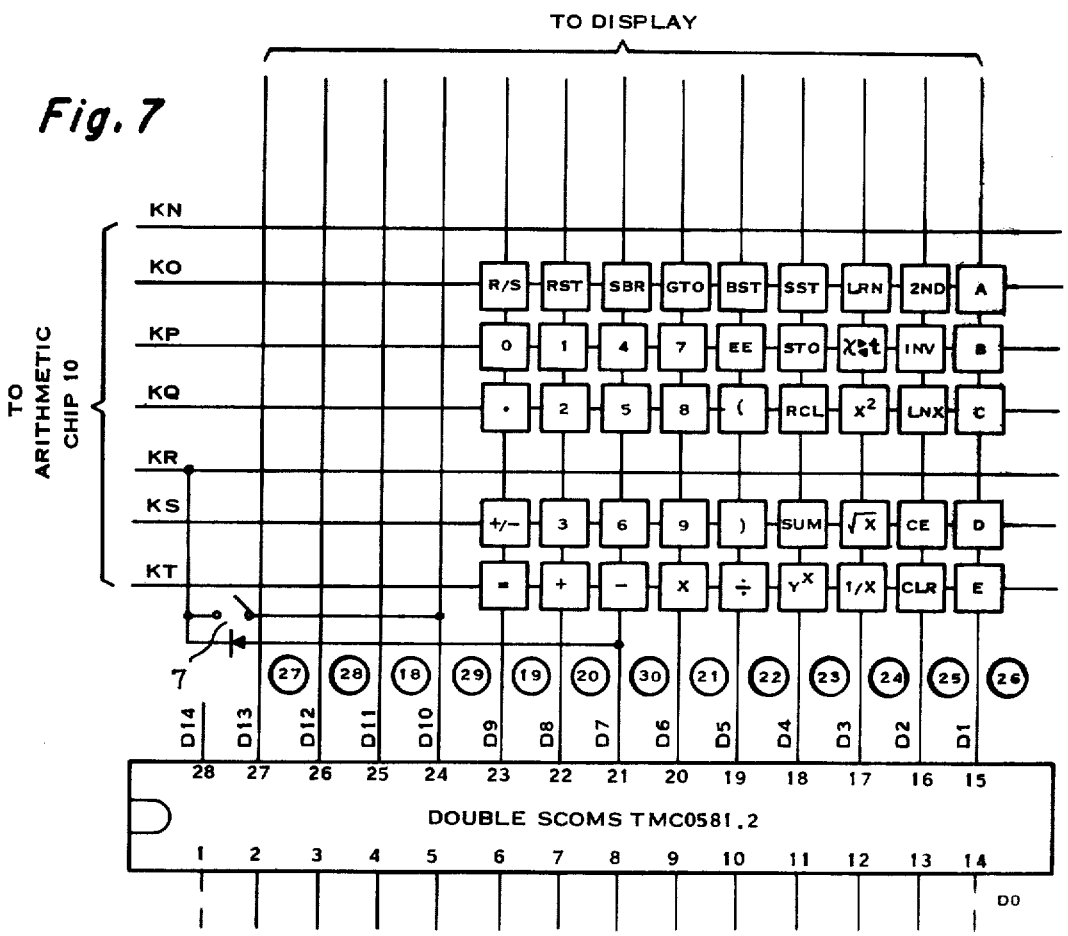
FIG. 5h depicts the instruction words decoded on the second ROM chip and selected instruction words decoded on the arithmetic chip, but which may be conveniently employed in connection with the utilization of second ROM chip.
FIG. 7 is a representation of the keyboard input matrix.

Referring to FIG. 1, an electronic portable calculator of the type which may employ features of this invention is shown in pictorial form. The calculator 1 comprises the keyboard 2 and the display 3. The display 3, in one embodiment, consists of twelve digits or characters, each provided by an array of light emitting diodes or characters, such provided by an array of light emitting diodes, a liquid crystal display, gas discharge tube or other display means. The display is preferably implemented to having eight mantissa digits, two exponent digits, and two character places for negative signs, etc., (one for the mantissa and one for the exponent), thereby permitting outputting the data in scientific notation for instance. Of course, the type of display and the number of digits displayed is a design choice. Ordinarily, the display would be of the seven segment or eight segment variety, with provisions for indicating a decimal point for each digit. The display 2 includes a number of keys (0–9), a decimal point key, the conventional plus (+), minus (−), multiply (×), divide (÷), and equal (=) keys. Further the keyboard perferably includes keys for exponentation ($Y^x$ and inverse $Y^x$) and trigonometric relationships (Sine X, Cosine X, and Tangent X). The calculator is further provided with OP Code Keys for performing special functions such as slope, intercept, plotting operations, alphanumeric operations and the like. Further, the calculator may be provided with keys for storing (STO) and recalling (RCL) data from memory, for clearing the calculator (CLR) and for clearing the last entry (CE). The keys used to access higher order functions will be described subsequently.

Figure 11:
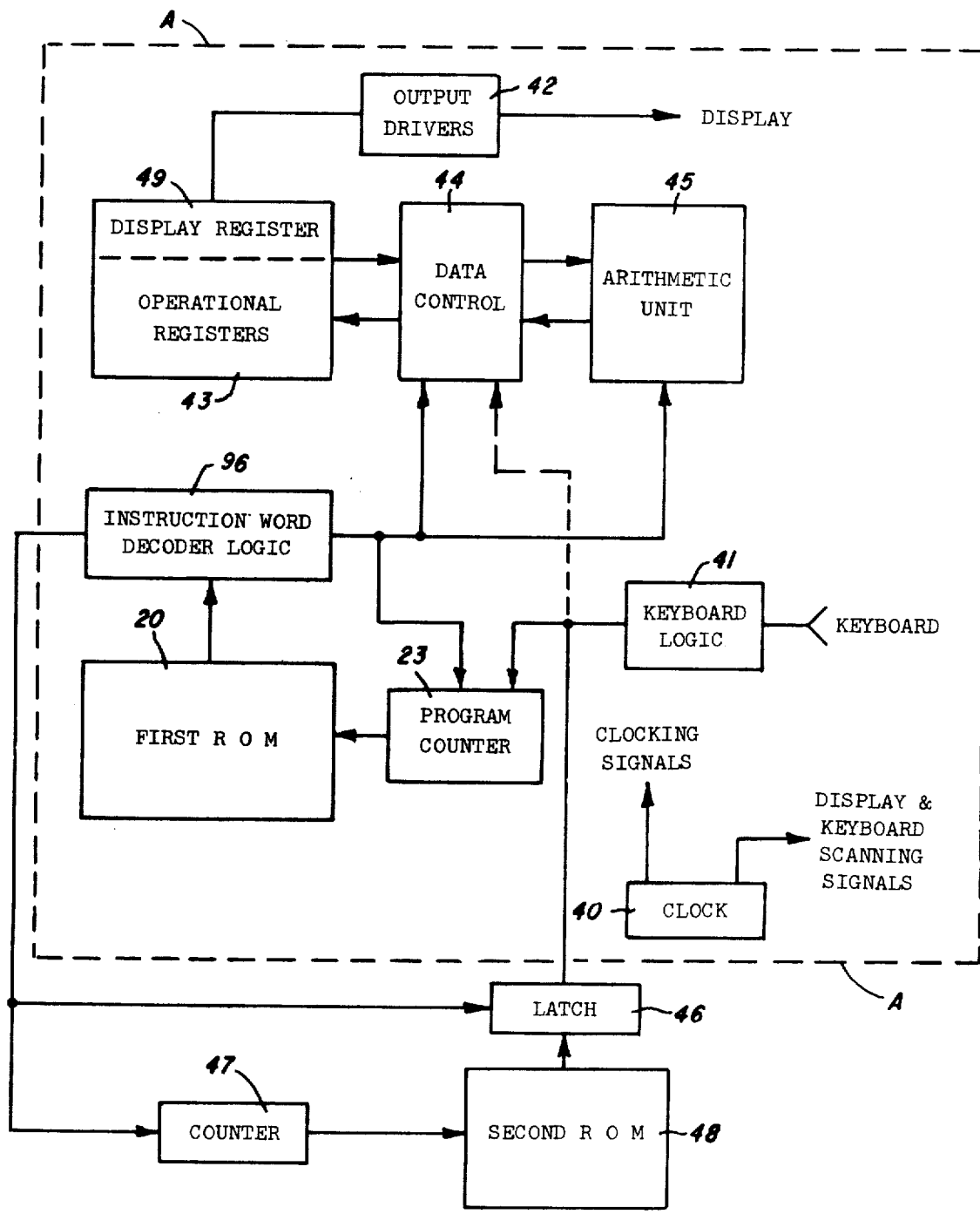
FIG. 11 is a block diagram of a modern electronic calculator equipped with one embodiment of the invention.

In FIG. 11, there is shown in block diagram form, the basic elements of a modern electronic calculator implemented on one or more semiconductor chips. It is to be understood that the block diagram of FIG. 11 is not intended to represent the block diagram of a detailed representation of electronic calculators, but is merely intended to indicate how the additional elements of an electronic calculator system having higher order capability are incorporated into a typical electronic calculator. Subsequently, it will be explained in detail how my invention may be praticed with the multi-chip calculator system depicted in FIGS. 2–19. The calculator of FIG. 11, is shown with a clock 40 which provides clocking signals for transferring data throughout the electronic calculator and provides scanning signals for scanning the display 3 and keyboard 2 or other data entry means. The inputs for the keyboard 2 are provided to keyboard logic 41 which provides an address in response to the depression of a particular key to program counter 23. It should be evident to one skilled in the art that keyboard logic 41, as well as other logic circuitry, may be implemented in the calculator as the elements described or may be implemented as a part of read only memory 20 and instruction word decoder logic 96.

The address received from keyboard logic 41 is inserted into program counter 23 and is utilized in addressing the First Read-Only-Memory (ROM) 20. First ROM 20 contains the microcode for performing basic arithmetic operations and outputs an instruction word in response to the address contained in program counter 23. Program counter typically includes an add-one circuit for incrementing the address in program counter 23. Thus, program counter 23 causes a group of instruction words to be read out of First ROM 20 in response to the incrementing of program counter 23, each instruction word being read out during an instruction cycle. The group of instruction words read out of First ROM 20 corresponds to the address received from keyboard logic 41.

The instruction words read out of First ROM 20 are decoded by instruction word decoder logic 96 to provide instruction commands to program counter 23, arithmetic unit 45 and data control 44. The instruction commands provide to program counter 23 enable branches to be executed by inserting a new address into program counter 23 in response to a branch instruction command stored in First ROM 20. Instruction commands provided to data control 44 and arithmetic unit 45 control the manipulation of numeric data in the calculator. Instruction word decoder 96 is also interconnected with a counter 47 and a latch 46 in my electronic calculator system having higher order math capability.

Data control 44 is interconnected with display register 49, operational registers 43 and with the arithmetic unit 45. Display register 49 stores the number displayed by the display 3 and has associated therewith a plurality of operational registers 43 which are used in conjunction with arithmetic unit 45 to perform arithmetic operations in response to particular instruction commands. Output drivers 42, interconnect display register 49 with a display 3 for decoding the electrical signal, stored in display register 49 and for driving display 3. Data control 44 comprises a series of selector gates for interconnecting the appropriate operational registers 43 and display register 49 with the arithmetic unit 45, with portions of instruction words, (if need be), or with logic signals from keyboard 2 (if need be).

Numeric data is inputted into display register 49 from keyboard 2 either by a data path from keyboard logic 41 via data control 44 under the control of appropriate instruction commands or by inputting selected portions of an appropriate instruction word in response to selected instruction commands. The electronic calculator system hereinbefore described, that being the portion shown within the reference a dashed line in FIG. 11, basically corresponds to the type of electronic calculators known in the prior art. Exemplary of the prior art calculators systems is the calculator system depicted in FIGS. 2–10.

Also in FIG. 11, there is shown a counter 47 and a latch 46 which is responsive to outputs from instruction word decoder logic 96. The counter 47 has an output for addressing a Second ROM 48. Second ROM 48 outputs a program code in response to the inputted address, the program codes being outputted via latch 46 to program counter 23. When keyboard logic 41 decodes keyboard outputs indicating that a higher order math calculation is to be executed, the higher order math calculation being preferably a series of basis arithmetic functions and operations of the type implemented in first ROM 20, keyboard 41 preferably input an address into program counter 23 which causes First ROM 20 to branch to a location therein for calling a program from Second ROM 48. When a program is called from Second ROM 48, instruction word decoder logic 96 first sets latch 46 to permit the program codes outputted by Second ROM 48 to be inputted into program counter 23. The program codes outputted by Second ROM 48 effectively transmit an address into program counter 23 for addressing First ROM 20. The first such code preferably causes the First ROM 20 to branch to a location for performing the first basic arithmetic operation or function required by the Second ROM 48 program. The program codes may take the same logical format, for instance, as the output from keyboard logic 41. When calling a program from Second ROM 48, instruction word decoder logic 96 also transmits an address into counter 47, the address being the first location in Second ROM 48 of the called program. It should be evident, moreover, that counter 47 could be loaded with an address directly from keyboard logic 41 in lieu of from instruction decoder logic 96, this being essentially a design choice.

After the first program code is read out of Second ROM 48 via latch 46 and loaded into program counter 23 then First ROM 20 cycles through a group of instruction words to accomplish the indicated basic arithmetic operation or function. Of course, the number of instruction cycles required to accomplish the indicated operation or function depends on, for instance, a number of instructions contained for that basic operation or function in First ROM 20. As is well known, those operations or functions which are accessible via keyboard logic 41 from keyboard 2, usually contain instruction words for causing the display to be enabled at the end of the function or operation addressed in First ROM 20. Since, however, another program code is to be read from Second ROM 48 and inserted into program 23 upon accomplishment of the indicated function or operation, counter 47 includes an add-one circuit which is responsive to, for instance, a display command or other such commands located near or at the end of a group of instruction words in First ROM 20 for accomplishing a basic arithmetic operation or a function. When the display command or other such command is decoded by instruction word decoder logic 96, the add-one circuit in counter 47 increments and causes Second ROM 48 to read out the next program code of the called program via the set latch 46 to program counter 23, which in turn causes First ROM 20 to cycle through another group of instructions to accomplish the function or operation indicated by the outputted program code. Again, towards the end of this next basic arithmetic function or operation, a display code or other such code will be decoded in instruction word decoder logic 96 causing the add-one circuit in counter 47 to increment counter 47, the cycle repeating itself.

The advantages of Second ROM 48 and associated counter 47 and latch 45 should be evident to one trained in the art. This system permits equipping an electronic calculator with the capability of performing higher order calculational programs: for instance, changing polar coordinates to rectangular coordinates, doing financial calculations or solving complex engineering equations using significantly less total ROM area than would be required if such programs were implemented only in First ROM 20. Additionally, it should be evident that while the foregoing discussion has suggested that a program code read from Second ROM 48 mimics keyboard logic outputs from keyboard logic 41, the program codes read from Second ROM 48 could, in lieu thereof or in addition thereto, have codes which do not mimic the outputs from keyboard logic 41, but rather, for instance, would cause the program counter 23 to branch to locations in First ROM 20 which are not directly accessible from the keyboard. Thus an output from Second ROM 48 may cause program counter 23 to branch to a location in First ROM 20 which could not be accessed directly from the keyboard 2 via keyboard logic 41. One purpose for such a program code would be a program code in a called program to indicate that the end of the program had been reached. This program code, which I shall refer to as the "return" program code, preferably causes program counter 23 to branch to an address location in First ROM 20 which would contain a group of instructions for resetting latch 46 and for displaying the contents of display register 49. The display instruction preferably follows the reset latch instruction, so that when the display command causes counter 47 to increment (if so used), no branching will occur in response thereto at program counter 23. Also latch 46 inhibits outputs from Second ROM 48 from being inserted into program counter 23 whenever a display instruction or other such instruction is decoded by instruction word decoder logic 96 incrementing the add-one circuit in counter 47 when the calculator has not called a program from Second ROM 48. Referring now to FIG. 12, there is shown a partial block diagram of a second embodiment of my calculator system having higher math capability. The latch 46 and counter 47 are interconnected with program counter 23 and instruction word decoder 96 as done in the embodiment shown in FIG. 11. In fact, this embodiment is similar to the embodiment in FIG. 11, except that a superroutine stack register 91 and an associated superroutine latch 92 have been interconnected with counter 23; stack 91 is responsive to outputs from instruction word decoder logic 96. Thus, the program codes outputted from Second ROM 48 are passed to program counter 23 via latch 46; counter 47 is used to address Second ROM 18 and is responsive to instruction word decoder logic 96 for inserting an initial address therein and for incrementing that address in response to decoded display commands, for instance. The superroutine stack 91 functions to either receive an address from counter 47 or to output an address to counter 47, both functions being in response to outputs from instruction word decoder logic 96. Superroutine stack 91 is a multi-level stack and functions in normal last-in-first-out mode. Superroutine stack 91 may be advantageously utilized in calculator systems with higher math capability so that the program codes stored in Second ROM 48, in addition to prescribing addresses for performing basic arithmetic operations and functions according to microcode stored in First ROM 20, may also use First ROM 20 for addressing Second ROM 48 itself. The advantages of this superroutine stack 91 may be best seen by example. For instance, Second ROM 48 may be implemented with program codes to perform the factorial function, and during the calculation of statistical programs, such as combinations and permutations, it is often advantageous to be able to use the factorial function. If a factorial function and the statistical combination function are both implemented in Second ROM 48, then the combination function program may call the factorial function, if a superroutine stack 91 is utilized. The point of exit from the combination function program must be stored so that the program can return thereafter accomplishing the factorial function. Thus, the address in counter 47 to which the program must return in Second ROM 48 after accomplishing the factorial function is stored in superroutine stack 91 because a new set of addresses will be loaded into counter 47 when the factorial function is executed. Whenever an address has been stored in superroutine stack 91, superroutine latch 92 is set. Further, as aforementioned, the factorial program will preferably have a "return" program code loaded in Second ROM 48 at the end thereof. This return code normally causes latch 46 to be reset. However, the return code is inhibited from setting latch 46 when superroutine latch 92 has been set. Latch 46 is not reset at this time because the program codes being read from the Second ROM 48 must continue to be inserted in program counter 23 to carry out the main program, eg, the combination function program in the aformentioned example. Although the return code is not used to reset latch 16 if superroutine latch 92 is set, the return code is used to "pop" the address in the stack back into counter 47. Since stack 91 is a multi-level stack, several levels of "superroutines" may be utilized.

Preferably, the second ROM 48 is implemented by a ROM chip which is provided with a package permitting it to be plugged into the aforementioned electronic calculator. The second ROM chip is preferably packaged in a form to facilitate handling by the end user of the calculator to permit easy installation of that chip into the electronic calculator. Preferably, the electronic calculator system of this invention receives, at any given time, one second ROM chip, but the operator thereof selects which particular second ROM chip is plugged into the calculator system. The operator ROM chips each programmed to perform different types of high order functions. For instance, one or a plurality of second ROM chips may be provided for performing statistical problems while another ROM chip or chips is provided for performing surveying problems; still yet another second ROM chip or chips may be provided for performing aviation or navigational problems, for instance. Thus the end user of the calculator can configure a basic calculator to perform many different types of high order functions depending upon the particular library available in the particular second ROM chip or chips plugged into the electronic calculator of this invention.

Referring to FIG. 13, there is shown an electronic calculator having an opening 4 for exposing contacts 5, which are connected to the electronics of the calculator. Opening 4 is preferably provided on the rear side of the calculator case 1 as shown in the FIG. 1 and forms, with contact 5, a receptacle for receiving module 48a. Opening 4 is adapted to removably receive the second ROM 48, which is not shown in FIG. 13, but which is disposed in module 48a. Second ROM chip module 48a has contacts (not shown) which mate with contacts 5 for connecting the second ROM 48 therein to the electronic calculator. Door 6 may be closed to retain module 48a in opening 4 during normal operation.

THE SPECIFIC EMBODIMENT IN A PROGRAMMABLE CALCULATOR

Having described how the second ROM is advantageously used with an electronic calculator, a particular embodiment of the second ROM in a particular calculator is now described.

Figure 14:
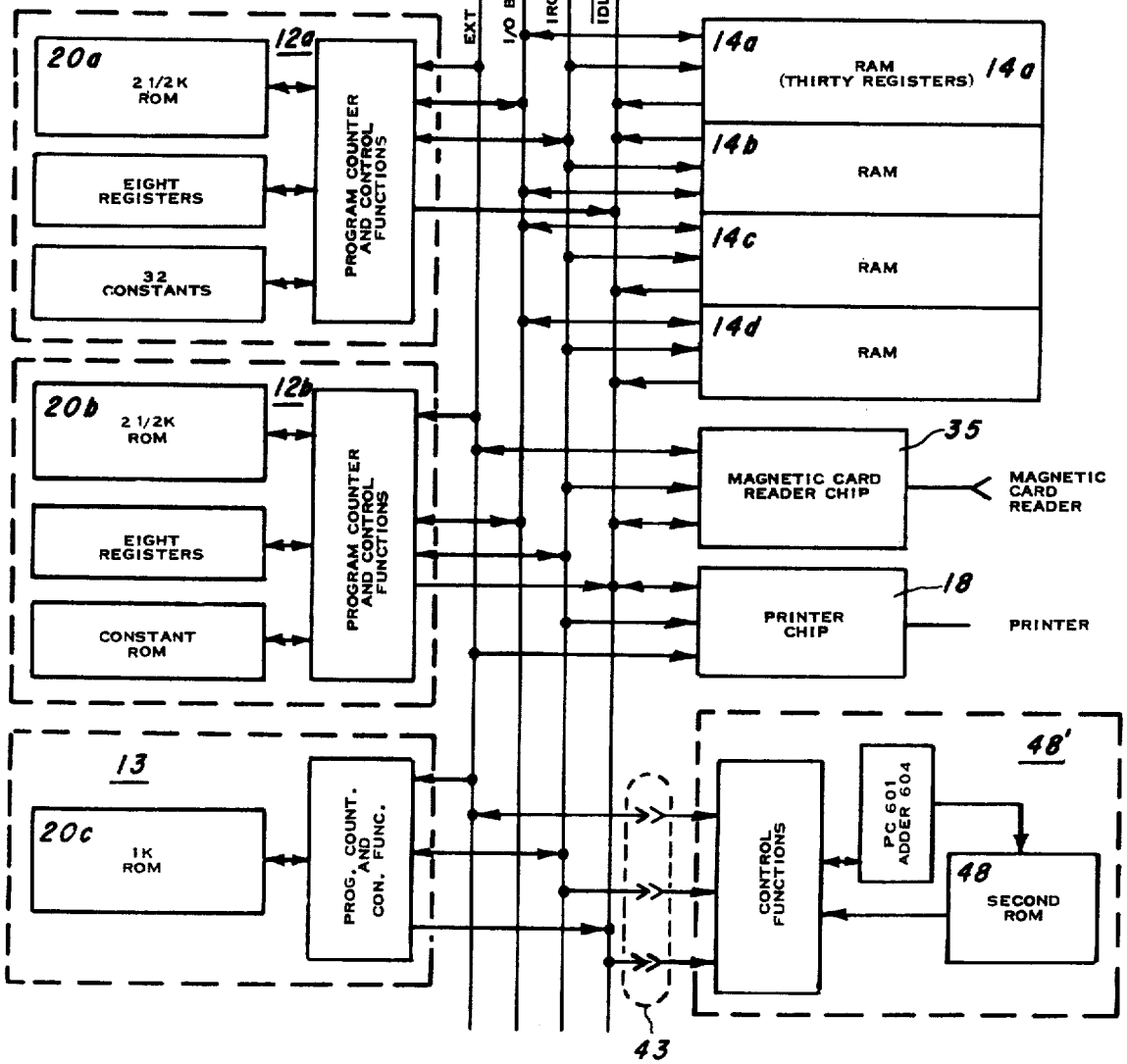
FIG. 14 is a simplified block diagram of a multi-chip calculator system utilizing the present invention.

Referring now to FIG. 14, there is shown a detailed block diagram of an specific embodiment of a programmable electronic calculator employing the second ROM 48 of this invention. In FIG. 14, there is shown a plurality of chips (48', 10, 12a, 12b, 13, 14a–d and 18). Chips 10, 12a, 12b, 13, and 18 have heretofore been described in some detail in prior U.S. Patents and Patent Applications and therefore reference will be made to U.S. Patents or U.S. Patent Applications, as the case may be, for a detailed description of these chips. The following discussion will basicly relate to how chips 10, 12a, 12b and 13 cooperate with a second ROM chip 48'; which is desccribed hereafter in detail, to implement a calculator having high order capability.

The calculator's arithmetic chip 10 has a plurality of Registers 50a–50e for storing numeric data, an Arithmetic Unit 55 for performing arithmetic operations on the data stored in Registers 50a–e, Flag Registers 53a–b for storing a plurality of flags, a keyboard register 54 which is (1) loadable with a decoded keyboard address derived from the calculator's keyboard, (2) loadable from a subroutine register or (3) loadable from the second ROM chip 48'. Arithmetic chip 10 is described in detail in aforementioned U.S. Pat. No. 3,900,722 which issued to Michael J. Cochran and Charles P. Grant, Jr. on Aug. 19, 1975 and which is assigned to the assignee of this invention. Line 21, column 4 through line 31, column 44 of U.S. Pat. No. 3,900,722 is hereby incorporated herein by reference.

U.S. Pat. No. 3,900,722 discloses a multiple chip calculator system employing the aforementioned arithmetic chip 10 and a scanning and read-only-memory (SCOM) chip. U.S. Pat. No. 3,900,722 discloses that eight SCOM chips may be utilized in a single calculator system. Referring again to FIG. 14, chips 12a and 12b are each double SCOM chips; a double SCOM chip is the equivalent to two SCOM chips of the type disclosed in U.S. Pat. No. 3,900,722 implemented on a single chip of silicon, with the F and G registers thereof replaced by a single eight register memory of the type disclosed in U.S. Patent Application Ser. No. 745,157 which was filed Nov. 26, 1976 and which is assigned to the assignee of this invention.

External ROM chip 13 provides for increased instruction word storage capacity. The ROMs 20a and 20b on double SCOM chips 12a and 12b and the ROM 20c on chip 13 provide the first ROM 20 for storing the microcode which controls the operation of the calculator system. The microcode stored in ROM's 20a–20c is listed in Tables IIa–IIc, respectively. ROM 20c is a 1 K×13 bit ROM while ROMs 20a–20b are each 2.5 K×13 bit ROMs.

Referring briefly to Tables IIa–IIc, the first column thereof is the hexidecimal address of the microcode instruction word appearing in the third column. The second column identifies the chip in which the microcode is stored. TMC-582 and TMC-583 are the two double SCOM chips 12a and 12b; TMC-571 is the external ROM chip 13. The fourth through nineteenth columns contain instruction words whose addresses are incremented by one for each column, reading from left to right. Thus, in Table IIa, the seventeen instruction words in the first row, columns three through nineteen are located at hexidecimal addresses 0000 through 0010. The instruction words are in hexidecimal format also and correspond to the instruction words identified in FIGS. 5a–5h.

As explained in U.S. Pat. No. 3,900,722, the arithmetic chip 10 and the double SCOM chips 12a and 12b are interconnected by lines for exchanging the following control signals: external (EXT), input/output (I/O), instruction words (IRG), and IDLE. External is a serial data channel which may be used, for instance, for addressing ROMs 20a–20c using an address stored in the keyboard register 54 when the PREG bit thereof is a logical one or for inputting or outputting serial data depending on the instruction word outputted on IRG (when the PREG bit is a logical zero). I/O is a four bit parallel data channel for transferring data in bit parallel, digit serial fashion under control of construction words outputted from ROMs 20a-20c. IRG is a serial channel for transmitting the instruction word from the particular ROM 20a-20c controlling the operation of the system.

In FIG. 14, there are shown four multi-register chips 14a-14d which are connected to the I/O, IRG, and IDLE lines. These multi-register chips are essentially random access memory (RAM) chips which are utilized for storing the data used by the calculator system and programmed functions. It should be evident that the numbers of such chips as well as the size of the RAMS thereon is a design choice.

The magnetic card reader chip 35 is responsive to EXT, IRG and IDLE for inputting digital information to the calculator system from magnetic cards or outputting digital information from the calculator system to magnetic cards. Chip 35 is described in greater detail in U.S. Pat. Application 622,288 filed Oct. 10, 1975 and now U.S. Pat. No. 4,006,455. Of course, the use of a card reader is a design choice. If chip 35 is not utilized, the diode and switch 7 shown in FIG. 7 should be omitted. Switch 7 closes in response to a card being inserted into the card reading mechanism associated with chip 35.

Printer chip 18 may be used to provide the calculator of this invention with printing capability. It should be evident that the utilization of printer chip 18 is a design choice and further this chip may be either permanently installed in a printer calculator or may be installed in a print cradle, such as the PC 100a cradle manufactured by Texas Instruments Incorporated of Dallas, Texas which print cradle may be interfaced with a hand-held calculator provided with printing capability. Chip 18 is described in greater detail in U.S. Pat. Application Ser. No. 428,492 filed Dec. 26, 1973 and now U.S. Pat. No. 4,020,465.

The second ROM chip 48' is interconnected with the calculator system via external, IRG and IDLE. Chip 48' includes a second ROM 48 of the type heretofore discussed plus various control circuits for interfacing it with the remainder of the calculator system disclosed. As previously mentioned, second ROM chip 48' is preferably removable from the calculator of this invention and therefore a plug assembly 43 is provided for ease of removal and insertion. Preferably, the calculator of this invention is provided with a plurality of such second ROM chips 48', at least any one of which may be connected into the calculator system at any given time. This plurality of ROM chips 48' are programmed to provide different types of problem solving capabilities. For instance, one chip 48' might be implemented with programs for solving statistical problems while another might solve financial, surveying, navigation, medical, mechanical or electrical engineering problems, or the like. Moreover, it should become evident to those skilled in the art, that a plurality of such chips 48' might be interfaced with a calculator at one time if such chips were provided with a chip selection means for identifying which second ROM chip 48' is being addressed at any given time. Such chip selection circuits, while not used in the embodiment herein disclosed, are well known in the art.

While the second ROM of this invention is described as a read-only-memory, it should be evident to those skilled in the art that second ROM might be an electrically alterable device, such as an EPROM, or the like. Similarly, a bubble memory or other such non-volatile memory means could also be utilized as a second ROM.

In Table VIII there is a listing of program codes used in a general purpose second ROM chip 48' to perform such operations as: performing a diagnostic checks, complex math operations, matrix math operations, matrix inversion, annuity and compound interest operations, permutation and combination calculations and the like. The program codes are listed in columns 3-19 of Table VII. The address of the program code in column three is given in column one and the addresses of the other program codes on the same line increment by one for each column reading from left to right.

ORGANIZATION OF PROGRAMS STORED IN THE SECOND ROM

As it has been previously discussed, the second ROM stores a plurality of program codes for performing high order functions. The organization of these program codes on chip 48' is now described in detail. In this embodiment, the program codes comprise a pair of four bit binary coded decimal (BCD) digits. Therefore, these codes may be any number between 00 and 99.

Figure 15:
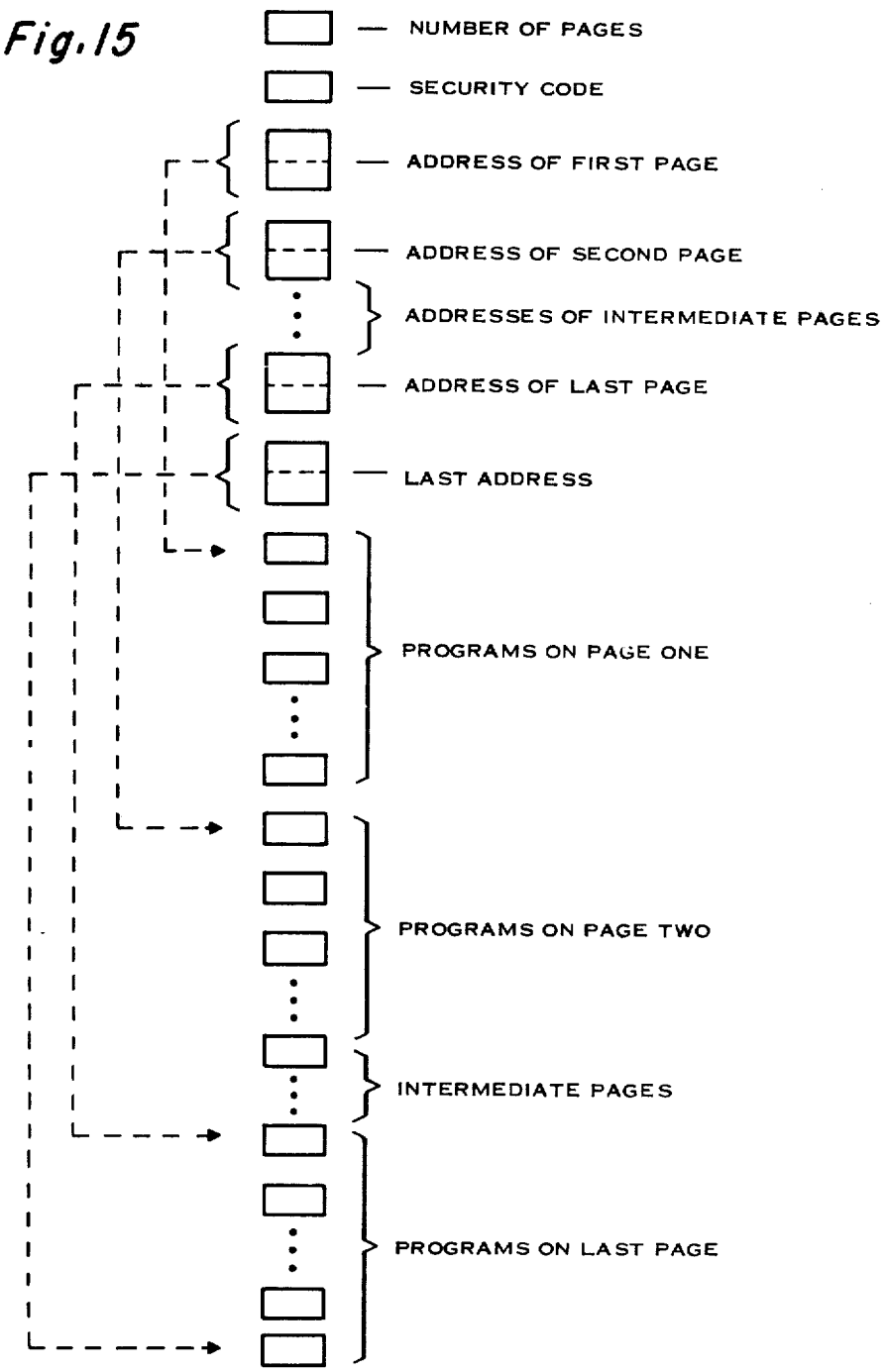
FIG. 15 is a function diagram of the logical organization of data stored in the second ROM.
Figure 16:
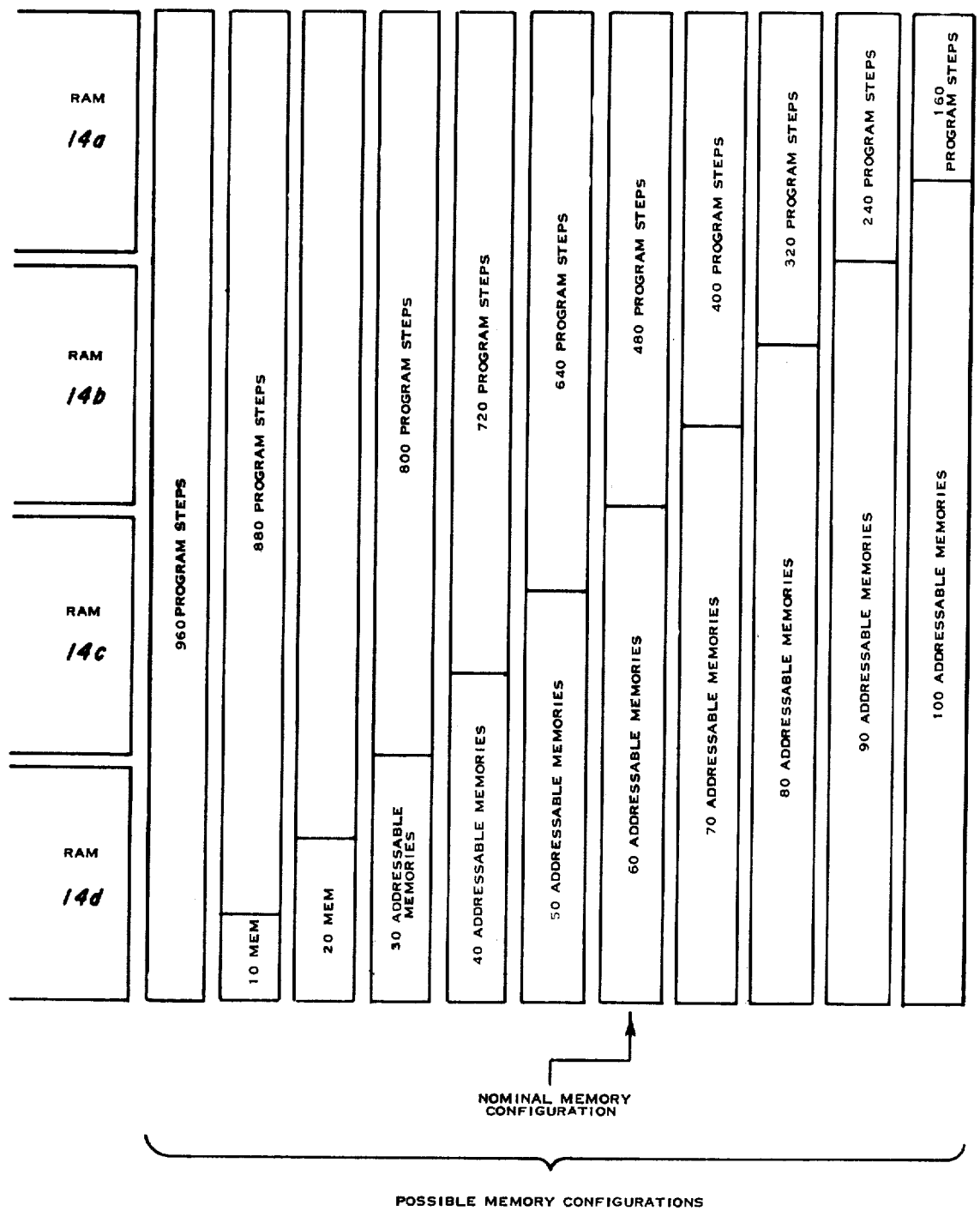
FIG. 16 depicts the variable boundary between data and program steps in the calculator's memory.

Referring now to FIG. 15, there is shown a functional diagram of how the program codes are organized on the second ROM of chip 48' and preferably a second ROM implemented in a pluggable package. In this embodiment ROM 48 stores on the order of 5,000 eight bit program codes. Referring now to FIG. 15, a rectangle thereon represents an eight bit code outputtable from ROM 48 in response to an address. Second ROM 48 stores a plurality of programs, which are for ease of addressing, arranged on "pages". Several programs are preferably allocated to each page. When a program is second ROM 48 is to be accessed from the calculator's keyboard, the operator depresses the "2ND" key and the "program" key (PGM) in this embodiment. The operator next enters a two digit number indicating the page upon which the program he or she wishes to access exists. For instance, if he or she wishes to access a program on page twelve, he or she would depress the one and two number keys. The operator knows upon which page the desired program exists because a program directory is preferably supplied along with a pluggable second ROM chip 48'. The operator then preferably enters a label to uniquely identify the particular program which is desired on the page previously entered. This is done by depressing either a particular label key A-E or A'-E' or the subroutine key (SBR) followed by a non-number key (e.g., SBR,=; or SBR, X²; or the like). Depressing the subroutine key and entering a three digit address preferably causes a branch to the location equal to the sum of the inputted address plus the address of the first program code on the inputted page.

The calculator is preferably permanently programmed to first read out the program code at location 0000 which indicates the number of pages stored on that particular second ROM 48. This number is compared with the inputting page number to assure that the inputted page number exists in second ROM 48. Next the security code at location 0001 is preferably outputted for examination, the function of which will be later described. The next step is to address second ROM 48 with the entered page location, the address being derived by multiplying the inputted page number by two. For example, if page 02 is entered, then the address to be used is 0004. At address 0004 is a top half of the address (the thousands and hundreds digits) for the beginning point of the second page. At address 0005 is the bottom half of the address (the tens and units digits). The program codes at locations 0004 and 0005 define the address where the second page begins in second ROM 48. Locations 0006 and 0007 will also be read out to provide the address of the beginning point of the third page, which is indicative of the ending point of the programs stored on the second page. Thus the address of the second page derived from locations 0004 and 0005 is used as the starting point for a label search and the address of a third page is used to define the ending point of that search.

The program in second ROM 48 is caused to branch to the program code which occurs at the starting point of page two. At page two in second ROM 48, the label search is commenced by reading out program codes sequentially until either the label being searched for is detected or the beginning point of page three is encountered, indicating that the label being searched for does not exist on the page selected. The label being searched for is either a particular label program code (Table III code 10-19) or the label program code (Table III, code 76) followed by a particular non-numeral program code. When the last page is selected, then the address of the last page, as well as the last address on that page are read out to fulfill the function of reading out the addresses of pages 2 and 3 in the foregoing example. This sequence of events is also diagrammatically depicted in FIG. 15.

Referring now to Table III, there is shown a list of the program codes 00–99 preferably used in the calculator system of this invention along with the corresponding functions performed by these codes and the key sequences used to generate the codes when generated from the keyboard. As can be seen, certain program codes may not be directly generated from the calculator's keyboard. The functions performed by the program codes listed in Table III should be evident to those skilled in the art based on the description set forth in Table III. By way of further clarification, however, the inverse function key (INV) is used to perform the inverse of the function indicated for selected keys. For instance, the inverse function key when combined with the LNx key causes the calculator to take the number $e^x$ in lieu of taking the natural logarithm of the number x. The indirect addressing key (IND, which must be used in combination with the 2ND key, of course) is used with the memory operation keys and "go to" or "conditional go to" keys (GTO, $X \times T$ or $X \geq T$) to indicate that the number following the program code does not describe either the memory used (if a memory operation) or the branching location (if a go to or conditional go to operation), but rather identifies the particular memory whose contents define either the particular memory to be used (if a memory operation) or the branch address (if a go to type instruction).

Referring again to Table III, program codes 00–09 define the ten numeral keys and the remaining program codes are defined according to the following convention. The first number thereof identifies the keyboard row in which the key is located and the second number defines the keyboard column in which the key is located, for the basic functions which may be accessed by a single key push. For functions accessed by multiple key push sequences, selected merged program codes are utilized. For instance, when the 2ND key is combined with another key to perform the operations indicated, the number 5 is added to the basic program code (without a carry) to generate the merged program code. Thus, for example, the label A is stored as a program code "11" whereas the label A', which requires the 2ND key to be actuated before the A key, is stored as program code "16". Program codes which otherwise would define those keys performing the numeral functions (eg, 0–9), are reserved for selected merged program codes or for program code not directly generated at the keyboard. For example, program codes 62, 63, 64, 72, 73, 74, 83 and 84 are used for merged program codes wherein the IND key is used. Program codes 82 and 92, which are not defined according to the foregoing convention, define a heirarchy address function and the "return" function. The "return" function has already been mentioned and the heirarchy address function is used to address the eight registers on one of the double SCOM chips, which are set aside for heirarchy control purposes. This calculator system utilizes the algebraic operating system disclosed in U.S. Patent Application Ser. No. 708,958 filed July 26, 1976, for heirarchy control purposes. The heirarchy address code (82) is followed by another program code to define the heirarchy register and operation involved or to define a conditional return, whose function will be mentioned later. The meaning of the program code following the heirarchy address code is set forth in Table IV.

The use of such codes which are not directly accessible from the keyboard permit the accomplishment to special functions or entry in to date areas which are normally isolated from the operator.

The operation code (OP) is used with a following program code for calling the special functions identified in Table V. These routines are implemented in this calculator either in microcode alone or by using second ROM addressing techniques. The second ROM area for such operation code functions is located in the constant ROM areas of double SCOM chips 12a and 12b. Approximately half of the constant ROM in double SCOM chip 12a is used for storing constants in the manner contemplated by U.S. Pat. No. 3,900,722 while the other half of that constant ROM and all of the constant ROM in double SCOM 12b is used for storing program codes, as defined in Table III, in the manner generally set forth in U.S. Patent Application Ser. No. 714,464, filed Aug. 16, 1976. The contents of the constant ROMs are listed in Table VI hereof. Eight two digit program codes are stored in each constant storage area in the constant ROMs. The codes are stored from right to left; thus the first program code in constant area sixteen is an 82. The addresses of these program codes for discussion purposes will be: Constant number hyphen one of eight locations. Thus, the address of the first program code on constant area sixteen (82) is 16–0, while the third program doce in constant area eighteen (43) is 18–2. Locations 16–0 through 24–2 contain a slope-intercept routine. The other routines in the constant ROM area are defined in Table VIa. As can be seen, the functions stored in the constant ROM areas are accessed either by OP codes or by normal keyboard entries; for example, the polar to rectangular conversion function is stored in the constant ROM areas and is accessed by depressing the P→R key on the keyboard.

The program codes in Table VI make use of the conditional return program code (82 followed by 20). The conditional return evokes a return function only when all the program codes for the accessed function have been read out. For instance, if the variance is being calculated, the conditional return stored at locations 26-2 and 26-3 is ignored so that after having found the mean according to the program codes at locations 24-3 through 29-2 is performed. The hierarchy address function (program codes 82,-) used with several routines to address the hierarchy registers in order to maximize the addressable storage area available in RAM chips 14a-14d.

STORING A KEYED-IN PROGRAM

When the operator desires to utilize his or her own program in lieu of a program stored in the first or second ROM's, he or she may do so by an appropriate key sequence for storing keyboard enterable program codes of Table III in RAMs 14a-14d. RAMs 14a-14d may also be used for storage of numeric data, i.e, the results of the calculations performed by this electronic calculator. Normally, RAMs 14a-14d provide a storage for storing 480 program codes while RAMs 14c and 14d provide 60 addressable memory locations for storing numeric data. By depressing 2ND, OP, 1, 6, the operator may determine which data configuration RAMs 14a-14d are in; in this case, the number 479.59 would be outputted. The number to the left of the decimal point is the maximum address in RAMs 14a-14d for program steps, while the number to the right is the maximum address in RAMs 14a-14d of memory registers.

By inputting a number between one and ten, 2ND, OP, 1, 7; the inputted number is used as the number of decodes of memory registers set aside in RAMs 14a-14d and the resulting configuration is displayed in the aforementioned manner. For example, inputting 7, 2ND, OP, 1, 7 results in RAMs 14a-14d being repartitioned with seventy memory registers and 400 program step locations; also 399.69 would appear in the display.

RAMs 14a-14d can store up to 120 sixteen digit words and can be partitioned to store as many as 960 program codes with no addressable memory registers to as few as 160 program codes with 100 addressable memories in this embodiment. As can be seen from FIG. 16, the addressable memory locations may be traded at the rate of 10 for 80 program step locations when repartitioning takes place. Of course, the precise number of memories as well as the range of possible data configurations is a design choice.

Figure 19:
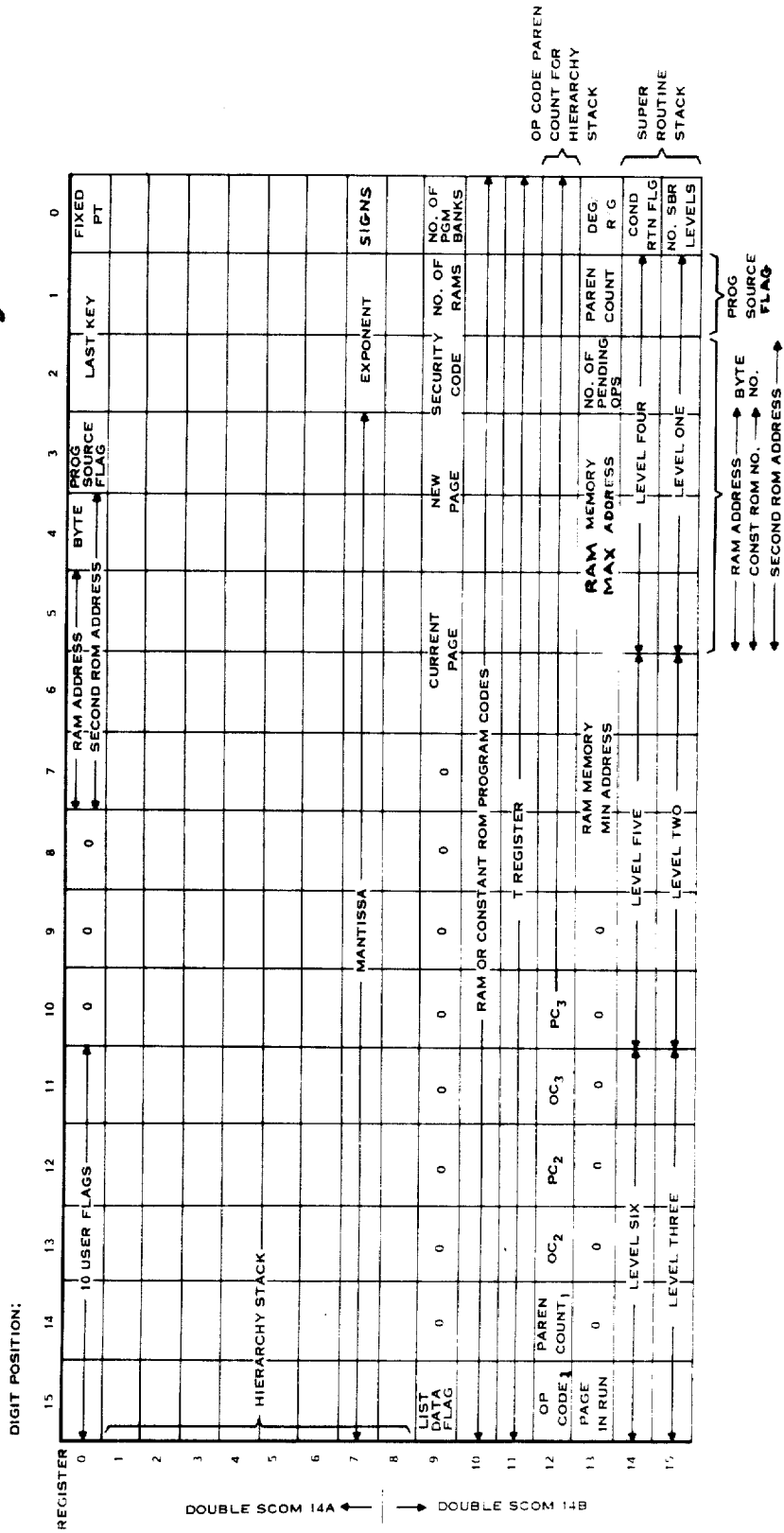
FIG. 19 is a representation of data stored in the memory registers on the double SCOM chips.

The partitioning data is stored in digits 3-8 of register 13 on double SCOM chip 14b (see FIG. 19). Digits 8-6 holds the actual address in RAMs 14a-14d defining the location of memory 00 while digits 5—5 hold the largest number assigned to a memory. Thus, in the normal 479.59 configuration, 060 is stored in digits 8-6 while 059 is stored in digits 5-3. Attempting to branch to a program location equal to or greater than the contents of digits 8-6 causes an error condition, as does addressing a memory greater than the number in digits 5-3 of register 13.

Referring again briefly to FIG. 14, the down load operational code may be utilized to permit a page in second ROM 48 to be loaded into the program code storage area of RAMs 14a-14d. The security code in the second ROM 48 to be down loaded must be a 00 to permit the down loading to occur. A 01 security code inhibits the down loading operation, thereby helping to maintain the secrecy of the programs stored in second ROM 48 should that be desired. If the security code bit is set, then the programs in the second ROM may be utilized to perform the function indicated but the series of program codes may not be read out of the calculator to the operator. After a program is down loaded into RAMs 14a-14d, the operator has free access for examining the program and altering it as he or she sees fit.

ALPHANUMERIC PRINTING OPERATIONS

Operational (OP) codes 00-07 are used for alphanumeric printing operations when the calculator of this invention includes a printer. For example, a thermal printer in combination with printing chip 18, such as that provided by the PC-100a disk unit manufactured by Texas Instruments Incorporated of Dallas, Tex. may be used. The twenty character position PC-100a printer may be utilized for printing a line of alphanumeric characters chosen by the operator by loading five two-digit character codes from the display register into four printing buffers. These two-digit alphanumeric character codes are listed in Table VII. The display register is first loaded with five two-digit codes from the keyboard, which are transferred to one of the buffers by OP01-OP04 codes; of course, each buffer stores one fourth of a line of characters.

The contents of the buffers are printed by a 2ND, OP, 0, 5 key sequence or by encountering 69, 05 program codes from either the RAMs 14a-14d or second ROM 48.

OP code 06 causes the printing of the contents of one buffer and the numeric contents of the display register. OP code 07 prints an asterisk in the column corresponding to the interger portion of the number then in the display register, provided that number is in the range of 0-19. Thus, OP code 07 is preferably used for plotting a series of answers obtained by the calculator. Of course, the range 0 to 19 is a design choice and, of course, to make better use of this plotting capability, the answers to be plotted are preferably first normalized to occur within the range 0 to 19.

DESCRIPTION OF THE SECOND ROM CHIP AND THE INTERFACE BETWEEN THE SECOND ROM CHIP AND THE OTHER CALCULATOR CHIPS

Figure 17:
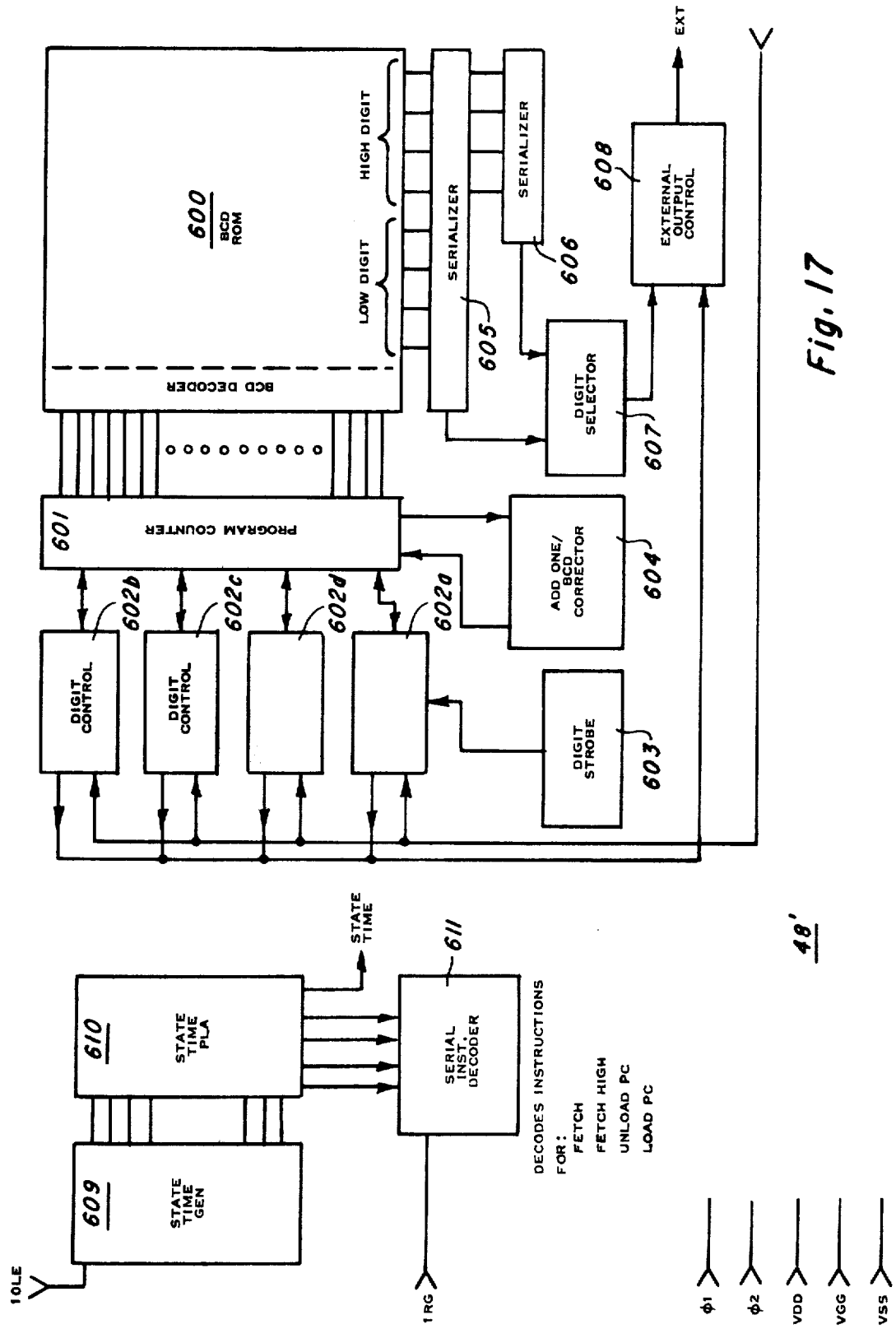
FIG. 17 is a block diagram of the second ROM chip.
Figure 18A:
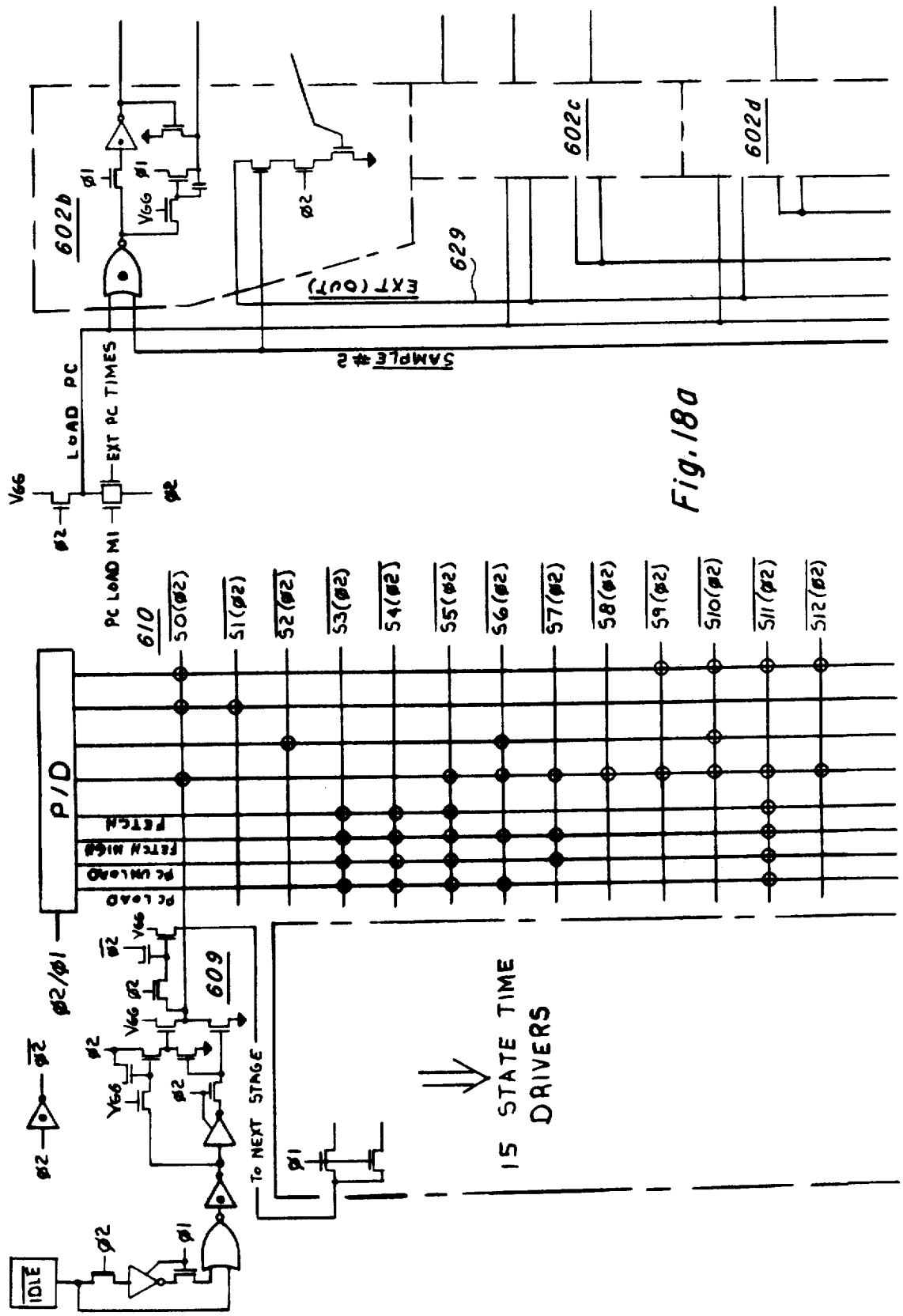
Figure 18B:
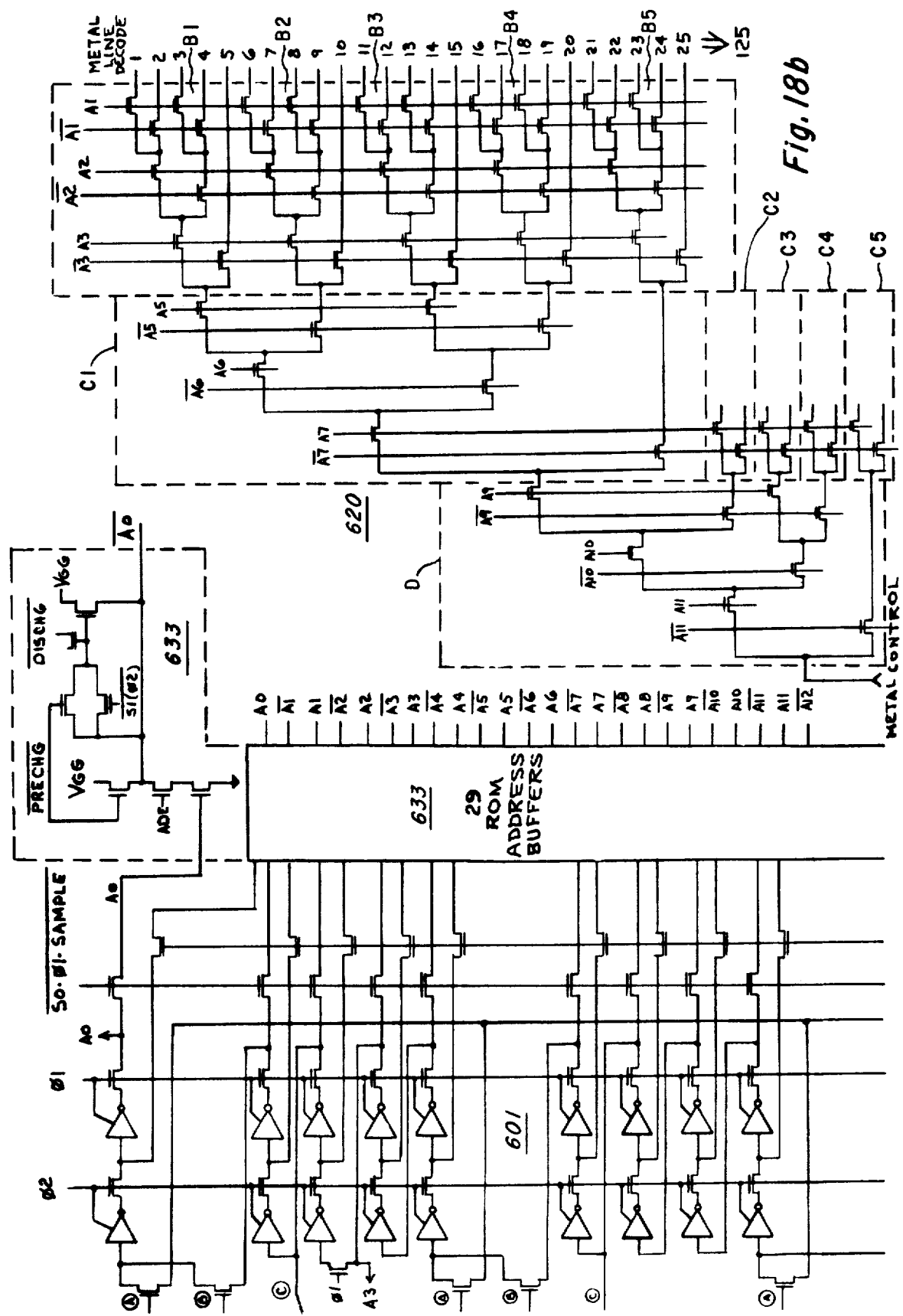
Figure 18C:
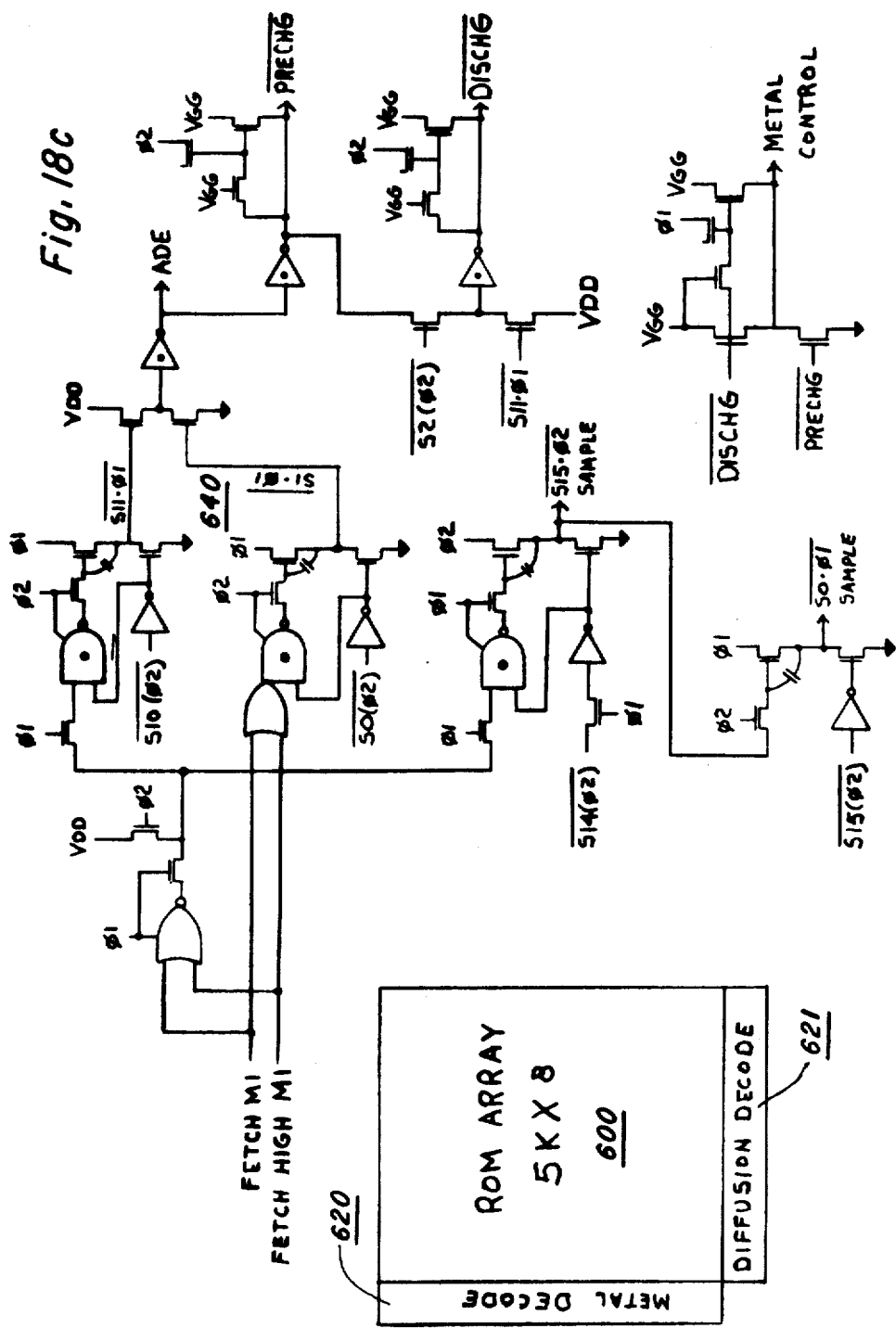
Figure 18F:
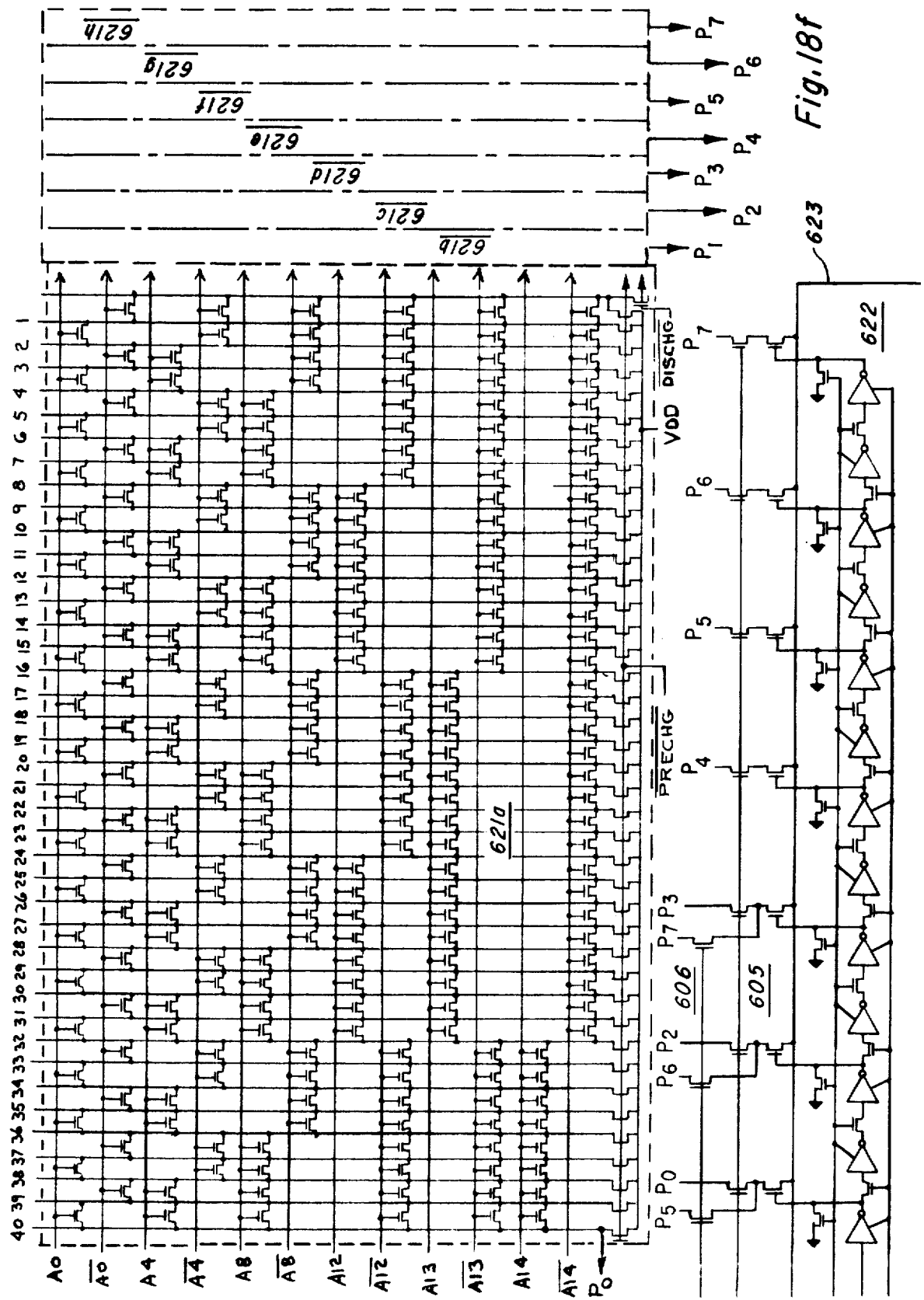
Figure 18H:
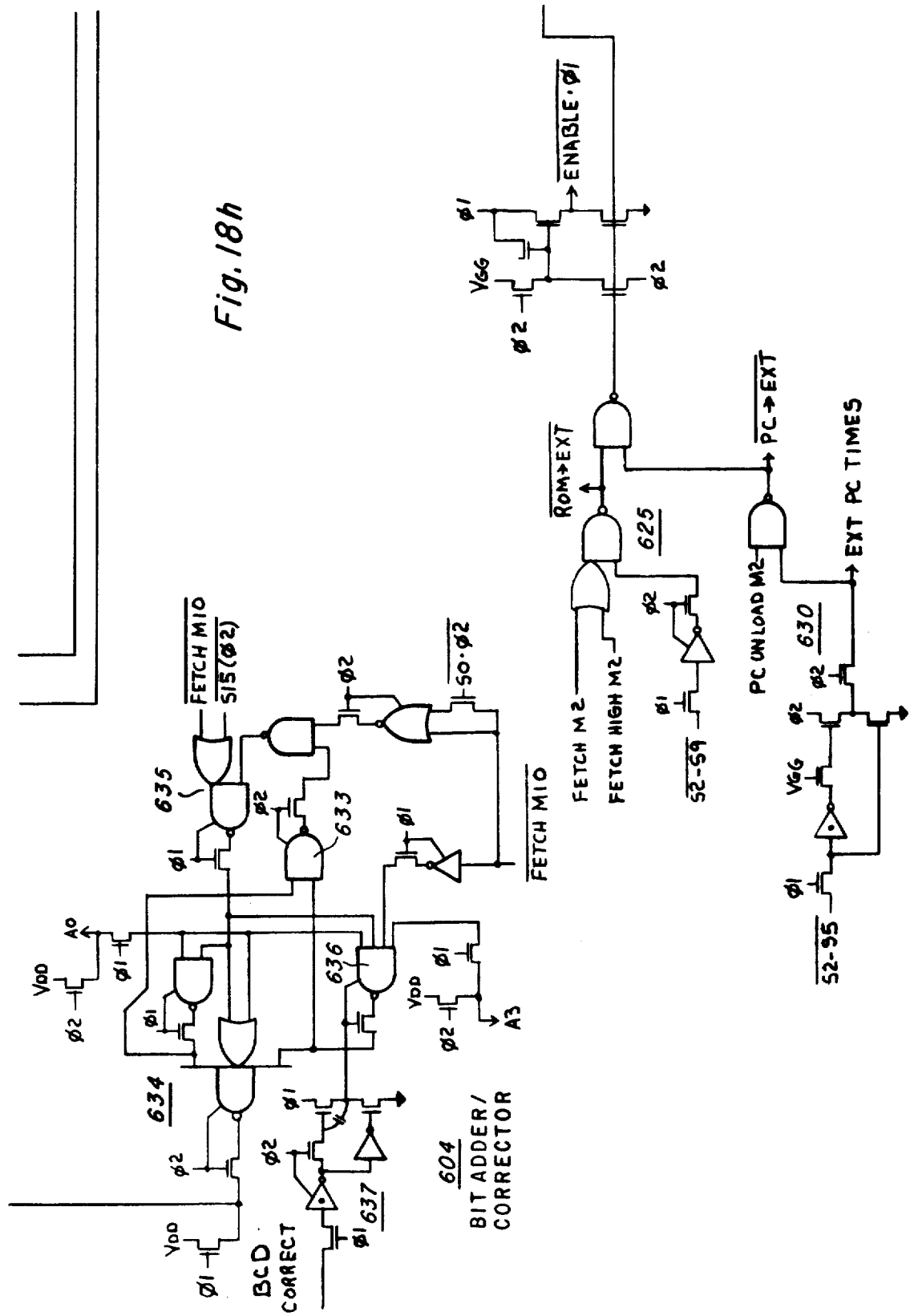
Figure 18I:
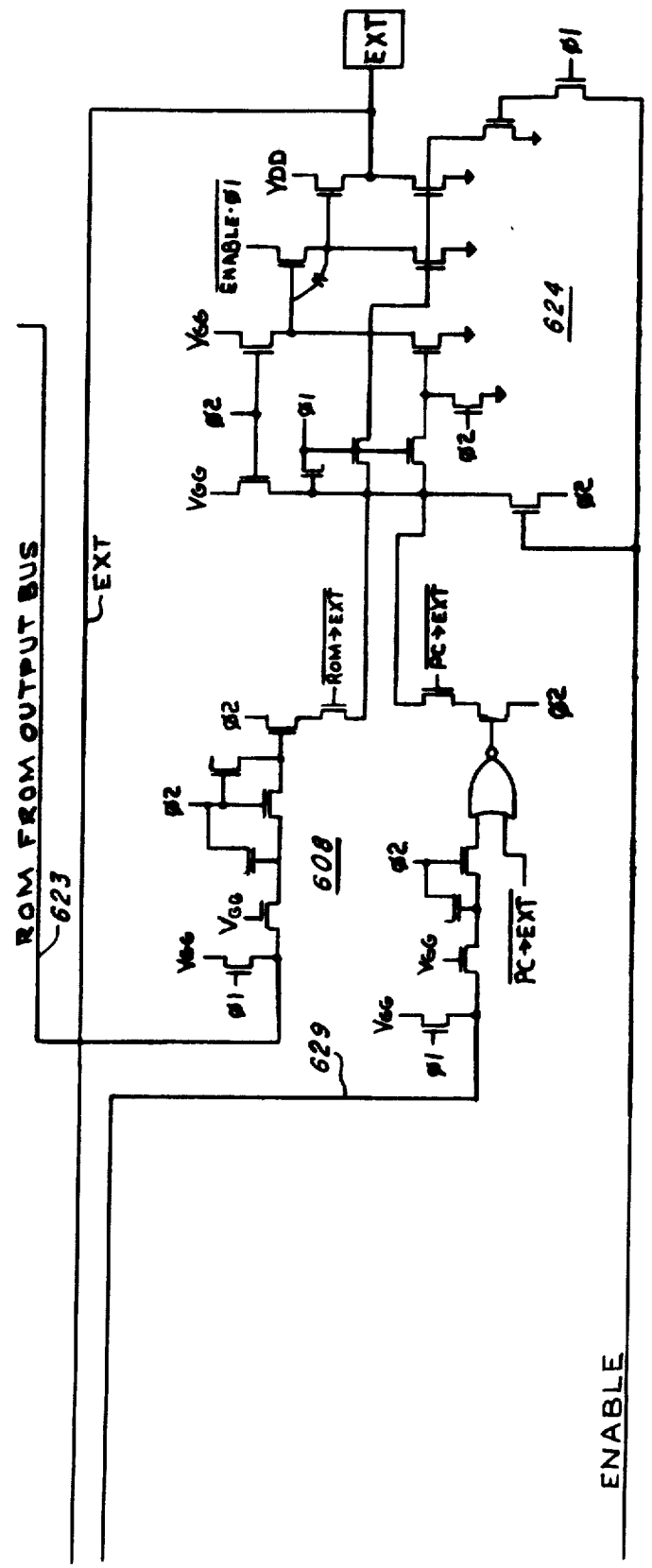

Referring now to FIG. 17, there is shown a block diagram of second ROM chip 48'. The second ROM 48 implemented thereon, is provided by binary coded decimal (BCD) ROM 600. The output of BCD ROM 600, which outputs the program codes listed in TABLE III, for instance, is connected to serializers 605 and 606. Serializer 605 converts both the high digit and low digit of the program code to serial format and supplies it to a digit selector. The serializer 606 converts only the high digit of the program code to serial and also supplies it to digit selector 607. Digit selector 607 provides the output of serializer 605 to external output control 608 in response to a decoded FETCH instruction or supplies the output of serializer 606 to external output control 608 in response to a decoded FETCH HIGH instruction.

BCD ROM 600 is addressed by an address in program counter 601. The address in program counter 601 preferably is a BCD four digit numeral. The address in program counter 601 is incremented each time a FETCH (but not a FETCH HIGH) instruction is decoded and is maintained in BCD format by an one bit/BCD corrector 604. Program counter 601 may be loaded one digit at a time with a digit appearing on External (EXT) via digit controls 602a-602d. Digit strobe 603 controls which one of the digit control 602a-602d is enabled; digit strobe 603 sequentially enables digit controls 602a–602d in response to a decoded UNLOAD PC (unload program counter) or a LOAD PC (load program counter) instruction. Digit strobe 603 is reset by a decoded FETCH instruction. The digit control 602a–602d enabled by digit strobe 603 inputs a single digit (four bits) of the four digit number from the EXT bus in response to a decoded LOAD PC instruction, the number being obtained from the bits occurring during state times S3–S6 on the EXT bus. Also, the enabled digit control 602a–602d outputs a digit from program counter 601 to the EXT bus in response to a decoded UNLOAD PC instruction.

State time generator 609 outputs an indication to state time PLA 610 of which one of the 16 possible state times of an instruction cycle the calculator is in. State time generator 609 is responsive to IDLE for maintaining the state times generated thereby in phase with state times generator on the arithmetic chip 10 or double SCOM chips 12a and 12b, for instance. State time PLA 610 outputs selected timing signals to the various logic circuits and also to serial instruction decode 611. Serial instruction decode 611 is also responsive to the serial instruction words appearing on IRG. Serial instruction decode 611 decodes the aforementioned FETCH, FETCH HIGH, UNLOAD PC and LOAD PC instructions.

External output control 608 outputs the serialized low and high program code digits or the serialized high digit alone from digit selector 607 in response to the FETCH and FETCH HIGH instruction, respectively, and outputs the digit from the enabled digit control 602a–602d in response to an UNLOAD PC instruction, the output from external output control being provided to the EXTERNAL bus.

Considering FIGS. 3a and 3b with FIG. 17, the following discussion examines the flow of data between second ROM chip 48', arithmetic chip 10 and the main ROMs 20a–20c. When a program is to be called from second ROM chip 48' according to the aformentioned 2ND, PGM, page number and label key sequence, the location 0000 is first loaded into the program 601. This may be done for instance by (1) zeroing a selected register 50a–50e, which loads the zero in register R5 65. As disclosed in the incorporated by reference U.S. Pat. No. 3,900,722, register R5 65 is automatically loaded with the least significant digit after some arithmetic operation involving the arithmetic unit and Register R5 65 may be loaded with the least significant digit in keyboard register 54 in response to a KRR5 instruction. Also the least significant digit of keyboard register 54 may be loaded with the contents of register R5 65 in response to a R5KR instruction. Now, the zero digit in register R5 65 is loaded into the least significant digit position of keyboard register 54. After having reset digit strobe with a FETCH instruction, the zero is loaded into each of the four digits of program counter 601 by four sequential LOAD PC instructions, thereby transferring the zero in the LSD of the keyboard register into all digit positions of program counter 601. Then a FETCH HIGH instruction is issued followed by a load keyboard with EXTERNAL (EXTKR) instruction for loading high digit of the program code outputted from ROM 600 into the keyboard register. The contents of keyboard register 54 is then loaded into register R5 65 and thence into a register 50a–50e using an R5→Adder instruction (FIG. 5b). This high digit may then be shifted in its register to the next more significant digit position by register shift instructions (FIG. 5b). A FETCH instruction then follows, which is followed by a EXTKR, KRR5 and R5→Adder instructions to load the low digit into the register in which the high digit had been previously loaded, thereby providing the high and low digits in one of the operational registers 50a–50e. This number may then be subtracted with the inputted page number to determine whether the inputted page number is available in ROM 600.

As can be seen, having an R5 register of a single digit length complicates the transferring of the low and high order digits of the program code into an operational register 50a–50e. It should be evident that an eight bit register R5 65 would simplify this process; the method herein described is used because register R5 in the pre-existing arithmetic chip 10 only has four bit positions. Modification to the above described instruction sequence for a calculator system having an eight bit R5 register 54 should be evident to those skilled in the art.

It should be also evident to those skilled in the art that this addressing sequence could be simplified if the I/O bus were used in lieu of EXT. Then, however, additional connections would be necessary to interface the second ROM chip 48' with the rest of the calculator system, thereby complicating the plug assembly for interfacing chip 48' with the remainder of the calculator system.

Assuming that the inputted page number is available in ROM 600, the inputted page number is multiplied by two and the resulting address is loaded one digit at a time into program counter 601 via register R5 65, keyboard register 54 and the EXT bus. As has been previously discussed, the two program codes at that location and the following location in ROM 600 are read out thereof one digit at a time using a sequence of FETCH HIGH, EXTKR, KRR5, KR→Adder, SHIFT, FETCH, EXTKR, KRR5, R5→Adder, SHIFT instructions and so forth in the manner previously set forth for four digits. At this time, the four digit address of the first program code for the inputted page number has been loaded into a selected register 50a–50e. This process is then repeated for the next two program codes, which are loaded into another register, this address defining the first program code on the page immediately following the inputted page number. The difference of these two numbers is taken and stored and the address of the program code on the inputted page is then loaded one digit at a time into program counter 601 by generally reversing the above sequence and substituting the FETCH and FETCH HIGH instructions with LOAD PC instructions, thereby loading program counter 601 with the address of the first program code on the inputted page number. The program codes are then read out sequencially and compared with the inputted label, the calculator testing for a match thereof. For each FETCH operation accomplished during this label search, the aforementioned difference is decremented by one. If the decrementing difference becomes equal to zero before a match is found, the calculator generates an error condition inasmuch as the label being searched for does not exist on the particular page inputted by the operator. Once the inputted label is detected, the outputted program codes are loaded into program counter 54 which in turn is used to address main ROMs 20a–20c when a PREG instruction is generated telling main ROMs 20a–20c to branch on the address being outputted on EXT. The microcode at that address is then read out in the usual manner to accomplish the function indicated by the outputted program code, that sequence of events taking between fifty and several thousand instruction cycles, for instance. At the end of this sequence of instructions, a flag is tested to determine whether another program code is to be read from second ROM 48, or whether a program code is to be read from the program code storage area in RAMs 14a-14c, whether a program code is to be read from the aforementiond constant ROM area in double SCOM chips 12a or 12b or whether the calculator is simply to await another keyboard input by the operator. This flag is a memory on one of the double SCOM chips; the control of which the above-mentioned elements control calculator operation will be subsequently discussed. Assuming control is to be directed back to second ROM 48, FETCH and PREG instructions will again be issued to cause the calculator to branch to the location defined by the subsequent program code in second ROM 48. This process will be repeated until a RETURN program code is loaded into keyboard register 54, and main ROM 20a-20c branches to the location defined thereby; there instructions transfer control back to normal keyboard inputs and the display is activated with the contents of register A, unless of course, the above-mentioned 2ND, PRGM, page number, label key sequence occurred as a separate chain in a user inputted program in RAMs 14a-14d, in which case, control would be then returned to the program thereat.

It has previously been indicated that after the page number has been inputted, a label search is commenced on that page by inputting an appropriate label, i.e. either the labels A-E or A'-E' or the subroutine key (SBR) combined with a non-numeric key (indicating that such key is being used as a label) or a three digit number (which is treated as a relative address, as aforementioned). It should be appreciated that data may be entered into the memories, including the display register, after the page number is inputted and before the label or relative address is inputted. In fact, many of the programs in the embodiment of second ROM 48 programmed according to Table VIII assume that the number in the display at the time the label is inputted is to be used during the execution of the program identified by the label.

Referring now briefly to FIG. 19, there is set out the utilization of the sixteen registers on the two double SCOM chips 12a and 12b. Each register can store up to sixteen digits, each of which has four bits, of course.

Registers 1-8 and 12, as well as digits 1 and 2 in register 13 are reserved for heirarchy control, although registers 1-8 may be addressed from the second ROM using the aforementioned heirarchy address program code.

Register 0 is reserved for: (1) ten user flags, (2) the RAM/Constant ROM Program Counter and Program Source Flag, (3) last key entry and (4) a fixed point display indicator. The Program Source Flag in digit 3 and the digit 15 flag in Register B 53b (FIG. 3a) define where calculator control is to be passed after the present set of instruction words from first ROM 20 are executed. If flag B 15 is set, then the calculator is under control of a program either in (1) RAM's 14a-d, (2) second ROM 48 or (3) the second ROM portion of the constant ROMs on double SCOM chips 12a or 12b. If flag B 15 is reset, the calculator is under normal keyboard control. The program Source Flag is a 0 if control is to be returned to RAM 14d-d area; a 1 through 7 of control is to be passed to second ROM chip 48'; or an 8 or 9 if control is to be passed to the constant ROM area.

Registers 14 and 15 are utilized to permit superroutining of the programs in RAMs 14a-d or in second ROM chip 48'. Thus after control passes to the element specified by the current program control flag, the stack implemented by registers 14 and 15 is popped and the location and new program control flag previously in level one thereof is inserted into digits 7-3 of register 0. Of course, when the number of superroutine levels in the stack is one or greater, as indicated by the number in digit 0 of register 15. The stack is pushed (i.e., another level of superroutining is added) when (1) a function stored in the constant ROM area (e.g. P→R) is encountered; (2) a label is encountered (e.g. A-E or A'E'); (3) a subroutine program code or key depression followed by either a three digit address or a non-numeral label address (which initiates either a branch or a label search in the element presently controlling operation and if the second ROM chip 48' is the controlling element, the label search is limited to the present page); or (4) program codes or key depressions for 2ND, PGM, and then A-E' or SBR and label (e.g. SBR X$^2$ or SBR=) or SBR and a three digit relative address (initiating either a label search on the indicated page or a branch to a specific program code on that page whose address is determined by adding the relative address to the address of the first program code on that page). As can be seen, six levels of such routines may be employed in this embodiment, with digit 0 of Register 15 indicating the number of levels actually being utilized at any given time.

Register 13 stores the addresses of the useable data storage area in RAMs 14a-d, which may be varied or reconfigured by the operator inputting appropriate OP codes, as previously mentioned. Digit 0 of register 13 contains a flag indicating whether angular results are to be provided in degrees, radians or grads.

Register 11 is used as the T register, for the comparisons made in the "conditional go to" program codes, while register 10 stores eight program codes during operations under RAM 14a-d or constant ROM control, at which time the eight programs stored in a constant area or register in RAM being accessed are temporarily stored in register 10 to simplify the extraction of the program code to be used to address first ROM 20.

Register 9 contains the old and new page numbers which allows the user to change pages easily. Register 9 also contains information about the program size, size of the RAM and also the program's security flag, which may be stored in second ROM 48, if desired, as forementioned.

Referring now to composite FIGS. 18a-18i, there is shown a detailed logic diagram of second ROM chip 48'. BCD ROM 600 is implemented as a conventional virtual ground type ROM of the type disclosed in U.S. Pat. No. 3,934,233, entitled "Read-Only-Memory For Electronic Calculator", which issued Jan. 20, 1976 and is assigned to the assignee of this invention. Decoders 620 and 621 used in addressing ROM 600 are important features of this invention which permit ROM 600 to be addressed using BCD data without wasted space within ROM 600. The decoders heretofore known in the prior art, such as those exemplified by U.S. Pat. No. 3,934,233, decode either binary, octal, or hexadecimal data, as the case may be. These decoders may be used with a ROM to decode BCD data, of course; however, in that case, large portions of the ROM would go unused inasmuch as hexadecimal numbers 11 through 16 would be decodable, but have no need to be decoded. Using the addressing scheme herein disclosed, permits the addressing of ROM 600 with BCD data without the wasted space within the ROM which would otherwise result with conventional decoders.

ROM 600 is implemented as a 5000×8 bit array for storing 5000 eight bit program codes, the addresses thereof being the BCD encoded numerals 0000–4999. These four numerals are stored in program counter 601. Decoders 620 and 621 are able to decode these 5000 addresses without decoding the non-BCD codes often seen in the binary data contained in a register such as program counter 601. As will be seen, the ROM metal line decoder 620 uniquely decodes the one of 125 metal lines while the ROM difusion line decoder 621 decodes one out of forty difusion lines for each bit in a program code. Inasmuch as 125×40 equals 5000, 5000 program codes in ROM 600 will be uniquely identified by metal decoder 620 and difusion decoder 621.

Metal decoder 620 comprises a plurality of one of five decoders. These one of five decoders are provided in a three level cascaded arrangement inashuch as 5×5×5 equals 125. Referring to dashed lines B1-B5, it can be seen that the dashed line B1 encompasses a one of five decoder, as do references dashed lines B2-B5. The inputs of one of five decoders B1-B5 are connected to the outputs of one of five decoder C1, all of which are used to perform a one out of twenty-five decode. One of five decoders C2-C5 are identical to one of five decoders B1-B5. The five outputs from one of five decoders C2-C5 are each coupled to one of five decoders like B1-B5 (not shown) for providing the decoding of metal lines 26-125. The inputs of one of five decoders C1-C5 are connected to the output of a third level one of five decoder identified by a reference line D. The B level decoders (e.g. B1-B5) are responsive to the A1-A3 bits outputted from program counter 601, while the C level decoders are responsive to the A7-A5 bits and the D level decoder is responsive to the A9-A11 bits from program counter 601. The remaining bits, (e.g. A0, A4, A8, A12, A13, and A14) are decoded by diffusion decoder 621, for providing a one out of forty decode. Diffusion decoder 621 is divided into eight sections 621a-621h for addressing the eight bits of the addressed program code. As can be seen decoder section 621a has one output line (P$_o$) one ground line and 39 intermediate diffusions, inasmuch as ROM 600 is of the virtual ground type. Decoder sections 621b-621h are identical to section 621a, but output the P$_1$-P$_7$ bits of the program code.

It should be evident that decoder 621 performs a one out of two decode for address lines A0, A4 and A8 and performs a one out of five decode for address lines A12-A14. It should be evident to one skilled in the art, moreover, that other configurations of decoders 620 and 621 could be utilized. For instance, metal decoder 620 could be arranged to perform a one out of 250 decode by doubling the size of that decoder and adding a one out of two decoder of line A$_0$, for instance, in front of the D level decoders, while diffusion decoder 621 would perform a one of twenty decode by deleting the A$_0$ address line 0 and collapsing the size thereof by deleting the odd numbered diffusion lines.

It should further be evident to those skilled in the art that similar BCD only addressing schemes may be used with other sizes of ROMs. For instance, a 7000 word ROM may be BCD addressed with an one out of 250 metal decoder (2×5×5×5) and an one out of twenty-eight difusion decoder (2×2×7). As can be seen; the numbers in the parenthesis are the prime number factors of 7000.

Diffusion decoders sections 621a-621h output the P$_0$-P$_7$ bits of the program, respectively. The P$_0$-P$_7$ bits are outputted serially on external during state times S$_3$-S$_{10}$ in response to a decoded FETCH instruction while bits P$_4$-P$_7$ are to be outputted serially on external during S$_3$-S$_6$ in response to decoder FETCH HIGH instruction, as aforementioned. The P$_0$-P$_7$ bits from decoder 621 are connected to bus 623 when strobed by shift register 622 beginning at S2$\phi$2 for the P$_0$ bit and when enabled by logic 607a in response to a decoded FETCH instruction. Bits P$_4$-P$_7$ are conducted to bus 623 starting at state time S2$\phi$2 when strobed by shift register 622 provided logic 607b receives a FETCH HIGH command. Bus 623 is coupled to the EXT line via external output buffer 624 when enabled by external output control 608. Control 608, in combination with logic 625, couples bus 623 to buffer 624 in response to either a FETCH or FETCH HIGH command. The data on bus 623 is one-half bit early due to a one-half bit delay in buffer 624.

Program counter 601 is provided by a 15½ bit shift register, comprising thirty-one inverters. The other half bit a delay occurs in the one bit adder/BCD corrector 604, thereby providing sixteen bits of storage for storing four BCD numerals. The least significant digit in program counter 601 is loadable from a four bit serial numeral appearing on EXT during state times S$_3$-S$_6$ via digit control 602a in response to a LOAD PC command. As can be seen from FIG. 18, digit control 602a inserts a new digit in the least significant digit position in program counter 601 by coupling the data on EXT to inverter 626 and open-circuiting transfer gate 627 connecting inverter 628 to inverter 626. Inverters 626 and 628 are two of the thirty-one inverters in program counter 601. Digit control 602a also outputs to bus 629 serial data stored in program counter 601 when enabled by digit strobe 603, the digit appearing on line 629 being one-half bit early compared to the time at which it will be outputted on EXT in response to a decoded UNLOAD PC instruction.

Digit controls 602b-602d are identical to digit control 602a, except that they are connected to program counter 601 at appropriate places in the shift register therein to interface with the next to the least significant digit through most significant digit positions during the S$_3$-S$_6$ state time period. Bus 629 is connected to external output control 608 which functions in combination with logic 630 for conducting the BCD digit outputted from the enabled digit control 602a-602d through to EXT during S$_3$-S$_6$ in response to a decoded UNLOAD PC instruction. Bus 629 is one-half bit early compared to the data on EXT, because of the one-half bit delay associated with output buffer 624.

Digit strobe 603 is comprised of a four bit ring shift register counter for sequentially enabling one of the digit controls 602a-602d. Shift register 603 advances in response to a LOAD PC or UNLOAD PC command by logic 631; shift register 603 for enabling the LSD digit decoder 602a in response to a decoded FETCH instruction by a logic 632.

The four digit BCD number stored in program counter 601 shifts through program counter 601 and from the output thereof back to the input thereof via the one bit adder/BCD corrector 604 each instruction cycle. The contents of shift register 601 is coupled to thirty ROM address buffers 633 during $S_{15}.\phi2$ through $S_0.\phi1$. The output of the thirty address buffers 633 provide the $A_0$-$A_{14}$ and $\overline{A_0}$-$\overline{A_{14}}$ outputs to the metal decoder 620 and difusion decoder 621. Only fifteen stages of the shift register in program counter 601 are outputted to ROM 600 via buffers 633 and decoders 620 and 621, inasmuch as the most significant bit of the most significant digit in program counter 601 need not be decoded when the largest address is 4999. It should be evident to one trained in the art, however, to utilize the outputs of all stages and to increase the size of the aforementioned decoder 620 or 621 to accomodate extra address lines for using larger addresses than 4999.

One bit adder/BCD corrector 604 is a single bit, serial adder that adds one to the stream of for BCD digits circulating through it from program counter 601 in response to a decoded FETCH instruction. During NON-FETCH (including FETCH HIGH) instuctions, the four BCD digits circulate through one bit adder/BCD corrector 604 without the add one operation being performed. The one bit adder/BCD corrector 604 does a "look ahead" at the serial stream of data exiting from program counter 601 in order to determine if BCD correction is necessary when an add one operation is to be accomplished. When corrector 604 receives the least significant bit of a digit, it is also provided with the most significant bit of that digit for the "look ahead" operation. Corrector 604 is also provided with a clock signal, BCD CORRECT, for indicating to corrector 604 when the least significant bit of a digit is being received thereby. If during this time period the least significant digit is being inputted and a FETCH instruction has been decoded, one will be simply added to the least significant digit unless the first and last bits of that digit are both a logical one, (i.e., a decimal nine has been outputted), then in lieu of adding one, which would form the illegal BCD code 1010, a 0000 is outputted from corrector 604 in the corresponding four state times and an add one operation is accomplished on the next more significant digit via carry circuit 633 in corrector 604. Should that digit contain a nine, the above operation repeats and, if not, a one is added to that digit.

In one bit adder/BCD corrector 604, adder gates 634 perform the add operation when a one is outputted from add one insertion gate 635 unless inhibited by gate 636. Gate 635 is responsive to a decoded FETCH instruction and state time $S_{15}\phi2$ for inserting a logical one into adder 634 in the least significant bit of the least significant digit or for inserting a one in the least significant bit when enabled by carry circuit 633. Gate 636 is responsive to a decoded FETCH instruction, the $A_0$ and $A_3$ bits from program counter 601 and the output of gate 635 for generating four logical zeros when a BCD nine is to be incremented during a FETCH instruction. Gate 636 is enabled by timing signal BCD correct at $S_4\phi1$, $S_8\phi1$, $S_{12}\phi1$ and $S_0\phi1$, the BCD correct signal being delayed 1½ state times by a logic 637. Thus once gate 636 outputs a logical zero disabling the output from adder 634, that condition remains for four state times until the BCD correct signal is again generated from PLA 610. Carry circuit 633 is responsive to adder 634 for generating carries within a digit and to gate 636 for generating carries between digits.

The state time generator 609 comprises sixteen state time drivers, the first of which is responsive to a timing signal on $\overline{IDLE}$ for sequencing the state times generated thereby with the state times generated on the other chips in the calculator system. The outputs from the sixteen state time drivers are supplied to a PLA 610 for providing various timing signals used, for instance, for outputting the program code during S3–S10, receiving and outputting single digit addresses during S3–S6 and the like. PLA 610 also outputs in serial fashion four serial trains of digits mimicking the LOAD PC, UNLOAD PC, FETCH HIGH and FETCH instructions which are outputted from main ROM 20a–20c or IRG. Of course, IRG also transmits many instructions which are not decoded on chip 48'.

These four serial bit trains are supplied to four serial instruction decoder circuits E1-E4 in decoder 611, along with the instruction words appearing on IRG. Each decoder in serial instruction decoder 611 performs an exclusive OR function on the data from IRG and one of the bit trains from PLA 610. If the exclusive OR function is satisfied for all bit positions of the instruction word (indicating that there was a match between the instruction word outputted and the bit train from PLA 610), then either a LOAD PC, UNLOAD PC, FETCH HIGH or FETCH instruction has been decoded, depending, of course, on which bit train is provided to the particular decoder for which the exclusive OR function was satisfied. Cross-coupled gates 638 perform exclusive OR function and discharge NODE 639 when a mismatch occurs anytime during the exclusive OR operation. The decoder circuitry encompassed by reference lines E2-E4.

It should be remembered that in the calculator system disclosed, an instruction is normally decoded during one instruction cycle and performed during the following instruction cycle. Inasmuch as the UNLOAD PC, FETCH HIGH AND FETCH operations output data on EXT and considering that the keyboard register 54 in arithmetic chip 10 must be sensitized to input this data by a EXTKR instruction, the data to appear on EXT from chip 48' must appear one instruction cycle later than the normal instruction cycle for executing decoded instructions. That is, the FETCH, FETCH HIGH and UNLOAD PC instructions result in data being outputted on external during the second instruction cycle following decoding. ROM 600 is a relatively large ROM, so for FETCH, or FETCH HIGH instructions the precharge cycle begins during the beginning of the instruction cycle immediately following the decoding of the instruction (by the FETCH M1 and FETCH HIGH M1 signals) whereas the conditional discharge occurs about one instruction cycle later. Thus ROM percharge circuitry 640 is responsive to FETCH M1 and FETCH HIGH M1 whereas the logic 625, 607a, 607b, add one/BCD corrector 604, logic 632 and the like are sensitized to delayed FETCH instructions FETCH M2 or FETCH $\overline{\text{M10}}$.

I have described my invention in connection with certain specific embodiments thereof. It is to be understood that modification may now suggest itself to those skilled in the art and that this invention is not limited to the specific embodiment disclosed, except as set forth in the appended claims.

TABLE IIa

| HEX ADDRESS | CHIP | INSTRUCTION WORDS→ | | | | | | | | | | | | | | |
|---|---|---|---|---|---|---|---|---|---|---|---|---|---|---|---|---|
| 0000 | TMC5A2 | 0A01 | 0A0A | 00B9 | 03DC | 01DA | 0A4B | 1002 | 0121 | 0A0F | 0101 | 032C | 1809 | 0A02 | 01D7 | 1FCF | 0A77 | 0085 |
| 0011 | TMC5A2 | 1A60 | 1CAC | 1FD9 | 1FCA | 1FFC | 1D2C | 1FA4 | 1CF2 | 1FE2 | 0AB7 | 1A20 | 0AC7 | 1A1B | 0A07 | 1818 | 0A77 | 1HDE |
| 0022 | TMC5A2 | 1CAB | 1CAE | 1815 | 19D6 | 147F | 1AB2 | 1AA6 | 1AA6 | 0A57 | 0095 | 1A2A | 0AA7 | 19C4 | 0ADC | 0AC7 | 1A9E | 1BA2 |
| 0033 | TMC5A2 | 1A27 | 1A31 | 19F0 | 1A5C | 1A60 | 1A64 | 1DBE | 0CD2 | 0213 | 0007 | 008B | 1F34 | 1636 | 00B1 | 1AE0 | 1EEE | 1B1A |
| 0044 | TMC5A2 | 1B62 | 1A36 | 1A3A | 1A3F | 1A42 | 00F0 | 1AB2 | 0023 | 002A | 0058 | 1520 | 1DEB | 0A07 | 197C | 1F94 | 1A4D | 1900 |
| 0055 | TMC5A2 | 0011 | 19CB | 0011 | 1B90 | 0A97 | 1A5F | 0111 | 0A0F | 0121 | 01D5 | 1BAC | 0A27 | 1AA3 | 1C0E | 1F14 | 1C1F | 1C1A |
| 0066 | TMC5A2 | 1C49 | 1F18 | 190C | 1FFC | 0A47 | 1A97 | 090B | 1984 | 0AD7 | 1944 | 0AE7 | 1A1C | 1BEA | 1FDE | 1C20 | 1C9E | 1B0D |
| 0077 | TMC5A2 | 1A0E | 1BF0 | 0437 | 1C66 | 00A0 | 0022 | 002A | 1B6C | 0AE7 | 1B1C | 1B32 | 1B5C | 1BB5 | 1B37 | 1BC6 | 1FD4 |
| 0088 | TMC5A2 | 19D4 | 1FFC | 0A07 | 1AF7 | 0CD2 | 0213 | 0007 | 00BB | 1F7A | 167A | 1FFF | 1B34 | 1BED | 1A28 | 1BEE | 19D6 | 1F70 |
| 0099 | TMC5A2 | 0041 | 1B36 | 0AB7 | 0080 | 1AE4 | 0AB7 | 1AE0 | 0A27 | 193F | 1DFA | 1BC7 | 1E94 | 1A37 | 1C12 | 1FF4 | 1FF6 | 0A10 |
| 00AA | TMC5A2 | 0AFB | 1B14 | 0049 | 0051 | 0A77 | 1E7A | 00C1 | 00B0 | 0A07 | 1BB4 | 0A37 | 1FBC | 1FCC | 1A74 | 1FF6 | 1FC0 | 1EC9 |
| 00BB | TMC5A2 | 1FF4 | 1AB4 | 1FBB | 1FBC | 1FE0 | 1AB0 | 1FB0 | 1FB4 | 1934 | 1D2A | 1934 | 1EAC | 1B99 | 1E0B | 192C | 1E44 | 1990 |
| 00CC | TMC5A2 | 193H | 1F9E | 1A46 | 1FCA | 1F9B | 1BA9 | 1E94 | 1BF6 | 1F90 | 1A32 | 1F4B | 1EBA | 1FFB | 1BFB | 1901 | 1FFE | 1F80 |
| 00DD | TMC5A2 | 1FDE | 0051 | 1BF4 | 1E7B | 1FD6 | 1BF6 | 1BAF | 1FFC | 1F6F | 1FCC | 1BDC | 1FDA | 1E66 | 18FD | 1E62 | 1FC0 | 1FB9 |
| 00EE | TMC5A2 | 1E5C | 1BBF | 1E5B | 146B | 1F70 | 1E52 | 19FA | 1BC0 | 1FBA | 1DF6 | 1A36 | 1F40 | 1F44 | 1FA2 | 1FD0 | 1987 | 1FCE |
| 00FF | TMC5A2 | 1AF7 | 1FCA | 1E36 | 1F94 | 1FFB | 1BA2 | 1CD6 | 10D8 | 1A2A | 1F4E | 1B14 | 1F4A | 194C | 1E20 | 1B00 | 1F42 | 1AF4 |
| 0110 | TMC5A2 | 0AB7 | 0058 | 1206 | 0080 | 0052 | 16FC | 005B | 1B06 | 005A | 0049 | 0069 | 0A97 | 02F3 | 02B9 | 1C4A | 0202 | 0ED3 |
| 0121 | TMC5A2 | 005B | 0300 | 0409 | 1007 | 0202 | 095B | 09B9 | 1C36 | 00AB | 1368 | 00F1 | 1B64 | 0AD7 | 02F3 | 01D5 | 0111 | 0A1F |
| 0132 | TMC5A2 | 01D4 | 0064 | 0724 | 06B3 | 0619 | 11B9 | 0099 | 1987 | 0A67 | 1B0A | 0AA7 | 0080 | 1B04 | 0011 | 0091 | 0065 | 0065 |
| 0143 | TMC5A2 | 0A1B | 0015 | 0100 | 00D3 | 0300 | 0101 | 0A1F | 06D3 | 0060 | 0658 | 0709 | 1094 | 0099 | 070B | 0121 | 0A1F | 01D0 |
| 0154 | TMC5A2 | 014B | 02F3 | 014B | 0121 | 0A0F | 0101 | 0153 | 095B | 1B7E | 0A27 | 1BAC | 0014 | 01D7 | 01D2 | 1B72 | 0A04 | 0A0A |
| 0165 | TMC5A2 | 0A04 | 0A04 | 0A04 | 0A04 | 0A04 | 0A04 | 0A04 | 00DB | 00DB | 1B5A | 0A0B | 0095 | 1A0F | 00A0 | 0AC7 | 1A12 | 005A |
| 0176 | TMC5A2 | 0052 | 00B0 | 1210 | 0A37 | 01F3 | 0153 | 0437 | 1DDA | 0A47 | 0095 | 0085 | 1B7F | 02DB | 0AE7 | 02F4 | 0131 | 0A1F |
| 0187 | TMC5A2 | 0CD3 | 0131 | 0A0F | 0111 | 0A77 | 01F3 | 00B0 | 15D2 | 0A67 | 06F3 | 0153 | 1DB2 | 0AA7 | 09F3 | 0060 | 1E72 | 0300 |
| 0198 | TMC5A2 | 0101 | 0A1F | 06D3 | 065B | 0709 | 105B | 04D4 | 0121 | 0A1F | 01D0 | 015B | 0289 | 0153 | 1048 | 0C4B | 09F0 | 09B9 |
| 01A9 | TMC5A2 | 1046 | 065B | 070B | 0104 | 09D2 | 01D7 | 0121 | 0A1F | 01D0 | 014B | 0121 | 0A0F | 0101 | 015B | 0911 | 02F0 |
| 01BA | TMC5A2 | 02F3 | 0A0D | 0A0C | 0085 | 0045 | 02B0 | 0A1B | 015B | 0111 | 0A1F | 01D3 | 000F | 0014 | 0120 | 1A12 | 0DB0 | 09B9 |
| 01CB | TMC5A2 | 1B5B | 065B | 014B | 0AB7 | 02F3 | 02B9 | 1DFE | 0066 | 0300 | 0A06 | 02F4 | 0101 | 0A0F | 0121 | 04D4 | 0121 | 0A1F |
| 01DC | TMC5A2 | 01D0 | 0140 | 0911 | 02F0 | 0140 | 0651 | 02F0 | 0121 | 0A1F | 01D0 | 0700 | 0640 | 0A80 |
| 01ED | TMC5A2 | 1B34 | 01DE | 0080 | 1522 | 00BA | 00DB | 15B2 | 01D7 | 0A07 | 186C | 015B | 030B | 1006 | 0140 | 0603 | 0AD7 | 02F3 |
| 01FE | TMC5A2 | 0111 | 0A1F | 01D0 | 0610 | 0919 | 100B | 0648 | 0709 | 1BD7 | 0111 | 0A0F | 0101 | 1DBE | 0A27 | 0080 | 1A04 | 0457 |
| 020F | TMC5A2 | 0085 | 00E5 | 00C5 | 199F | 0D09 | 100C | 1BDC | 00D9 | 1A00 | 00A9 | 00D9 | 07DA | 01D7 | 0201 | 0007 | 04D0 |
| 0220 | TMC5A2 | 1B24 | 0090 | 0092 | 1B04 | 00B3 | 01D7 | 0001 | 0A27 | 00DB | 00DB | 1B04 | 0437 | 00C9 | 01F0 | 0AF0 | 0140 | 0107 |
| 0231 | TMC5A2 | 0072 | 00AB | 17BB | 00BF | 0051 | 005B | 1BDA | 005A | 00C6 | 003B | 0120 | 0009 | 1104 | 0709 | 1B04 | 0032 | 030A |
| 0242 | TMC5A2 | 0409 | 1B1B | 0300 | 1B04 | 0300 | 0E09 | 1B14 | 0940 | 0409 | 100B | 0F09 | 1BFA | 0090 | 0030 | 1010 | 1B06 | 0030 |
| 0253 | TMC5A2 | 1B04 | 070B | 1B2F | 0A0B | 0033 | 0700 | 1B37 | 00F0 | 1004 | 0099 | 0030 | 1B0B | 0ED0 | 070B | 10C2 | 0FDB | 1BBF |
| 0264 | TMC5A2 | 0041 | 1BB1 | 0091 | 00B3 | 0C93 | 006F | 00AB | 1750 | 0049 | 0058 | 10F0 | 1AA9 | 0A67 | 19F5 | 00B1 | 0A17 | 00AB |
| 0275 | TMC5A2 | 1B6A | 00B5 | 00F5 | 00D5 | 1AD1 | 0AE7 | 1C41 | 0AA7 | 0049 | 0051 | 1A0D | 03D3 | 0A47 | 06F3 | 1A11 | 00A2 | 1C1A |
| 0286 | TMC5A2 | 0AF7 | 0058 | 1017 | 0051 | 1A40 | 0033 | 1AA4 | 0A17 | 1AF0 | 00A0 | 0049 | 0A1F | 01D6 | 09DE | 0089 | 0A0F | 0131 |
| 0297 | TMC5A2 | 0AF7 | 02F3 | 0111 | 0A0F | 0A97 | 02F3 | 0111 | 0A1F | 01D6 | 09DE | 0111 | 0A0F | 0131 | 00AB | 00AA | 10E3 | 00A0 |
| 02A8 | TMC5A2 | 1B04 | 0A4B | 00B2 | 1AB3 | 0A07 | 0095 | 1D30 | 02DF | 1BEA | 00D0 | 0091 | 1AFF | 00FA | 00FA | 1A05 | 0030 |
| 02B9 | TMC5A2 | 113B | 06B4 | 12BC | 00D9 | 1950 | 114B | 01DB | 0022 | 0032 | 0058 | 04D0 | 100B | 0104 | 002E | 003F | 00A4 | 00E2 |
| 02CA | TMC5A2 | 0A0C | 00B5 | 0A0D | 0050 | 00A0 | 14FA | 005A | 0015 | 0A0D | 0A27 | 1BBD | 0120 | 0A16 | 02F0 | 0103 | 0091 | 1BB0 |
| 02DB | TMC5A2 | 0640 | 065B | 0AB0 | 00D4 | 17B4 | 00F8 | 007B | 00D0 | 0A1B | 1008 | 0709 | 0A37 | 1014 | 0FD6 |
| 02EC | TMC5A2 | 0030 | 0A77 | 1B04 | 0A47 | 0AF3 | 0A1B | 1002 | 0A57 | 02F3 | 0283 | 0020 | 0A37 | 1B04 | 0AA7 | 09F3 | 02D6 | 0A27 |
| 02FD | TMC5A2 | 02F0 | 0C76 | 0953 | 0300 | 0409 | 1B06 | 02B9 | 100D | 0230 | 00AB | 00AA | 1004 | 0082 | 09B9 | 15FF | 0953 | 0976 |
| 030E | TMC5A2 | 1B09 | 0100 | 0100 | 0100 | 0100 | 0100 | 0100 | 0100 | 0100 | 00A9 | 00F2 | 00B5 | 00CA | 1754 | 00AF | 15B2 |
| 031F | TMC5A2 | 005B | 1BDB | 0BD1 | 0A02 | 005A | 0AB5 | 103C | 0A0B | 0EF3 | 0651 | 00F0 | 109F | 005B | 005B | 00B9 | 0AA7 | 02F3 |
| 0330 | TMC5A2 | 0030 | 1006 | 0709 | 100A | 095B | 095B | 0AA7 | 02F3 | 09B9 | 1B14 | 0289 | 1A10 | 00AB | 1B04 | 0300 | 0940 | 090B |
| 0341 | TMC5A2 | 0C53 | 09B0 | 00DA | 1532 | 1BC7 | 00C3 | 00A9 | 0CC0 | 00A0 | 0092 | 0011 | 0133 | 000F | 1B04 | 0011 | 00B0 | 1BAB | 0FD3 | 00DA |
| 0352 | TMC5A2 | 0034 | 0090 | 1AAB | 0CD2 | 0A24 | 0034 | 0010 | 1B04 | 0023 | 0012 | 003C | 194B | 06BC | 1015 | 0030 | 1AAB | 0CD2 |
| 0363 | TMC5A2 | 0024 | 0034 | 072C | 1006 | 095B | 1B07 | 01DC | 002C | 11BC | 09B9 | 1017 | 09BB | 1950 | 0022 | 00B0 | 1F50 | 0021 |
| 0374 | TMC5A2 | 1F4F | 01DB | 0A8B | 0A97 | 02F3 | 09F0 | 0300 | 0AFB | 0101 | 0101 | 02DB | 0AFB | 0101 | 0CD3 | 0A27 | 02F0 | 0CF6 |
| 0385 | TMC5A2 | 0AFB | 01D1 | 0AA7 | 01F4 | 0306 | 09A4 | 0140 | 0144 | 016A | 1A14 | 0C19 | 0923 | 0130 | 1B06 | 01B6 | 0990 |
| 0396 | TMC5A2 | 0111 | 0ABF | 0131 | 0AB7 | 02F0 | 0D2C | 0101 | 0ABF | 0121 | 00A0 | 1B04 | 0AAB | 0AD7 | 01F0 | 0101 | 0A1F | 01D3 |
| 03A7 | TMC5A2 | 06DB | 0101 | 0ABF | 0111 | 01DC | 0074 | 00D4 | 00A4 | 00B0 | 0ACA | 0074 | 00D4 | 00A4 | 00B4 | 0ABC | 0A0D | 0ADC |
| 03BB | TMC5A2 | 0069 | 0058 | 00AA | 1ABB | 0B59 | 00AA | 11BB | 00E1 | 00C3 | 00C0 | 0092 | 0011 | 0133 | 000F | 1BAB | 0CD2 | 00A2 |
| 03C9 | TMC5A2 | 0034 | 0090 | 13E4 | 0010 | 1BB2 | 0013 | 0D09 | 1B7A | 09A9 | 0026 | 1ABA | 0099 | 0022 | 0ED0 | 1902 | 00AB | 00AA |
| 03DA | TMC5A2 | 0092 | 009A | 000A | 00D2 | 00A2 | 1628 | 00B9 | 0168 | 0007 | 0042 | 0AD0 | 00DB | 005A | 1365 | 1A7D | 00A0 | 17AU |
| 03EB | TMC5A2 | 0A47 | 0095 | 1BBD | 0073 | 1B0B | 0AA7 | 1B0B | 1FD6 | 0A0A | 00DB | 1B17 | 0001 | 1B1B | 03AB | 1608 | 00D9 | 0A97 |
| 03FC | TMC5A2 | 02F3 | 0111 | 0A1F | 01D3 |
| 040D | TMC5A2 | 0219 | 1B39 | 065B | 0619 | 103F | 00DB | 1B5D | 006E | 0042 | 1FB0 | 1FC0 | 0457 | 1B31 | 0033 | 0114 | 0903 | 002C |
| 0411 | TMC5A2 | 0022 | 1004 | 0021 | 003C | 1B1E | 06B0 | 1B20 | 0041 | 00CB | 13BD | 0A00 | 0A04 | 0A0D | 0040 | 1BD3 | 0042 | 1BBF |
| 0422 | TMC5A2 | 0033 | 06D2 | 0AB9 | 1007 | 06BB | 09DB | 06DC | 0D29 | 1016 | 0010 | 1B36 | 06DB | 1B04 | 00D0 | 0C9C | 1B05 | 0C94 |
| 0433 | TMC5A2 | 1F12 | 0E09 | 0012 | 183B | 0C5B | 09A0 | 00D9 | 0A16 | 1B19 | 006C | 0D29 | 1A40 | 0CD2 | 0F0A | 1B0A | 0953 |
| 0444 | TMC5A2 | 0300 | 009A | 094B | 052C | 1017 | 09B0 | 1B07 | 09AB | 005B | 0ED0 | 030B | 1B11 | 0B85 | 0051 | 01DB | 0AA7 | 0A1B |
| 0455 | TMC5A2 | 0022 | 0CCB | 005A | 1F74 | 0AB0 | 0A09 | 13CC | 0A01 | 00B1 | 0ADC | 0AB7 | 0DBE | 1F4A | 00B0 | 10CB | 0A47 | 02F3 |
| 0466 | TMC5A2 | 0AB7 | 06F3 | 0153 | 0A27 | 09F3 | 0153 | 01D7 | 0150 | 01D7 | 0AB7 | 1B09 | 00B0 | 1046 | 0A27 | 01F3 | 0A27 | 06F3 |
| 0477 | TMC5A2 | 0153 | 05D3 | 1B1C | 01D7 | 02DE | 0500 | 1006 | 02F0 | 030B | 01D7 | 02DB | 0A1F | 0CDA | 0A0F | 0131 | 1B12 | 0A10 |
| 0488 | TMC5A2 | 0AFB | 179C | 1BC1 | 00FA | 00F2 | 005B | 1A97 | 0051 | 1CB1 | 00B1 | 0A17 | 0095 | 1009 | 0A37 | 02F3 | 0A17 | 1B62 |
| 0499 | TMC5A2 | 1FB6 | 0051 | 00B0 | 0133 | 000F | 110B | 1AB6 | 1FFF | 04D6 | 1BA0 | 030B | 0F23 | 0111 | 0A1F | 0CDA | 1C11 |
| 04AA | TMC5A2 | 1F6A | 1FD4 | 00A0 | 1A23 | 0AAB | 00A2 | 1929 | 00A2 | 1F4B | 1FDA | 0A47 | 1C7F | 0051 | 0A0A | 02F0 | 0103 | 01D7 |
| 04BB | TMC5A2 | 032C | 0121 | 0A1F | 01D0 | 0007 | 04D0 | 0050 | 1B47 | 0121 | 0A0F | 0111 | 1D15 | 02DB | 0A57 | 06F3 | 1BC5 | 00A1 |
| 04CC | TMC5A2 | 01D7 | 0A17 | 1D45 | 006A | 00A9 | 0A09 | 04D0 | 1BB7 | 0051 | 1B6A | 0AA6 | 02F0 | 0104 | 000F | 01D7 | 0201 | 0007 |
| 04DD | TMC5A2 | 04D0 | 005A | 1CFA | 0ED3 | 1C7C | 14F1 | 14A9 | 1FF0 | 1FF0 | 0ADC | 00C5 | 0619 | 1B06 | 0940 | 0C40 | 0A9B | 0A0A |
| 04EE | TMC5A2 | 1005 | 0213 | 0A10 | 0A09 | 0A04 | 0A05 | 1B05 | 0A01 | 0619 | 1B06 | 0C4B | 094B | 0050 | 15BE | 00EB | 17A6 | 1D2B |
| 04FF | TMC5A2 | 1FCA | 19C9 | 1FBA | 1B79 | 1E36 | 1ABB | 1FF0 | 1990 | 1907 | 0051 | 1CDA | 1C00 | 0051 | 1CCA | 1C22 | 1D40 | 1BF2 | 1F61 |
| 0510 | TMC5A2 | 19E9 | 1F1B | 19ED | 0051 | 1C2C | 19F3 | 0051 | 1B0A | 19F9 | 19DA | 1B09 | 19FF | 1C1C | 1FDA | 1A05 | 1FE2 | 19DD |
| 0521 | TMC5A2 | 1BF9 | 1F72 | 1A0F | 1954 | 1DD0 | 1949 | 1949 | 1AC6 | 1FD4 | 1DC6 | 19B3 | 19B3 | 1AD3 | 1F9A | 1B0A | 1BC1 | 1DDA |
| 0532 | TMC5A2 | 0051 | 1AE1 | 1A31 | 1DA3 | 1FCA | 1911 | 1FFA | 1FF2 | 1A3D | 1BE1 | 1FDF | 1A43 | 1FEC | 0A27 | 00A5 | 1F63 | 1927 |
| 0543 | TMC5A2 | 1F94 | 1953 | 1FFA | 0020 | 1F01 | 0FDC | 17D5 | 03D3 | 1F91 | 00A0 | 00AA | 100C | 0A1F | 09D3 | 06F3 | 0619 | 169C |
| 0554 | TMC5A2 | 094A | 094A | 0AA7 | 02F0 | 0103 | 0AA7 | 02F3 | 00F2 | 095A | 095B | 0A1F | 02D6 | 0050 | 1004 | 02DF | 00FB | 007B |
| 0565 | TMC5A2 | 1B3C | 0110 | 007A | 1B28 | 0437 | 06BB | 06B8 | 1B03 | 06B0 | 1802 | 0709 | 0AD2 | 1016 | 0030 | 1B0C | 0ABB | 06D2 |
| 0576 | TMC5A2 | 06B0 | 06BB | 1B04 | 06BB | 015B | 02BB | 0239 | 1B2A | 094B | 0308 | 1B09 | 0030 | 1B06 | 0940 | 0300 |
| 0587 | TMC5A2 | 0709 | 1F94 | 0032 | 0239 | 101B | 005B | 1B06 | 0509 | 1F9B | 0B09 | 1792 | 005B | 1B4C | 094B | 0308 | 0230 | 1004 |
| 0598 | TMC5A2 | 0509 | 1B0A | 0309 | 1BBF | 00AB | 004A | 1B06 | 0059 | 1DBF | 0A1F | 09DA | 00D5 | 02CC | 0E2C | 0095 | 1B04 | 0BA0 |
| 05A9 | TMC5A2 | 0A00 | 0BFA | 1BBB | 0000 | 00CB | 1E2F | 0A06 | 0A06 | 00A2 | 1BA0 | 0001 | 0007 | 0012 | 0042 | 0ADD | 1E1B | 0B00 |
| 05BA | TMC5A2 | 0094 | 0940 | 04D0 | 0059 | 1FD5 | 0AB5 | 134F | 0AA5 | 1B9C | 0A95 | 1FA0 | 0A75 | 1A0B | 0AB5 | 0455 | 1B34 | 0A75 |
| 05CB | TMC5A2 | 1B2B | 0A55 | 0445 | 1B2A | 132F | 0051 | 02D7 | 0AD7 | 02F0 | 0101 | 0A1F | 02D0 | 0309 | 170B | 0A09 | 1710 | 02D7 |
| 05DC | TMC5A2 | 0AB7 | 0A1F | 09D3 | 06F3 | 0619 | 11BF | 1FC4 | 0A55 | 0A45 | 179C | 00B7 | 00D2 | 1FF1 | 1BA5 | 0A55 | 1FC9 |
| 05ED | TMC5A2 | 0445 | 1F92 | 00B0 | 00D2 | 00B2 | 1F9B | 0A27 | 02F6 | 07DF | 17EA | 17D7 | 1E97 | 1FB1 | 0100 | 0100 | 0100 | 0100 |
| 05FE | TMC5A2 | 0100 | 0100 | 0100 | 0100 | 0100 | 0C40 | 1F74 | 0011 | 1FDB | 1E41 | 13E1 | 1FC5 | 0619 | 1B1B | 005B | 095B | 0953 |

TABLE IIa

| HEX ADDRESS | CHIP | INSTRUCTION WORDS→ |
|---|---|---|
| 060F | TMC5A2 | 0C53 0C53 071B 0C53 0619 1806 0940 0C40 0309 180A 005A 004B 1004 02DB 0050 0052 1267 |
| 0620 | TMC5A2 | 00EA 1257 000A 133C 00D6 000A 0213 0A9B 0A0B 1005 0A10 0A09 04E0 0B20 1B0C 0A45 0455 |
| 0631 | TMC5A2 | 0465 0475 1019 04E0 0B20 180C 0A45 0455 0465 0475 1029 00CB 00AF 04B0 0A0B 1BCF 009A |
| 0642 | TMC5A2 | 1A2A 0A01 0CD5 0F24 0921 0A1B 0CD5 0A45 101A 0CD5 0F24 0F24 0F24 0CD5 0A9A 0A0B 100A |
| 0653 | TMC5A2 | 0213 0A10 0A09 04E0 0B20 1A39 0AE0 0A20 1B3F 0A45 0455 0465 0475 1B49 0A01 0619 1B0A |
| 0664 | TMC5A2 | 0C4B 094B 0475 1B1A 0A65 1B12 0045 006D 0085 0091 0A95 0095 1B0A 0045 0AA5 1B0C 009D |
| 0675 | TMC5A2 | 0AB5 00B0 1004 00B5 0090 1B1E 0092 0AB5 00B5 1B0C 00BD 0A95 0090 100C 0095 0AA5 00A5 |
| 06A6 | TMC5A2 | 1B0A 004D 00B5 00AB 162B 0A10 0AEB 1B2A 0A97 02F6 0131 0A1F 06DA 067E 0A1F 0906 02F6 |
| 06A7 | TMC5A2 | 0239 0639 1012 0A00 0AEB 179B 09D5 0E2C 0E2C 09D5 1FAE 0066 0069 0050 0052 1717 00CA |
| 06AB | TMC5A2 | 1066 0A0D 0A0C 00B5 0A0D 0475 0465 0455 1FBD 0015 0A0C 0F01 1EF6 00C0 0051 10C3 17F3 |
| 06B9 | TMC5A2 | 0A1F 09D3 06F3 0619 1FBH 0050 17BF 0DAB 00AA 0042 13D6 0082 1BD2 0A0B 09F6 0002 01D7 |
| 06CA | TMC5A2 | 0070 1B0A 0309 1B06 0AB7 0CF0 0940 0980 014B 030B 0140 03D0 11AF 01D7 00AB 1173 1445 |
| 06DB | TMC5A2 | 0A07 02F3 0111 0A1F 0104 01D5 0E2C 01D5 1249 0AB5 0AA5 0A95 0A55 100E 0A75 1F0F 0A65 |
| 06FC | TMC5A2 | 1006 0A45 10AB 0111 040F 0131 18F6 005B 100A 0144 0A06 02F4 0022 0095 00E5 00D5 0A0D |
| 06FD | TMC5A2 | 0032 1B6B 0010 1B06 0939 1BE7 0D09 165F 00BD 01DH 0CC3 0920 0030 15C8 09DC 016C 0729 |
| 070E | TMC5A2 | 1D6A 0CB9 1550 0CBB 072A 1B09 155B 01D4 00B6 0D09 177D 0030 1FC6 010B 1F85 0A0D 0A0C |
| 071F | TMC5A2 | 0104 0A06 02F6 0114 0120 0919 0939 1C80 0D09 13C5 0D09 0049 15C0 002B 1B0A 0090 |
| 0730 | TMC5A2 | 014B 0022 0203 910B 060C 00BD 0A04 0CDB 004B 1004 0C20 0ED4 004B 1012 0C23 0A0B 02F4 |
| 0741 | TMC5A2 | 032C 0048 1144 0CCB 1940 0CC0 1B13 0A04 0475 1819 004B 1F1D 0C23 0C1B 0C5B 19BA 0C83 |
| 0752 | TMC5A2 | 0A0C 0144 0214 0164 01DB 01C0 0030 17A2 0CBB 1FA2 1DA2 1DA2 1F63 0AA5 1B0C 0A55 1B0B |
| 0763 | TMC5A2 | 000B 00DB 1969 02B7 0309 02D7 1B34 0000 0070 0002 00CA 161A 19CD 0051 0ED4 003A 002A |
| 0774 | TMC5A2 | 0013 0123 1F55 0AA5 0AB5 0A75 0455 0AB5 102D 0A95 1B31 02D7 0309 02D7 11A3 0A1F 01D6 |
| 0785 | TMC5A2 | 017F 017F 00E9 0A0B 02F6 0174 0A07 0A1B 0AB5 1B0B 0495 1022 0075 0AA5 1B0A 0045 0A95 |
| 0796 | TMC5A2 | 1B09 0055 0AB5 1B09 0045 0A0B 02F6 0239 100A 017E 0C7A 00EB 1006 00AB 1A7A 0176 0040 |
| 0747 | TMC5A2 | 16DE 0A1F 02D6 0A0E 0131 01D7 00CA 00AB 16D2 00A0 175A 06DB 014E 01D7 0C70 160B 0A0D |
| 07BA | TMC5A2 | 0A04 0015 0A0D 17C7 16C6 0130 0007 0400 1B97 0619 1B06 0C4B 094A 0A1F 09D6 06F6 0639 |
| 07C9 | TMC5A2 | 11C4 00DA 00B0 00CB 0000 11C6 0A70 0BFD 1B1B 0A97 02F6 0131 0A1F 06D6 067E 0639 100A |
| 07DA | TMC5A2 | 0053 0050 15ED 0AA0 0BFD 101A 009A 1940 01D7 0A1F 09D0 0140 0E0A 0E09 01D7 1190 000A |
| 07EB | TMC5A2 | 100A 0AA0 0AED 1009 0A97 02F6 0131 0A1F 01D3 0C5E 0C7E 000A 00DA 1F76 0939 17AA 00DA |
| 07FC | TMC5A2 | 1006 000A 000A 0072 |
| 0800 | TMC5A2 | 00A2 17F5 1BF3 0A97 02F6 01D7 0231 09F0 01D7 00A2 1D97 1E7D 1085 0126 0A06 02F6 0020 |
| 0811 | TMC5A2 | 0054 04D0 1FF5 1FFB 032C 19AF 0C91 1FCD 1143 00A2 00D1 1EF9 0051 0020 1B0A 0099 01DB |
| 0822 | TMC5A2 | 0F09 170B 0ED0 072C 150C 072C 1500 0700 1B0B 0A3F 0A0C 0A0B 06F6 0A0F 0A0C 0A0B 02F6 |
| 0833 | TMC5A2 | 01D2 0A90 0BFD 1AA7 000B 000A 1B0C 00CB 1262 0A00 0002 1B89 0A0C 0239 0231 0A1B 017E |
| 0844 | TMC5A2 | 1FA6 0239 1FF7 0A45 1B04 00B5 0455 1B04 0095 0A65 1B04 0045 0A75 1B04 0095 0231 0A1B |
| 0855 | TMC5A2 | 1B09 1D7A 17A2 0A0C 0AA7 1CC5 1F42 00AA 177A 0000 01D7 0A1F 09D3 0002 1ADF 0CF6 01D5 |
| 0866 | TMC5A2 | 072B 0619 1FD2 00D3 0953 0953 09A9 1D3A 0AA7 09F3 09BB 0D24 1505 09A3 0D2C 1002 |
| 0877 | TMC5A2 | 0960 0994 0AD7 02F3 0111 0A1F 01D3 0008 0A1F 01D0 1B06 0509 1B0C 095B 095B 095B 099B |
| 0888 | TMC5A2 | 1004 014B 095B 095B 095B 095B 095B 0953 0953 0953 0953 0953 0993 000B 1004 06DB 0C53 |
| 0899 | TMC5A2 | 0910 0A0F 0101 01D5 00B9 01D7 1DCF 1FAE 0F21 1B04 0099 0030 000E 0A02 0026 000A 0009 |
| 08AA | TMC5A2 | 0A0D 0059 1B0A 0031 00EA 001A 16B6 01D2 0A1F 01D0 0048 0A1B 06F6 0AA5 1118 00BB 15B6 |
| 08BB | TMC5A2 | 0A67 09F6 05B9 05C0 159E 00B9 0D0D 0D00 1D96 162B 1F6C 095A 070A 1B05 06DB 0AA7 0A1B |
| 08CC | TMC5A2 | 0C0A 0A0B 02F4 00DA 171C 0CFC 1F1A 0CE4 1A2D 0A65 0A0A 1786 00B0 1B1B 0C33 1F74 1FDF |
| 0ADD | TMC5A2 | 1FDF 00B0 1AD0 0ACD 0A57 0A1B 1EA7 01D7 0048 02F6 0AB7 09F6 09B9 1FFA 0D0B 0D09 0501 |
| 0BEE | TMC5A2 | 1F9C 1790 0100 0100 0100 0100 0100 0100 0100 0100 0100 0100 00B0 1B04 0051 0030 0D09 |
| 0AFF | TMC5A2 | 1F1C 0A77 06F3 0A89 1FFC 0009 11F1 06DB 1B1A 1631 0051 0A0C 01DB 01C0 0032 0022 1P37 |
| 0910 | TMC5A2 | 0104 0A0A 02F6 0D09 0012 0030 11E7 0940 072C 1B05 143F 0A97 02F6 0131 0A1F 01D3 0C5E |
| 0921 | TMC5A2 | 0C7F 000A 00DA 1D20 02DB 0939 1A46 03D3 1AB2 1FFA 1FFA 0080 0052 1FF4 014E 0A1F 01D3 |
| 0932 | TMC5A2 | 017F 1FE0 01D7 0103 0AB7 09F0 01D7 00F5 00C5 00A5 0457 0A1B 0A0D 0053 0050 |
| 0943 | TMC5A2 | 1FCA 0049 1F7D 16AB 0030 11D0 0709 1B0A 0E0A 0D09 0F00 11C6 0099 0051 1A7F 070A 0031 |
| 0954 | TMC5A2 | 1B06 094B 1F9F 030B 0309 1F45 003A 1FEB 0050 1B04 0011 0477 0A1A 1BAD 0050 100A 0011 |
| 0965 | TMC5A2 | 0A57 0A1B 01DB 01C0 0031 0700 1BAB 01D7 0176 0AD7 02F6 0131 0A1F 01D3 01D2 0E9B 1572 |
| 0976 | TMC5A2 | 0131 0A0F 0101 09DE 017E 00CA 0700 06BB 1002 0709 1A00 0DD0 0477 06F0 03D0 06BB 02BA |
| 0987 | TMC5A2 | 100B 0709 03D9 15FC 00DA 0A97 1B15 01D7 1AA1 0AB5 1457 0A95 1F93 0A75 0A45 1B61 0A65 |
| 0998 | TMC5A2 | 1DCF 0A55 0A95 00AA 146D 1DD9 00CB 17C1 0E0D 0A0C 00D5 00E5 0095 00CA 13DB 0A3D 0AB5 |
| 09A9 | TMC5A2 | 104F 0AA5 164F 0A95 1366 0A75 100A 0AA5 17BD 0A55 1A05 00B2 01DF 1C5D 1B0A 032C 1070 |
| 09BA | TMC5A2 | 0C64 0F09 1773 0C5B 0D29 1561 0020 0032 1FB1 0033 0C23 1F87 0AB5 15F4 0A75 17CD 0A65 |
| 09CB | TMC5A2 | 1F04 0A55 1514 00A2 1E3D 0AA5 0A95 0A75 103F 0A65 1AA3 0AB5 1636 0A55 104B 0AA5 1DFF |
| 09DC | TMC5A2 | 00H0 1FED 1055 0C4B 032C 1B05 00BD 1221 0CB0 14A3 0C4B 0C7E 0F00 0C5B 1A3D 175E 1FE7 |
| 09ED | TMC5A2 | 0C4B 072C 1B05 0A0C 0CD2 0E09 1B06 0C53 0C40 0020 1B0A 0CAB 0031 0724 17F7 004A 0420 |
| 09FE | TMC5A2 | 0C14 1D9F |

TABLE IIb

| HEX ADDRESS | CHIP | INSTRUCTION WORDS→ |
|---|---|---|
| | | 1BF7 1BF9 1BFB 1BFD 1BFF 1C01 1C01 1905 1B00 1FB6 03D3 1FBC 0099 0051 1B95 |
| 040F | TMC5A3 | 17DF 1FE6 1C0B 1F7C 1B4A 1DC2 1B17 00E9 1C29 00A1 1FDE 0C4B 0C4B 0509 0140 100A 0A27 |
| 0420 | TMC5A3 | 02F0 0D0B 0D0B 0C4B 0106 00AB 11F6 0090 0092 1722 0070 17D2 01D7 0051 1D92 00C0 00E1 |
| 0431 | TMC5A3 | 0106 0012 0A06 02F6 1CB1 0ED6 1D85 01D7 0AF7 09FD 0940 0DDB 0AB7 02F3 00A2 0AD7 01F0 |
| 0442 | TMC5A3 | 0101 0A1F 06DD 0C40 0B09 1D34 0110 01D7 01D2 0A1F 01D6 0C7A 0940 0201 09F6 0086 0A0F |
| 0453 | TMC5A3 | 0131 094B 064F 0A39 16A0 0309 000B 100A 00DB 0009 00D9 1B10 0A67 09F6 05B9 0500 1006 |
| 0464 | TMC5A3 | 0D0D 0D0D 018D 1DD2 00A0 00A1 1791 0041 1DC9 005A 01D7 0091 1A57 0AA5 1F07 0AA5 176A |
| 0475 | TMC5A3 | 1F99 00A2 0A65 0A55 1189 1F93 0070 1354 0AB5 0A75 1016 0AA5 1534 0A95 100F 0AA5 1536 |
| 04B6 | TMC5A3 | 0A55 1B06 0AA5 17B1 00AA 114F 00A0 00A2 1B0A 0AAB 0001 01D7 0A0B 0CF0 0A07 0A1A 0AB5 |
| 04A7 | TMC5A3 | 1B0B 0A95 101A 0075 0A45 1B04 0065 0A95 1B0A 0055 0AB5 1B04 0095 0A0A 02F0 0100 10E7 |
| 04AB | TMC5A3 | 0030 1B04 0700 094B 0022 014B 02D2 014B 02D4 0C40 0C40 06DC 1B2A 0C5B 0C4B 1B1C 0C9F |
| 04B9 | TMC5A3 | 0C9C 0CF3 0C99 1B09 01D2 0CBB 0C94 1B02 0F29 1B1D 0C64 0C4B 0F09 1B1D 0C10 0E09 |
| 04CA | TMC5A3 | 1B0A 0C40 1B07 0164 0214 0164 0A20 1D7F 1CB7 0CA3 0F2C 1B05 0C64 0C4B 0F09 1B0B 0140 |
| 04DB | TMC5A3 | 0210 0140 0910 1D99 0A0D 1BA1 153F 0CBB 1245 0E2C 1B07 UC4A 0C7E 0F29 1B0B 0E09 1B06 |

TABLE IIb

```
HEX       CHIP    INSTRUCTION WORDS→
ADDRESS
0AEC      TMC583  0C40 0308 06DA 0E09 0C14 1010 0903 09D8 0E29 1F2F 0C64 0700 1A09 0032 0940 0700 181A
0AFD      TMC583  0FD3 0CD2 1FC7 01D7 0001 0A27 01F0 06F0 0140 01D7 0072 00C9 1AD3 0099 000A 1CF1 0445
0B0F      TMC583  12F0 1ADC 1C46 1F92 1A67 1AF1 1DFA 1F52 0042 1F1A 1772 0153 0153 0153 0153 01A3 1D3A
0B1F      TMC583  0100 1ED6 1D93 1F06 0A0C 1F02 1F00 1EFE 1FFC 1FFA 1FFB 072C 0021 0CD2 072C 1010 0CB0
0B30      TMC583  1A07 0C4A 0C5A 0E00 030A 1A11 0E09 1A06 0C40 0300 0ADA 1E51 00C9 00D1 01D7 0A45 0A77
0B41      TMC583  1014 0A45 0A55 0A47 1A04 0AA5 1A0F 0A07 1A04 0AA5 0A87 1004 0A27 02F0 0AA5 1A04 0300
0B52      TMC583  0AE7 00CB 02F6 0131 0A1F 0CD0 0131 0A0F 0101 1A2B 1EA3 1F57 17AF 1749 0AA5 12FA 0A75
0B63      TMC583  11DA 0A65 12EA 0A45 1367 00A3 1A69 0901 0AF0 0140 0A04 0AD7 02F6 0131 0A1F 09D6 0976
0B74      TMC583  027E 097E 097E 097F 097F 09AE 1F26 0A75 1A04 0903 014A 0148 0509 01DE 1AA2 0C40 0A27
0B85      TMC583  0AFA 09F6 09AA 0C4A 050A 05AE 0A76 0C76 1A9C 0940 0A0A 09F6 09B0 0A0F 0101 094B 00AA
0B96      TMC583  00AA 1D06 0A75 014A 014A 1AA5 0500 06AA 0500 1A05 0A0C 0A1A 0A65 1A04 0A45 00A5 0A55
0BA7      TMC583  1A04 0095 0A45 1A04 00A5 0AA0 0A1A 01DE 01D5 01E4 01D5 1660 0009 09DE 0C76 0C76 0973
0BB8      TMC583  0953 01D2 09B0 01D2 0131 0A0F 0111 0008 000A 1791 0939 1537 0009 01DB 0AF7 02F6 0131
0BC9      TMC583  0A0F 0111 1FDB 01D7 01DA 01D7 1D4F 1F79 1FB6 02F3 0219 0603 0A97 01F0 174C 0AD7 02F6
0BDA      TMC583  0131 0A1F 09D6 017E 017E 017E 017E 09A9 1D10 0903 014A 0148 0509 01DE 16BA 0140 0A27
0BEB      TMC583  09F6 06F6 09BA 014A 050A 05AE 0676 0C76 16AA 0140 03D6 0AF8 01B1 0111 1EAF 16AD 1FB2
0BFC      TMC583  1FAA 0100 0100 0100
0C00      TMC583  0100 0100 0100 0100 0100 0100 0100 0239 1F85 0095 1F71 0A1F 01D6 017E 00FA 1FA1 0AA7
0C11      TMC583  02F0 0101 0A0F 0131 00AA 142E 01D2 1FC3 0002 1EF7 014B 01D2 01B0 01D2 014A 09F6 0AF6
0C22      TMC583  090A 0140 0939 1A63 050A 104F 1A1C 00AA 1FAB 00C9 0A00 1AB2 01D2 017E 0309 1A36 0070
0C33      TMC583  1032 0000 1012 0A0D 0A65 1A09 0A75 16AE 0AA5 0A0D 1A1E 01D5 0A47 06F3 0621 0CF4 0699
0C44      TMC583  0619 01D5 0239 1D73 0000 1A06 0A39 157A 0A1F 01D3 0231 06F3 0A0F 0111 017E 06DE 00E9
0C55      TMC583  1DAF 00A0 136A 1BD1 0A0A 0001 1CFF 0C0A 032C 1A05 0CD2 0CB9 171A 0CAB 0A0A 02F4
0C66      TMC583  1D0D 01D7 00A6 014A 09DA 0140 0A09 1A06 03D0 0B00 0D0A 0D00 0A1F 09D6 097E 0D0A 1A05
0C77      TMC583  0931 0A1B 03D9 1ADB 0A55 1004 0091 01D7 1D27 165C 0090 1A0A 00C0 1E69 01DE 00C0 1A99
0C88      TMC583  01DA 1A9D 0C4A 072C 1B05 0A0A 1F96 01DC 0030 0ED3 1F97 0E09 1F95 0CD2 1F95 0F24 0CBA
0C99      TMC583  1A05 0CA0 1AC3 0C64 0C5A 0C19 100F 0C6C 01A3 00B0 1A04 0A06 0030 0007 0CCA 0C9A
0CAA      TMC583  00C0 1A23 00A0 1A27 00A2 0CE4 0C9A 1AFF 00A0 1A9A 0C26 01DC 1A3D 0A0D 0A0C 0A1A 01D7
0CBB      TMC583  1D42 000A 00D9 0231 09F0 01D7 1A0D 00A1 1A11 0A75 1A46 0A65 1AC3 0A55 1783 1E2D 1A7F
0CCC      TMC583  1AFC 0A55 1F35 0A45 101A 1CAF 0A95 161A 0A85 1A43 0A75 12AE 0A65 1F4A 0A55 0A45 00A2
0CDD      TMC583  1B41 0A55 1A4D 1F59 941F 09D0 0509 01D7 1F2D 000A 1F31 0A65 0A55 166D 0A0D 0A0C 00F5
0CEE      TMC583  00D5 00C5 0A0D 1F29 0A45 167F 1A31 04D3 19BA 0239 01D5 01DB 1DF4 052C 0A67 09F3 15EC
0CFF      TMC583  0AD4 0CDB 032C 052C 100A 0CA0 0E24 1B09 0C6C 0C4A 032C 1A11 00C0 1A04 0F36 0CA0 0F0A
0D10      TMC583  1A67 00F1 0031 0CD5 1C61 00CB 00CA 16FD 01D7 01DE 1BC4 0A95 1D25 0A45 1D2A 0AA5 0A55
0D21      TMC583  1D4F 1531 1C9A 1CF2 1DF2 162F 1E7D 0497 02F3 0111 0A1F 06D3 0A5A 0619 1216 00A9 00A1
0D32      TMC583  1A73 01D7 090A 0A07 02FA 0131 0A1F 09DA 014A 0148 014A 09DA 0140 0140 0140 099A 0131
0D43      TMC583  0A1F 09D6 097E 097E 097E 097E 09A9 1E61 00D0 1AAC 0092 1BCF 1FB1 0AF7 02F0 0121 0A1F
0D54      TMC583  01DA 0A57 02F0 0299 1A02 030A 030A 0C76 0940 030A 1A07 0C4A 032C 1A05 03D0 01A6 0121
0D65      TMC583  0A1F 09D0 0121 0A0F 0131 032C 0121 0A1F 01DA 0A47 02F0 0C4A 0C4A 0C76 030A 1A09 0CB6
0D76      TMC583  0121 0A0F 0131 04D4 01D2 1B61 0606 01DA 017E 01D7 0070 1C22 0176 01D7 0630 01D7 00D0
0DA7      TMC583  1C12 0AE7 02F6 0131 0A1F 01DA 0A1F 0206 09F0 0DDE 0939 1F5C 0A77 0CF6 0B09 100C 02F6 0239 1F52
0D98      TMC583  0A67 0CF6 0A1F 01D4 094A 050A 1A0A 0AC7 09F3 09AB 0940 0A0F 0101 00D2 1A0A 00DB 1A0A
0DA9      TMC583  0A27 06F0 0640 0A37 09F0 017E 0A2F 0A0C 0A0A 09F6 0DDA 1A0D 0176 0176 0176 0930 1FA7
0DBA      TMC583  01D5 0309 01DF 100A 050A 0A67 09F6 1002 0140 0646 0C76 0AFA 01B1 01D0 00AA 171C 01D5
0DCB      TMC583  00D2 0201 0007 005A 1DFD 02DB 0AF7 02F6 0131 0A1F 0CD3 0131 0A0F 0111 01D7 01DB 1F3D
0DDC      TMC583  0072 03D9 01DE 12AB 050A 0A67 09F6 12A0 1FBF 032C 0121 0A1F 01D6 0C30 0A47 02F4 0C7E
0DED      TMC583  0C5A 0C40 0C40 032C 1A0A 09A3 0121 0A0F 0111 032C 0121 0A0F 0131 00B9 00DA 1A0A 030A
0DFE      TMC583  1A04 000A 01D7 04D4 1F25 0D29 1076 0ED4 003A 1B70 009A 1B67 00B0 1015 01D7 0A77 09F0
0E0F      TMC583  01D7 1FA0 1910 190E 190C 190A 1908 1AF4 1AFF 1902 1900 0AA7 02F6 0131 0A1F 01D6 03D0
0F20      TMC583  19A4 1AF0 1AA4 1AEC 1F2A 1AEB 1F24 1F22 1F20 1AF0 1ACD 1778 0467 1914 1A42 0A45 1F73 1297
0E31      TMC583  1AD0 1ACE 1ACC 1F0A 1ACA 1F04 1F02 1F00 1AC0 00AA 0042 00CA 00A2 0091 0059 1A7F 1AF0
0E42      TMC583  1AAF 1AAC 1FEB 1AAB 1FF4 1FF2 1FF0 1AA0 01D7 0201 0007 04D0 0054 1F1A 0001 1890 1AAF
0E53      TMC583  1AAC 1A9A 1AAA 1AAB 1AA0 1AA2 1AA0 00B9 0A1F 09D0 0A0C 0075 014A 1DAF 1A70 1A4E 1FAA
0E64      TMC583  00A3 1A6A 1A44 1A2F 00C9 1A00 01D5 0092 00CA 0052 00C2 1ECA 1F3D 1A50 1A10 1A4C 1A4A
0E75      TMC583  1A4A 1A34 1A32 0100 0051 1A25 019C 014A 014A 01D5 01B4 1A16 1A30 1A2E 1A2C 1E6A 1A0F
0E86      TMC583  1A2A 1A24 1A22 1A20 1E64 1DD4 00A0 1A4A 00B0 1014 0051 1A10 1A0F 1A0C 1E4A 1A0A 1E4A
0F97      TMC583  1A04 0A02 00A2 0A04 032C 0219 1342 017E 030A 1956 0910 0D00 1097 1FAA 01D7 0A1F 01D0
0EA8      TMC583  0A47 0AF6 0A70 0A0F 0101 0A0A 09F0 02F6 0D0B 0D0B 0D09 1111 0B0E 100C 0939 14C7 0A37
0FB9      TMC583  0AF6 0D00 0901 02F6 1CD3 00B9 0A1F 01D0 094B 0A1B 050A 1E6D 094A 014E 017F 017E 09DE
0ECA      TMC583  0139 1A0A 0A37 09F6 0A0A 09AB 1FA5 014A 014A 030A 030A 01DE 12A5 00B1 0901 02F6 1AB7
0EDB      TMC583  0140 0AFA 01B1 01D6 0A75 014A 1632 030A 15A7 017E 017F 1A09 0139 0D09 100E 003A 1A1A
0FEC      TMC583  0709 1A1A 0C19 1A10 0A47 02F3 02A9 1A0A 0A0C 0045 0A6A 0A0C 00B5 0020 1A0A 0A6B 0A4A
0EFD      TMC583  00A2 0042 00A2 0050 16DF 1E65 0100 0100 0100 0100 0100 0100 0100 0100 0100 0100 0A75
0F0F      TMC583  1AAC 0939 1014 0A1F 01D0 094B 0D0A 0D0A 0D0A 0940 0A0F 0101 00B9 0040 11C5 0048 177F
0F1F      TMC583  000A 01D2 0099 1AA3 0140 0646 0C76 0AFA 01B1 01D0 0A0A 02F6 0201 0A1A 0A55 0A65 0231
0F30      TMC583  0A1A 1F90 01D2 1F9A 1FAF 170C 0A01 0A0C 0A0A 0A0A 1005 0ABA 0A04 0A55 1A0D 0A00 0AFF
0F41      TMC583  0AA0 0AFF 1019 1F55 0140 0AFA 01B1 01D6 0A77 02F0 0090 0092 1ADF 00CB 0050 14AB 0000
0F52      TMC583  15E2 0A0C 0231 0A1B 0239 017F 197F 0239 19B3 00F5 00F5 00D5 0A75 1A04 00A5 0A65 1A0A
0F63      TMC583  00A5 0A55 1A04 0095 0A85 0231 0A1B 0015 0A0C 0120 0A33 0A0F 0111 0AA6 02F0
0F74      TMC583  01D7 0A97 02F3 0111 0A1F 01D0 0F00 0111 0A0F 0111 0A0D 0A04 0A0D 0A1F 01D0 1A44 0140
0F85      TMC583  0303 0AFA 0181 0131 00AA 1F2D 01D7 0A03 0D0D 0045 1FFA 0AA7 0AFA 0133 0A1F 09D0 094A
0F96      TMC583  094A 1FFA 1FAE 1C9D 0A55 0A0D 16BB 1FA1 0AA0 0AFD 0A1F 01D0 0700 1344 0A0F 0101 09DA 0C40
0FA7      TMC583  0C40 0091 0AA3 00D1 1CEF 1D44 176F 0A97 02F3 0111 0A1F 01D0 094A 06F3 094A 09F0 0940
0FB8      TMC583  0C53 0C53 09B0 0111 0A0F 0101 1ED3 1749 01D7 00B0 1AE4 0AD7 02F0 0101 0A1F 09D0 094B
0FC9      TMC583  014A 014A 09DA 0054 0C40 0C40 09AB 02F0 1351 1F00 1FAC 0CCA 00C0 1010 0023 0A57
0FDA      TMC583  0A1B 0CDB 00C0 1B0A 00A2 0CCC 1014 0CCB 00C0 00D0 1A04 0023 0CCC 1A25 0CD2 0CC0 0C0C
0FEB      TMC583  0CDB 1FB7 0C64 0AFB 01A1 03DA 0D0B 1391 1FC4 0164 0663 0C53 03D3 0A16 02F6 0AFB 0191
0FFC      TMC583  0131 01D5 04D4 1EFD
1000      TMC583  1F50 1F4C 1F4C 1F4A 1F44 1F46 1F44 1F3C 1F40 1F3E 1F34 1F3A 1F3A 1F2C 1F34 1F32 1F24
1011      TMC583  1F2E 1F2C 1F1C 1F2A 1F26 1F14 1F22 1F20 1F0C 1F1C 1F1A 1F04 1F16 1DA6 1D49 1F10 1F7C
1022      TMC583  1FFF 1EDA 1EF2 1FD6 1F6A 1EFE 1EE2 1FFA 1EFA 1FFA 1EDA 1FF2 1ED2 1FFF 1FFC
1033      TMC583  1F5A 1ED2 1FE6 1F52 1ECA 1EFA 1E4C 1EC2 1EDA 1F46 1EAA 0176 1E9A 1EDA 1EE4 1FA2 1EAF
1044      TMC583  1FDA 1FC0 1F0A 1FD4 1FDC 1FFE 1FCF 1FD0 1FAA 1F9A 1F9A 1FBC 1FCA 1F94 1F90 1FBC 1FA7
1055      TMC583  1FFA 1FF6 1FAE 1EC0 1F6A 1EAF 1F4A 1FA6 1F7C 1A71 1DAA 1EA2 1E7A 1F92 1F9C 1E92 1F9C
1066      TMC583  1FAA 1FF6 1ECA 1F7F 1FF4 1EBA 1F7A 1EAB 1EAA 1EA2 1FF2 1EAA 1FA0 1EAA 1F76 1E70 1FDA
1077      TMC583  1E70 1F72 1F7A 1E6A 1FA2 1EAA 1E3C 16D0 16D5 1F34 1F60 1F6A 1F50 1E5D 1F4E 1E54 1E4A
1088      TMC583  1F4A 1E54 1F22 1F44 1F4C 1E7C 1E3C 1E32 1F9C 1F6C 1F34 1F60 1F3C 1E3F 1E0A 1F0A
1099      TMC583  1E5F 1DFE 1DFF 1E22 1F24 0910 1C22 1E2C 1F46 1E2A 1F10 1E10 1DEF 1E04 1DE4 1DF2 1DFF
10AA      TMC583  1F2A 1DFA 1DFA 1F22 1DF4 1DF2 1E54 1DFF 1E02 1DCF 1DCF 1E06 1DF6 1DC4 1E20 1DFA 1DFF
10BB      TMC583  1DF0 1DFA 1DF2 017E 1AF9 1DF0 1DB0 1DB0 1DDA 1DCE 1DE6 1DFA 1DF2 1DCE 1DF4 1DFC 1D9C
```

TABLE IIb

```
HEX      CHIP    INSTRUCTION WORDS→
ADDRESS
10CC     TMC5A3  1DFF 1D9A 1DC2 1DA2 1DEA 1D4E 1DF2 1D94 1DB6 1DB2 1DB6 1DA2 1DAF 1DAE 1DAE 1D9A 1DA6
10DD     TMC5A3  1DA6 017E 1F21 1D74 1D7A 1D96 1D94 1D70 1D8E 1DBA 1DAA 1D88 1DB4 1D62 1DB4 1D4E 1DAA
10EE     TMC5A3  1D7C 1D72 1D94 1D6E 1D82 1D52 1D7E 1D4B 1DA4 1D62 1D60 1D9B 1DBC 1D5A 1DC2 1D56 01D7
10FF     TMC5A3  1C59 1D34 1D5A 1DAC 1D50 1D50 1D4E 1D5F 1D5E 1D74 1D4C 1D5A 1D6E 1D44 1D44 1D32
1110     TMC5A3  1D64 1D2F 1D4F 1D30 1D30 1D4B 1D46 1D3F 1D2A 1D32 1D00 1D1A 1D44 1D16 01D0 1FDB 1D16
1121     TMC5A3  1D16 1D22 1D12 1D7A 1D10 1D16 1D0B 1D0A 1CFF 1D44 1CFA 1D1C 1D6B 1D2E 1CF2 1D6D 1CFF
1132     TMC5A3  1CF2 1CF4 1D2A 1D22 1CEC 1CC6 1D24 1CC2 1CC6 1CE0 1CE2 1CE4 0447 1B04 0437 02F6 0AB7
1143     TMC5A3  1F55 00A2 0091 0A97 02F6 0131 0A1F 01D0 0EDA 0131 0A0F 0101 01D7 0051 1F0D 0051 0131
1154     TMC5A3  0A1F 01D0 1F15 01D2 0140 0A0B 02F0 0116 030B 1624 017E 017E 1B09 00D0 1089 0A0C 011A
1165     TMC5A3  1D9A 0A1F 09D0 0509 1A55 0AE7 02F3 0111 0A1F 02D0 0409 190A 0CD7 0309 0400 1E6B 0137
1176     TMC5A3  0AF7 02F4 0AF3 0121 0A1F 01D0 030B 1030 0A1F 01DA 0103 042C 0320 0C40 0C40 097F 030B
1187     TMC5A3  1B09 0C4B 0C4B 097B 032C 1B09 097B 09BB 0AF3 0AF0 0A0F 0131 070B 1ECA 09DE 0A97 02F6
119B     TMC5A3  0131 0A1F 01D0 06D6 0C4B 0C4B 09D0 0C40 0C40 0630 0131 0A0F 0101 0611 02F0 0658 0619
11A9     TMC5A3  1755 1FBB 1D44 0631 0A1B 0239 017E 0A75 0A55 0A45 1176 0A65 1972 00CB 197A 0091 00CA
11BA     TMC5A3  1F43 1FE7 0120 0A06 02F0 0103 01D7 0509 0501 1BAB 094B 02F6 0B09 1D0B 0089 0D0B 0D0A
11CB     TMC5A3  0D0B 101B C0DB 10F9 00DB 1D05 0D0B 1DFF 0A0D 0AF7 0A1B CADD 190B 0059 0A16 02F6 0131
11DC     TMC5A3  0A0F 0121 0051 14C3 1FB4 01D5 0A1F 01D3 095B 0953 0A0F 0111 0099 0AF7 02F3 0111 0A0F
11ED     TMC5A3  000A 000A 176B 1F72 0100 0100 0100 0100 0100 0100 0100 0100 0100 0445 0910 1046 02D7
11FE     TMC5A3  0AA7 02F0 0101 0A1F 01D3 0101 0A0F 0121 01D7 0C5B 0C40 030B 1D0C 0153 0153 0C40 0C40
120F     TMC5A3  1B0D 01D5 00B0 172F 0920 019C 0153 0153 0194 01D5 0400 0C4B 030B 1B05 0907 0146 01D7
1220     TMC5A3  015B 0509 01DA 153F 0140 0427 09F3 0AF3 09BB 014B 050B 05BB 0453 0C53 1555 00B0 01D5
1231     TMC5A3  1FF4 0160 04D0 0C40 030B 1B05 016C 016C 09B6 01D2 0D0B 015B 1B3D 0100 1EB5 00B2 017F
1242     TMC5A3  19BF 0002 0040 1D0B 0CD2 0219 0173 1B04 0303 06BB 0419 0CD2 15FF 0219 01D5 1367 01D2
1253     TMC5A3  0AB7 02F0 0219 1D06 0203 0D0D 0904 02BB 09F3 1FD9 0BD0 0AB7 06F0 0640 0C40 0CD7 1CB9
1264     TMC5A3  0D9D 0082 1A91 01D5 0AA7 02F0 0101 0A1F 01D4 1B65 00CA 00CA 199A 0239 1D06 0040 0091
1275     TMC5A3  0052 1DBE 1FBD 1B54 0400 0308 1012 070B 1B07 094B 030B 1B05 00AB 16C4 1F9F 02DB 1B0F
1286     TMC5A3  0A97 02F0 0009 105C 0101 0A1F 09D4 096C 006C 0923 0994 0437 02F4 096C 0A1B 0A1E 032C
1297     TMC5A3  1B09 030D 07DB 010C 0153 0A3E 0A0C 0408 02F4 0164 0A0F 0A0C 0A0B 02F4 0164 1017 030B
12A8     TMC5A3  1D06 0123 1B23 09A0 0163 0153 09B9 19DD 0437 02F0 094B 0418 0A1F 030B 1B09 01D5 01D7
12B9     TMC5A3  1FBB 1FA7 165A 017E 00B2 0040 1B91 0DD0 1347 0A0C 07DF 0C16 0431 0A1B 0A04 067E 0A6B
12CA     TMC5A3  100B 0616 0A9B 0A9B 00A0 13B4 07DD 05D0 0A0C 9631 0A1B 0A04 0C7E 0AAB 030B 1B0F 070B
12DB     TMC5A3  1D74 0A9B 0A9B 0A27 02F0 1B1D 01D7 0A37 02F0 015B 0A2E 0A0C 0A0B 09F3 030B 1B0D 0A0E
12EC     TMC5A3  0A0C 0A37 02F0 0A0C 0A1F 0A1E 0A1E 0A1E 0A3F 0A0C 0A0B 09F6 0A0E 0A0C 0A0B 06F6 0A76
12FD     TMC5A3  017A 0211 0A1B 015B 0A1F 030B 1B0B 09BE 1D0A 0939 12BA 0008 00DB 11BA 0A97 02F0 0131
130F     TMC5A3  0A1F 01D6 090A 0101 0A0F 0131 1BB9 0AAB 0040 0116 19E4 13F7 0120 01D7 0050 1B66 0A1F
131F     TMC5A3  01D0 0AA7 02F4 0AF4 094B 032C 1B05 0940 072C 1B05 0A0F 0101 0AA7 02F0 0101 0A1F 01D4
1330     TMC5A3  00B9 1AED 1AF7 1E4E 01DB 0328 0101 0A0F 0111 000B 00DA 1B93 0AF7 01F0 0101 0A0F 0111
1341     TMC5A3  00B9 0A1F 02D3 0A0F 0111 0A97 01F4 0A1F 0121 0A1F 01D0 0640 0648 0121 0A0F 0101 030B 09F0
1352     TMC5A3  16C3 0A47 01F4 0C4C 0529 01DE 16D7 0C64 0427 09F6 06F6 09AC 0C6C 052C 05AE 0676 0C76
1363     TMC5A3  1AED 0101 0A1F 09D0 094B 094B 0903 09A0 0437 02F0 06F0 094B 0A1B 0A1E 030B 1B09 05D0
1374     TMC5A3  030B 0033 010F 0A3E 0A0C 0A0B 02F6 0176 0A0F 0A0C 0A0B 02F6 0176 1015 0176 0176 050B
1385     TMC5A3  1B23 0010 094B 0A1B 0A1F 070B 1B09 0CD2 09B9 1B59 00D3 0A3E 0A0C 0A0B 06F6 0A0F 0A0C
1396     TMC5A3  0A0B 02F6 1DB3 0A04 0A04 0A04 0A04 0A04 0A04 0A04 0A04 0A04 0A04 0A04 0A04 0A04 0A04
13A7     TMC5A3  0A04 00BD 1B24 1B02 0A04 0A04 0A04 0A04 0A04 0A04 0A04 0A04 0A04 0A04 0A04 0A04 0A04
13B8     TMC5A3  0A04 0A04 00B5 009D 0A6B 1924 0A04 0A04 0A04 0A04 0A04 0A04 0A04 0A04 0A04 0A04 0A04
13C9     TMC5A3  0A04 0A04 0A04 00BD 0095 1B25 00C9 0320 01D5 0101 0A1F 01D4 0F24 01D5 19BD 0457 0A1B
13DA     TMC5A3  0A04 0A04 0A04 0A04 0A04 0A04 0A04 0A04 0A04 0A04 00B5 1B31 0070 0072 16D3 00B0 00B2
13EB     TMC5A3  15DB 0A1F 01D0 014B 014B 094B 095B 095B 0953 0953 0953 09BB 0103 09A0 09B3 09B0 09B0
13FC     TMC5A3  090B 0153 0176 09B6
```

TABLE IIc

```
HEX      CHIP    INSTRUCTION WORDS→
ADDRESS
1400     TMC571  0040 103C 0A1F 09D0 0E0B 0E0B 1B3A 0A00 0BFB 1032 0A37 01F3 0AA7 09F3 0976 0170 0140
1411     TMC571  0153 0153 0153 0153 0153 0400 00CB 1775 0A00 0015 0A00 0099 000A 1ACD 0AAA 0BFD 1465
1422     TMC571  0410 0AFB 1B35 0498 0A0B 1005 0AAB 0A0C 0133 00A0 100C 0A7B 00A0 16F3 12C3 01D5
1433     TMC571  01AC 0624 0A1B 0A75 1B04 00C5 0A45 1B04 00B5 0A55 1B04 00A5 0A45 06DC 1B0A 0A27 06F4
1444     TMC571  0095 0005 0437 09F4 0223 0294 1B04 0724 0294 1B04 0724 0D2C 1026 0624 0A1B 0A55 009D
1455     TMC571  1B04 0095 0A45 00BD 1B04 00A5 0224 0A1B 0324 1B04 0724 0AA7 0015 0A1B 0114 01D5 000D
1466     TMC571  0040 1335 00A0 1B39 0A0C 00A5 0065 0A6B 1B41 0AA7 02F0 0101 0A0F 0131 0A0B 02F0 0631
1477     TMC571  0CF6 030B 1304 0176 0176 1B09 0A17 0A1B 0A1F 0A0C 0A1F 0A1E 0A1E 0099 0A0F 0A0C 0A0B
1488     TMC571  02F3 0219 1643 0A97 01F0 0C07 0101 0A1F 09D0 0C4B 0A0A 09DA 0C03 0CB0 0437 02F0 0C4B
1499     TMC571  0A1B 0A1E 030B 1B09 07D0 030B 0133 01DE 0153 0A3E 0A0C 0A0B 02F4 0176 0A0E 0A1C 0A0B
14AA     TMC571  02F6 0176 030B 1B19 070B 1B23 0176 0170 09BB 01D2 0323 0111 0A1F 01D6 0437 02F0 094B
14BB     TMC571  0A1B 0A1F 017E 030B 1B0A 0930 09B0 09BA 09B0 09B0 16BB 01D2 09BA 0A0A 0D0B 16C3 0AA7
14CC     TMC571  02F0 0101 0A0F 0121 0A77 02F0 06F0 01DC 0164 0A3E 0A0C 0A0B 02F4 0164 0A0E 0A0C 0A0A
14DD     TMC571  02F4 00DA 11AA 030B 1B1B 0176 0C4C 02F6 0176 016C 02F6 070B 1B0F 01D7 0D04 0148 014B
14EE     TMC571  109B 0A0C 0100 0100 0100 0100 0100 0100 0100 0100 070B 1004 0009 0A27 0A1B 0A1F
14FF     TMC571  0A0C 0A1F 0A1E 0A1F 094B 05D6 0A0F 0131 01D5 01DC 010B 0308 0A3E 0A0C 0A0B 02F3 0153
1510     TMC571  0A0F 0A0C 0A0B 02F3 0153 1015 0153 0153 0969 1006 0D24 1B25 0437 02F0 094B 0A1B 0A1F
1521     TMC571  0308 1B09 010D 0121 0A1F 01D3 02F0 030B 07D3 1F29 0A0D 0A0C 0303 0A1E 0A37 02F6 0131
1532     TMC571  01D6 067E 0050 1B04 0A0D 0090 15F5 0A10 0BFB 1DFB 00A0 1B2C 0A1F 09D6 02F6 0239 0639
1543     TMC571  1012 01D5 0F2C 0F2C 01D5 19BE 0A0D 0BFB 11BB 0A9B 0A0B 1005 0ABB 0ADD 0A7B 19BB 0639
1554     TMC571  1B11 162F 0DEB 00FA 0619 0323 0111 0A1F 01D4 1062 0C4B 00D9 1004 00D0 0C4B 0D20 0C4B
1565     TMC571  0C4B 0C4B 0ABB 150E 02F6 0606 0A1F 09D0 0C4B 0C4B 0C4B 0C4B 0C4B 0C4B 0AB9 1004 00B9 0C53
1576     TMC571  0A07 0019 1B04 0AA7 02F0 0C53 02B6 0053 0956 0C76 0C7A 0974 002C 0111 0A0F 0121 0A97
1587     TMC571  02F3 0111 0A1F 0C0A 0111 0A0F 0131 00B4 016F 016C 016C 0974 096C 016B 017F 06AC 092A
1598     TMC571  0044 0046 0944 0944 002C 1B04 09DC 0729 0C64 1004 0F2C 096C 0C64 0C60 0A27 02F0 0022
15A9     TMC571  005A 0032 1FE1 01D7 0920 09BB 015B 0164 0164 0194 1F37 0051 030B 11A9 0164 0164 1B0B
15BA     TMC571  01D7 0A77 09F4 0A1F 09D3 0901 0DF0 0B09 09A0 01D5 0DDA 100B 0B0B 0D24 07DA 0956 09A0
15CB     TMC571  0DDB 1B07 09D2 0729 094B 0A1B 0A1F 0100 01D5 100F 0455 1B0E 0ABB 1E41 09BB 1B0C 0A45
15DC     TMC571  1D0B 30BB 16BD 0950 0106 1D9F 0099 1B36 049B 0ADB 1C05 0ABB 090A 0A0C 0931 0A1B 0A04
15ED     TMC571  007E 0A6B 0939 100F 0070 00A2 1B0C 0A97 0095 0A1B 0A6B 00A1 0AAA 1EFF 01D2 01BB 01D2
15FF     TMC571  014E 017E 017E 017E 09DE 017E 0A0B 02F0 030B 154B 0176 0176 1B09 01D5 0639 1B34 17A1
```

TABLE IIc

```
HEX      CHIP    INSTRUCTION WORDS→
ADDRESS
160F     TMC571  01D5 0F29 1000 0A9A 040A 1005 0A8A 0A1F 06D3 0704 0A0C 0611 0A1A 0404 065A 0A68 072C
1620     TMC571  180F 0A0D 0A1A 0A0D 0105 0A9A 0A9A 0106 009A 1810 0A0C 0A97 0A1A 0085 0095 0AAA 1804
1631     TMC571  0A9A 0A0C 00FA 0078 100A 0709 1806 0A7A 1A1A 0219 064A 0A1A 0A0A 0A01 0A6A 1009 0030
1642     TMC571  0A0C 1804 00A5 0A6A 0130 030A 0A0C 1A0A 0095 02DA 0A6A 0A0C 0009 1A06 0219 1F2F 094A
1653     TMC571  0A1A 0A04 0219 0A6A 1021 0CDA 1A25 0103 0107 0A01 02FA 0A1A 0A75 1040 0A10 0AFA 1A3A
1664     TMC571  0A04 0A75 1AAC 0619 0030 0020 1111 0AF7 09F0 0A00 09AA 111A 0A0C 0095 0A75 0045 0A9A
1675     TMC571  0A0A 1005 0AAA 0D0A 100A 0A9A 1A07 0A68 0AAA 0110 1A49 0107 0A45 0A97 02F3 0111 0A1F
1686     TMC571  0103 0A6A 0A5A 1267 0AA0 0AFD 1005 0A0A 116C 0619 1A04 0031 0CAA 0CAA 0A47 06F3 06D2
1697     TMC571  009A 06A9 1222 0A1A 0A9A 0A4A 02DC 06D5 0A49 100C 031A 00AA 1006 0030 120A 09DC 0032
16A8     TMC571  0A1A 0619 19EA 072C 0A2A 0A4A 0A4A 0164 0210 0126 0AA0 0AFD 11CA 0A00 0A0A 100A 0A01
16B9     TMC571  0DAA 1A06 045A 1A0A 0ACA 0AA0 0AFD 11A2 0A0A 1009 0A37 09F0 0940 0D0A 02DA 0A27 06F0
16CA     TMC571  00AA 190F 0C5A 042A 0A0C 01DE 0A0A 02F6 02A0 0A5A 0A2A 0A0C 0C7F 0A0A 09F6 02F3 02AC
16DB     TMC571  1002 0708 1A15 0619 1A8A 01AA 0119 19AA 0020 1A06 0A85 1A2E 0130 0A0C 0099 0AA0 0AFD
16EC     TMC571  1010 0AA0 0A0A 100F 0A5A 0A0A 0AC5 1A07 004A 1146 1A90 0020 1A04 0085 0ACA 0A3A 1A10
16FD     TMC571  0F2A 03D6 1AAF 0A77 0AF0 0C76 0C6A 0AFA 01A1 0113 0C7E 095E 097E 097E 097E 097E 097E
170E     TMC571  097F 097E 027F 097E 097E 0153 0153 0A0C 0931 0A1A 02F3 0A45 1A04 0085 0A55 1A04 0095
171F     TMC571  0AA5 1A04 0045 0A75 1A0A 0085 02A0 097E 0931 0A1A 02F3 02A0 1002 0ACA 0A3A 0708 1A4F
1730     TMC571  0C6C 0724 000A 1A67 0A0C 0201 0A1A 0ACA 0A3A 0ACA 0A3A 0ACA 0107 0CAA 0C03 0CA0 0FA0
1741     TMC571  0CA0 0ADA 0F00 0A4A 1002 000A 00AA 0091 02DA 009A 1A45 00A4 0A1F 0004 0529 134F 1F87
1752     TMC571  02A0 0231 1002 0A1A 0ACA 0A3A 017E 070A 1A11 0A0C 0105 02D6 0C76 0A0E 01DC 0107 0130
1763     TMC571  0107 0A77 0AF0 00AA 1AE1 0A5A 0A2A 0A0C 0153 0A0A 02F3 0A07 0A1A 0A85 1A04 0045 0A95
1774     TMC571  1A04 0055 0A45 1A04 0055 0A45 1A04 0075 02A0 0153 0A0A 02F3 02A0 1002 0708 1A37 0C6A
1785     TMC571  0AFA 01A1 0111 0CAC 0A5A 0A2A 0A0C 0724 000A 0A77 0AF0 1A48 0A0A 02F3 02AF 0219 04AA
1796     TMC571  1AAA 0A0A 0099 06D2 090A 0C40 0C40 1AA3 008A 1A1A 070C 19EA 01A9 02AF 0230 117C 0AA5
17A7     TMC571  1953 0051 1957 0049 19A7 050A 0418 0A47 02F0 1012 0A65 101F 02A6 0131 0A0F 0111 0107
17B8     TMC571  1C1A 0A0C 0300 0101 0A0F 0A04 0A65 1A09 1013 0A9A 0A0A 1005 0A8A 0A45 1A04 0011 0A87
17C9     TMC571  02F0 0101 0A1F 09D0 0A47 06F0 0010 1A04 070A 0A0C 094A 0A6A 094A 0A1A 0A55 1A04 0085
17DA     TMC571  0AA5 1A04 0095 0AA5 0A3A 0A1A 1A04 0075 0A6A 070A 1A25 0010 0051 01D2 13A3 01D2 030A
17EB     TMC571  02A9 1A45 0AAA 1A6F 0099 1CC5 0030 196C 0A97 02F3 0111 0A1F 01D6 0C76 05D6 0C7F 0111
17FC     TMC571  0A0F 0131 0021 19A7
```

TABLE III

| PROGRAM CODE | FUNCTION | KEY(s) |
|---|---|---|
| 00 | 0 | 0 |
| 01 | 1 | 1 |
| 02 | 2 | 2 |
| 03 | 3 | 3 |
| 04 | 4 | 4 |
| 05 | 5 | 5 |
| 06 | 6 | 6 |
| 07 | 7 | 7 |
| 08 | 8 | 8 |
| 09 | 9 | 9 |
| 10 | $E^1$ | 2nd, E |
| 11 | A | A |
| 12 | B | B |
| 13 | C | C |
| 14 | D | D |
| 15 | E | E |
| 16 | $A^1$ | 2nd, A |
| 17 | $B^1$ | 2nd, B |
| 18 | $C^1$ | 2nd, C |
| 19 | $D^1$ | 2nd, D |
| 20 | Clear | 2ND, CLR |
| 21 | 2nd | 2nd |
| 22 | Inverse Function | INV |
| 23 | LNX | LNX |
| 24 | Clear Entry | CE |
| 25 | Clear | CLR |
| 26 | 2nd | 2nd, 2nd |
| 27 | Inverse Function | 2nd, INV |
| 28 | log | 2nd, log |
| 29 | Clear Program | 2nd, CP |
| 30 | Tangent | 2nd, TAN |
| 31 | Learn | LRN |
| 32 | Exchange display and T register | $X \rightleftarrows T$ |
| 33 | $X^2$ | $X^2$ |
| 34 | $\sqrt{x}$ | $\sqrt{x}$ |
| 35 | 1/X | 1/X |
| 36 | Program Page | 2nd, PGM |
| 37 | Polar to Rectangular | 2nd, P → R |
| 38 | Sine | 2nd, Sin |
| 39 | Cosine | 2nd, COS |
| 40 | Indirect Addressing | 2nd, IND |
| 41 | Single Step | SST |
| 42 | Store in Memory # | STO |
| 43 | Recall from Memory # | RCL |
| 44 | Sum into Memory # | SUM |
| 45 | $Y^x$ | $Y^x$ |
| 46 | Insert Program Code | 2nd, INS |
| 47 | Clear Memories | 2nd, CMs |
| 48 | Exchange Display and Memory # | 2nd, EXC |
| 49 | Multiply Display into Memory # | 2nd, prod |
| 50 | Absolute Value | 2nd, $\lvert x \rvert$ |
| 51 | Back Step | BST |
| 52 | Exponent Entry | EE |
| 53 | ( | ( |
| 54 | ) | ) |
| 55 | ÷ | ÷ |
| 56 | Delete Program Code | 2nd, DEL |
| 57 | Engineering Notation | 2nd, ENG |
| 58 | Fixed Point Notation | 2nd, FIX |
| 59 | Integer | 2nd, INT |
| 60 | Degree | 2nd, DEG |
| 61 | Go To | GTO |
| 62 | Indirect Program Page # | 2ND, PGM 2ND, IND |
| 63 | Exchange Indirect Memory # with display | 2ND, EXC 2ND, IND |
| 64 | Multiply Display Into Indirect Memory # | 2ND, PROD 2ND, IND |
| 65 | Multiply | X |
| 66 | Pause | 2nd, PAUSE |
| 67 | Go To # if x = t | 2nd, x = t |
| 68 | No Operation | 2nd, NOP |
| 69 | Operation Code # | 2nd, OP |
| 70 | Radians | 2nd, RAD |
| 71 | Subroutine Call | SBR |
| 72 | Store in Indirect Memory # | STO, 2ND, IND |
| 73 | Recall Indirect Memory # | RCL, 2ND, IND |
| 74 | Add Display into Indirect Memory # | SUM, 2ND IND |
| 75 | Minus | — |
| 76 | Lable Key | 2nd, LBL |
| 77 | Go To # if $x \geqq t$ | 2nd, $x \geqq t$ |
| 78 | Insert Data Point | 2nd, $\Sigma +$ |
| 79 | Mean | 2nd, $\overline{X}$ |
| 80 | Grad | GRD |
| 81 | Reset | RST |

TABLE III-continued

| PROGRAM CODE | FUNCTION | KEY(s) |
|---|---|---|
| 82 | Hierarchy Address | Not directly accessible |
| 83 | Go to Indirect Address | GTO, 2ND IND |
| 84 | Operation Code Indirect # | 2ND, OP 2ND, IND |
| 85 | Plus | + |
| 86 | Set Flag # | 2nd, ST FLG |
| 87 | If Flag # Set, Go To # | 2nd, IF FLG |
| 88 | Degrees, Minutes, Seconds | 2nd, DMS |
| 89 | π | 2nd, π |
| 90 | List Program | 2nd, LIST |
| 91 | Run/Stop | R/S |
| 92 | Return | INV, SBR |
| 93 | Decimal Point | . |
| 94 | Change Sign | +/− |
| 95 | Equals | = |
| 96 | Write | 2nd, Write |
| 97 | Decrement Register # and Go To # when zero | 2nd, DSZ |
| 98 | Advance Paper | 2nd, PAP |
| 99 | Print | 2nd, PRT |

TABLE IV

Program codes following an heirarchy address code (82)

| FIRST DIGIT | FUNCTION |
|---|---|
| 0 | store |
| 1 | recall |
| 2 | conditional return (second digit is ignored) |
| 3 | sum into |
| 4 | multiply into |
| 5 | subtract from |
| 6 | divide into |
| 7 | " |
| 8 | " |
| 9 | " |

| SECOND DIGIT | HEIRARCHY REGISTER |
|---|---|
| 0 | no operation |
| 1 | 1 |
| 2 | 2 |

TABLE IV -continued

Program codes following an heirarchy address code (82)

| SECOND DIGIT | HEIRARCHY REGISTER |
|---|---|
| 3 | 3 |
| 4 | 4 |
| 5 | 5 |
| 6 | 6 |
| 7 | 7 |
| 8 | 8 |
| 9 | no operation |

TABLE V

Coces Following OP Code (69)

| CODE | MEANING |
|---|---|
| | Initialize for alphanumeric printing |
| 01 | Fill far left quarter of print buffer |
| 02 | Fill next to left quarter of print buffer |
| 03 | Fill next to right quarter of print buffer |
| 04 | Fill far right quarter of print buffer |
| 05 | Print the buffer as filled with OPS 01–04 |
| 06 | Print display plus contents of OP 04 |
| 07 | Plot asterisk in column number contained in display register (0–19) |
| 08 | List labels |
| 09 | Download page |
| 10 | Signum |
| 11 | Variance |
| 12 | Slope, intercept |
| 13 | Correlation |
| 14 | y' |
| 15 | x' |
| 16 | See current partition RAM |
| 17 | Repartition RAM |
| 18 | If not error - Set flag 7 |
| 19 | If error - Set flag 7 |
| 20 | ⎫ |
| , | ⎬ Increment memory 0–9 |
| 29 | ⎭ |
| 30 | ⎫ |
| , | ⎬ Decrement memory 0–9 |
| 39 | ⎭ |

TABLE VI

```
SCOMO 1,STOF=0A0F,RCLF=0A1F,REG=LO,DIGITS=USED
ADDRESS CONSTANT=1,2,3,5,6,7,8
CONSTANT  0=23025850299400C
CONSTANT  1=06931071805990 5
CONSTANT  2=00953101790A0325
CONSTANT  3=00009503305316A
CONSTANT  4=00009950333080
CONSTANT  5=000000995000333
CONSTANT  6=000000099995000
CONSTANT  7=0000000099999500
CONSTANT  8=07A5390163307450
CONSTANT  9=009966A6524912A0
CONSTANT 10=000999966AAA6670
CONSTANT 11=000099999666667
CONSTANT 12=00000009999999667
CONSTANT 13=157079A32679501C
CONSTANT 14=3141592653590000
CONSTANT 15=572957795130A01C
CONSTANT 16=43750603553308A2
CONSTANT 17=540343550143650A
CONSTANT 18=130403750543535 5
CONSTANT 19=24535354503435 5
CONSTANT 20=001035900043326 5
CONSTANT 21=5320A2540343555 0
CONSTANT 22=32555A1AA2A5045 3
CONSTANT 23=A51AA265325302 54
CONSTANT 24=0355044353925032
CONSTANT 25=8355014353325803
CONSTANT 26=A590533320A2540 3
CONSTANT 27=33325403035502 43
CONSTANT 28=034355054305045 3
CONSTANT 29=750543535392325 4
CONSTANT 30=5554034355330A43
CONSTANT 31=0882540175034353

SCOMO 2,STOF=0A0F,RCLF=0A1F,REG=HI,DIGITS=UNUSED
ADDRESS CONSTANT=1,2,3,5,6,7,8
CONSTANT 32=7502035353323450
CONSTANT 33=5554034355330143
CONSTANT 34=835353023054180 2
CONSTANT 35=55C14365004375 06
CONSTANT 36=05435353555803 43
CONSTANT 37=540343553300437 5
CONSTANT 38=330143750203534 5
CONSTANT 39=02543054540303 55
CONSTANT 40=3202403308A2014 4
CONSTANT 41=A4330 7A24AA20A04
CONSTANT 42=01A0903602610105
CONSTANT 43=22320200903308A2
CONSTANT 44=A0330 7A24AA20A04
CONSTANT 45=37A2030090010504
CONSTANT 46=433217A206401AA2
CONSTANT 47=32A5330AA2539203
CONSTANT 48=535352345430 7A2
CONSTANT 49=A5392254505517A2
CONSTANT 50=2254017A25518A253
CONSTANT 51=390AA253922454 30
CONSTANT 52=A25332540 7A2326 5
CONSTANT 53=53925017A2A53A1A
CONSTANT 54=0006A5590AA2535 3
CONSTANT 55=016559221AA253A 5
CONSTANT 56=A5545A0AA254A00 0
CONSTANT 57=5459221AA2A5069 3
CONSTANT 58=A2535390254060355
CONSTANT 59=A559221AA2A5590A
CONSTANT 60=54000001A554A69 3
CONSTANT 61=18A2A55953530AA2
CONSTANT 62=034554063A55922 2
CONSTANT 63=00000009254A0100
```

TABLE VIa

| LOCATONS | ROUTINE |
|---|---|
| 16-0-21-6 | m,b |
| 21-7-23-1 | $X^1$ |
| 23-2-24-2 | $Y^1$ |
| 24-3-26-3 | mean |
| 26-4-29-2 | variance |
| 29-3-34-4 | standard deviation |
| 34-5-39-7 | correlation coefficient(R) |
| 40-0-42-3 | $\Sigma+$ |
| 42-4-47-1 | $\Sigma-$ |
| 47-2-51-2 | $R \rightarrow P$ |
| 51-3-53-6 | $P \rightarrow R$ |
| 53-7-58-4 | D.MS (degrees, decimal point, minutes and seconds) |
| 58-5-63-3 | D.d (degrees, decimal point, fractional degree) |

TABLE VII

| ALPHANUMERIC CHARACTER | ALPHANUMERIC CODE |
|---|---|
| A | 13 |
| B | 14 |
| C | 15 |
| D | 16 |
| E | 17 |
| F | 21 |
| G | 22 |
| H | 23 |
| I | 24 |
| J | 25 |
| K | 26 |
| L | 27 |
| M | 30 |
| N | 31 |
| O | 32 |
| P | 33 |
| Q | 34 |
| R | 35 |
| S | 36 |
| T | 37 |
| U | 41 |
| V | 42 |
| W | 43 |
| X | 44 |
| Y | 45 |
| Z | 46 |
| 0 | 01 |
| 1 | 02 |
| 2 | 03 |
| 3 | 04 |
| 4 | 05 |
| 5 | 06 |
| 6 | 07 |
| 7 | 10 |
| 8 | 11 |
| 9 | 12 |
| blank | 00 |
| − | 20 |
| . | 40 |
| + | 47 |
| x | 50 |
| * | 51 |
| √ | 52 |
| π | 53 |
| e | 54 |
| ( | 55 |
| ) | 56 |
| , | 57 |
| ↑ | 60 |
| % | 61 |
| > | 62 |
| < | 63 |
| / | 64 |
| = | 65 |
| , | 66 |
| x² | 67 |
| ? | 70 |
| ÷ | 71 |
| ! | 72 |
| ][ | 73 |
| Δ | 74 |
| II | 75 |
| Σ | 76 |
| | 77 |

TABLE VIII

| BCD ADDRESS | CHIP | PROGRAM CODES→ |
|---|---|---|
| 0 | TMC541 | 25 00 00 54 02 43 11 41 14 15 15 82 17 01 19 51 20 |
| 17 | TMC541 | 29 21 73 22 91 24 14 26 09 27 64 29 52 30 95 32 31 |
| 34 | TMC541 | 33 63 30 80 36 51 42 00 44 31 05 26 46 20 06 72 47 |
| 51 | TMC541 | 68 48 92 76 24 00 42 09 60 58 09 76 25 29 06 42 01 |
| 68 | TMC541 | 00 72 01 97 01 00 15 92 76 95 71 24 05 32 03 00 37 |
| 85 | TMC541 | 78 22 37 78 69 12 88 78 69 11 22 88 22 78 69 14 53 |
| 102 | TMC541 | 24 75 36 15 71 88 54 52 22 52 32 03 07 07 93 02 05 |
| 119 | TMC541 | 08 00 09 05 04 67 96 00 35 76 96 69 00 01 03 03 06 |
| 136 | TMC541 | 03 07 01 07 03 05 69 04 03 00 69 03 69 05 01 99 92 |
| 153 | TMC541 | 76 11 98 99 62 00 11 99 92 76 12 98 99 62 00 12 99 |
| 170 | TMC541 | 92 76 13 98 99 62 00 13 99 92 76 14 98 99 62 00 14 |
| 187 | TMC541 | 99 92 76 15 98 99 62 00 15 99 92 76 16 98 99 62 00 |
| 204 | TMC541 | 16 99 92 76 17 98 99 62 00 17 99 92 76 18 98 99 62 |
| 221 | TMC541 | 00 18 99 92 76 19 98 99 62 00 19 99 92 76 10 98 99 |
| 238 | TMC541 | 62 00 10 99 92 76 19 85 53 24 75 01 54 85 43 07 85 |
| 255 | TMC541 | 07 05 92 76 18 61 08 11 01 22 44 01 43 07 22 44 02 |
| 272 | TMC541 | 92 22 97 05 00 51 75 01 44 01 43 07 44 02 73 01 65 |
| 289 | TMC541 | 73 02 61 00 30 92 22 97 05 00 69 75 71 00 20 73 01 |
| 306 | TMC541 | 65 73 02 61 00 52 92 76 11 42 07 99 08 92 76 12 75 |
| 323 | TMC541 | 32 01 95 65 43 07 85 08 95 42 01 32 92 99 72 01 92 |
| 340 | TMC541 | 32 01 44 01 32 61 00 93 76 13 43 07 42 05 85 33 85 |
| 357 | TMC541 | 07 05 42 01 43 05 72 01 01 22 44 01 97 05 01 18 01 |
| 374 | TMC541 | 42 04 42 06 43 04 85 07 95 42 03 75 43 07 75 08 95 |
| 391 | TMC541 | 42 05 43 04 19 42 02 73 02 50 32 22 97 05 01 88 01 |
| 408 | TMC541 | 44 02 73 02 50 22 77 01 59 32 43 07 85 43 05 85 08 |
| 425 | TMC541 | 95 42 03 61 01 59 43 03 32 43 04 95 07 95 67 02 28 |
| 442 | TMC541 | 85 02 02 01 94 49 06 43 07 85 01 95 42 05 73 02 63 03 |
| 459 | TMC541 | 72 02 43 07 44 02 44 03 97 05 02 12 43 04 19 02 01 |
| 476 | TMC541 | 73 01 49 06 29 67 03 31 43 07 42 05 43 04 19 42 02 |
| 493 | TMC541 | 85 03 05 75 43 04 95 42 03 73 03 55 73 02 95 42 01 |
| 510 | TMC541 | 72 03 43 07 44 02 44 03 33 85 08 95 32 43 03 77 02 |
| 527 | TMC541 | 97 43 01 94 65 73 02 95 74 03 61 02 69 01 22 44 05 |
| 544 | TMC541 | 43 05 32 43 04 67 03 12 61 02 45 01 44 04 43 07 32 |

TABLE VIII

```
BCD     CHIP    PROGRAM CODES+
ADDRESS

561   TMC541  43 04 67 03 26 61 01 35 19 42 01 73 01 49 06 43 06
578   TMC541  9A 9D 9A 92 6A 6A 6A 6A 6A 6A 6A 6A 6A 6A 76 14
595   TMC541  42 05 92 42 03 43 07 33 85 07 95 42 01 43 05 32 43
612   TMC541  07 22 77 03 54 01 44 01 73 01 22 67 03 74 43 07 44
629   TMC541  01 01 44 05 43 03 72 01 99 92 61 03 55 76 15 01 42
646   TMC541  00 43 07 85 33 85 07 95 42 01 43 04 42 05 75 43 07
663   TMC541  85 07 95 42 02 00 71 00 30 85 01 44 01 73 01 95 72
680   TMC541  01 01 44 04 43 04 32 43 07 77 04 04 01 42 04 07 85
697   TMC541  53 43 07 85 01 54 33 95 42 01 75 43 07 75 43 04 42
714   TMC541  05 95 42 02 00 71 00 52 85 71 00 20 73 01 95 55 73
731   TMC541  02 95 72 01 01 44 04 43 04 32 43 07 77 04 52 9A 01
748   TMC541  92 76 16 85 32 07 85 03 07 65 53 24 85 01 54 95 42
765   TMC541  01 32 92 73 01 99 92 01 44 01 61 05 25 76 17 01 42
782   TMC541  04 43 04 19 95 42 01 73 01 35 72 01 01 44 04 43 04
799   TMC541  32 43 07 77 05 40 01 94 44 04 01 42 03 43 04 19 42
816   TMC541  01 75 43 03 42 05 95 42 02 73 01 65 73 02 94 71 00
833   TMC541  52 95 65 71 00 20 73 02 95 72 01 01 44 03 43 04 32
850   TMC541  43 03 22 67 05 69 01 42 03 22 44 04 43 04 32 01 22
867   TMC541  67 05 69 03 04 19 42 01 85 43 03 42 05 95 42 02 73
884   TMC541  02 94 71 00 30 65 01 44 01 95 72 01 01 44 03 43 03
901   TMC541  32 43 07 75 43 04 95 77 06 27 01 44 04 42 03 43 07
918   TMC541  32 43 04 22 67 06 27 01 42 04 43 04 42 05 19 42 03
935   TMC541  43 05 19 42 01 43 03 42 02 43 07 75 43 05 85 01 95
952   TMC541  4A 05 32 73 03 94 71 00 30 95 94 72 03 43 07 44 03
969   TMC541  32 85 01 95 42 05 32 77 06 92 32 43 04 67 0A 0A 85
986   TMC541  01 95 42 05 43 04 19 85 01 95 42 03 43 05 19 42 02
1003  TMC541  43 03 42 01 43 07 75 43 05 85 01 95 4A 05 32 73 01
1020  TMC541  65 73 02 94 71 00 30 95 94 72 03 01 44 03 85 32 95
1037  TMC541  42 05 32 43 07 77 07 55 01 44 04 61 06 85 9A 01 92
1054  TMC541  42 03 32 43 07 22 77 08 10 85 42 05 33 85 07 95 42
1071  TMC541  01 00 42 04 73 01 67 08 45 01 22 44 01 97 05 0A 32
1088  TMC541  43 05 75 01 95 65 43 07 85 07 95 42 01 32 92 01 44
1105  TMC541  01 44 04 73 01 99 92 03 04 32 43 07 22 67 0A 60 01
1122  TMC541  85 43 03 95 1A 61 0A 60 76 10 13 29 67 0A 95 17 43
1139  TMC541  06 92 76 11 4A 04 4A 03 43 04 9A 99 92 76 12 75 32
1156  TMC541  01 95 65 43 03 85 0A 95 42 07 32 9A 92 76 50 72 07
1173  TMC541  32 01 44 07 32 09 92 61 50 76 13 85 32 43 04 75 01
1190  TMC541  95 65 43 03 85 0A 95 42 07 32 9A 92 61 50 76 14 48
1207  TMC541  04 4A 05 43 06 9A 99 92 76 15 07 42 01 85 53 43 03
1224  TMC541  65 43 04 54 42 07 95 42 02 76 33 01 44 01 44 02 43
1241  TMC541  05 65 73 01 85 43 06 65 73 02 95 72 01 07 07 33 01
1258  TMC541  92 76 16 12 92 76 45 73 07 99 92 01 44 07 61 45 76
1275  TMC541  17 85 32 43 03 65 53 43 04 85 01 54 85 0A 95 42 07
1292  TMC541  32 9A 92 76 60 72 07 32 01 44 07 32 99 92 61 60 76
1309  TMC541  1A 43 03 75 32 0A 95 94 42 01 76 52 43 03 65 53 43
1326  TMC541  04 42 07 85 01 54 85 0A 95 42 02 00 76 59 85 43 03
1343  TMC541  44 01 01 44 02 73 01 65 73 02 97 07 59 95 4A 03 44
1360  TMC541  01 4A 03 72 01 32 75 01 95 42 01 29 67 25 90 85 0A
1377  TMC541  95 4A 01 32 61 52 76 25 01 92 76 19 85 32 07 85 43
1394  TMC541  03 65 43 04 95 02 07 32 9A 92 76 57 73 07 99 92 01
1411  TMC541  44 07 61 57 76 10 43 01 4A 03 42 01 43 02 4A 04 42
1428  TMC541  02 00 92 76 11 29 70 4A 02 4A 01 43 02 24 92 76 16
1445  TMC541  4A 04 4A 03 43 04 24 92 76 12 43 04 44 02 43 02 32
1462  TMC541  43 03 44 01 43 01 92 76 17 01 94 49 03 49 04 12 92
1479  TMC541  76 13 53 43 01 65 43 03 75 43 02 65 43 04 54 32 53
1496  TMC541  43 01 65 43 04 85 43 02 65 03 54 42 02 32 42 01
1513  TMC541  92 76 1A 01 94 49 04 53 43 03 33 85 43 04 33 54 35
1530  TMC541  49 01 49 02 13 92 76 14 10 36 05 12 29 67 10 36 05
1547  TMC541  16 13 36 05 17 92 76 19 36 05 16 10 36 05 1A 10 1A
1564  TMC541  92 76 15 10 36 05 12 29 67 10 36 05 16 1A 36 05 17
1581  TMC541  92 76 10 53 53 43 02 22 23 85 35 54 55 02 50 70 92
1598  TMC541  74 11 36 04 11 92 76 12 70 43 01 32 43 02 22 37 32
1615  TMC541  92 76 1A 12 23 42 01 32 42 02 32 92 76 17 70 43 01
1632  TMC541  22 23 32 43 02 37 42 02 32 42 01 92 76 13 12 33 53
1649  TMC541  32 65 76 52 02 54 37 42 02 32 42 01 92 76 14 12 34
1666  TMC541  53 32 55 61 52 76 15 01 42 03 42 04 36 04 10 36
1683  TMC541  04 1A 92 76 1A 53 53 43 02 22 23 75 35 54 55 02 54
1700  TMC541  92 76 16 70 53 53 43 01 85 01 54 33 85 43 02 33 54
1717  TMC541  34 92 76 10 53 53 43 01 75 43 02 33 85 43 02 33 54
1734  TMC541  34 92 76 15 53 53 16 85 10 54 55 02 85 53 52 22 52
1751  TMC541  33 75 01 54 34 54 23 92 76 11 36 04 11 92 76 12 70
1768  TMC541  53 43 01 38 65 36 05 10 54 32 53 43 01 39 65 36 05
1785  TMC541  1A 54 42 02 32 42 01 92 76 13 70 53 43 01 39 65 36
1802  TMC541  05 10 54 32 53 43 01 38 94 65 36 05 1A 54 42 02 32
1819  TMC541  42 01 02 76 14 43 01 42 03 42 04 00 13 36 04 10
1836  TMC541  12 36 04 1A 92 76 17 53 53 16 75 10 54 55 02 54 22
1853  TMC541  38 32 15 42 02 32 42 01 92 76 1A 53 53 16 75 10 54
1870  TMC541  55 02 54 22 39 32 15 94 42 02 32 42 01 92 76 19 53
1887  TMC541  53 01 75 43 01 33 75 43 02 33 54 32 53 02 65 43 01
1904  TMC541  54 22 37 55 02 54 32 53 53 53 43 01 33 85 53 43 02
1921  TMC541  85 01 54 33 54 55 53 43 01 33 85 53 43 02 75 01 54
1938  TMC541  33 54 54 23 55 04 54 42 02 32 42 01 92 76 11 42 04
1955  TMC541  99 92 76 12 53 24 85 32 05 54 42 01 32 9A 92 76 50
1972  TMC541  72 01 32 01 44 01 32 99 92 61 50 76 13 9A 99 42 03
1989  TMC541  53 43 04 42 02 85 05 54 42 01 01 44 02 73 01 76 60
2006  TMC541  22 97 02 70 22 97 01 70 53 24 65 43 03 85 73 01 54
2023  TMC541  61 60 76 70 99 92 76 11 42 01 92 76 12 53 42 02 75
2040  TMC541  32 43 01 54 42 03 93 00 01 42 0A 32 92 76 13 42 03
```

TABLE VII

```
BCD      CHIP    PROGRAM CODES→
ADDRESS
2057  TMC541  92 76 14 42 08 92 76 15 53 24 43 02 32 43 01 77 50
2074  TMC541  42 04 85 43 03 54 42 01 42 05 36 00 16 42 07 53 43
2091  TMC541  04 42 06 36 00 16 29 67 70 65 48 07 54 77 15 76 80
2108  TMC541  53 53 43 04 85 43 05 54 55 02 54 42 04 43 04 32 53
2125  TMC541  43 05 75 43 04 54 22 77 70 53 43 04 36 00 16 65 43
2142  TMC541  07 54 29 67 70 77 45 43 06 42 05 61 80 76 45 03 04
2159  TMC541  42 04 61 80 76 70 43 06 92 76 50 00 35 92 76 15 53
2176  TMC541  43 01 85 43 05 65 43 03 54 92 76 11 42 01 92 76 12
2193  TMC541  42 02 92 76 13 53 50 42 05 55 02 54 22 59 29 22 67
2210  TMC541  52 53 43 05 34 65 53 43 02 75 43 01 54 54 42 03 92
2227  TMC541  76 52 00 35 92 76 14 15 36 00 16 42 04 74 50 01 22
2244  TMC541  44 05 53 15 36 00 16 65 04 54 44 04 22 97 05 45 53
2261  TMC541  15 36 00 16 65 02 54 44 04 61 50 76 45 15 36 00 16
2278  TMC541  44 04 53 43 03 55 03 54 49 04 43 04 92 76 11 53 50
2295  TMC541  42 05 55 02 54 42 02 22 59 29 22 67 52 43 05 99 92
2312  TMC541  76 52 00 35 92 76 12 42 03 99 92 76 13 53 24 85 32
2329  TMC541  06 54 42 01 32 98 92 76 50 72 01 32 01 44 01 32 99
2346  TMC541  92 61 50 76 14 53 43 05 85 06 54 42 01 73 01 42 04
2363  TMC541  76 45 01 22 44 01 53 73 01 65 04 54 44 04 01 22 44
2380  TMC541  01 22 97 02 33 53 73 01 65 02 54 44 04 61 45 76 33
2397  TMC541  73 01 44 04 53 43 03 55 03 54 49 04 43 04 98 99 02
2414  TMC541  76 16 53 53 43 06 33 85 43 01 33 75 43 02 33 54 55
2431  TMC541  02 55 43 06 55 43 01 54 22 39 87 00 97 42 05 86 00
2448  TMC541  76 57 43 06 48 01 48 02 42 42 06 61 16 76 97 87 01 68
2465  TMC541  42 04 86 01 61 57 76 68 42 03 87 02 90 76 10 22 86
2482  TMC541  00 22 86 01 22 86 02 22 86 03 92 76 14 53 53 43 02
2499  TMC541  38 65 43 01 55 43 06 54 22 52 52 22 52 22 38 52 22
2516  TMC541  52 42 04 94 85 01 94 22 39 75 43 02 54 42 02 42 05
2533  TMC541  86 03 76 15 53 43 06 33 85 43 01 33 75 02 65 43 06
2550  TMC541  65 43 01 65 43 02 39 54 34 87 03 88 42 02 86 00 86
2567  TMC541  02 61 57 76 90 42 05 43 01 61 10 76 88 42 02 61 10
2584  TMC541  76 17 43 04 92 76 18 43 05 92 76 11 42 06 92 76 12
2601  TMC541  42 01 92 76 13 42 02 92 76 11 42 07 92 76 12 42 04
2618  TMC541  92 76 13 42 05 92 76 16 53 01 94 22 39 75 43 04 75
2635  TMC541  43 05 54 42 03 61 68 76 17 53 01 94 22 39 75 43 04
2652  TMC541  42 03 75 43 05 54 42 04 86 00 76 68 53 43 07 65 43
2669  TMC541  04 38 55 43 03 38 54 42 01 53 43 07 65 43 05 38 55
2686  TMC541  43 03 38 54 42 02 87 00 69 43 03 92 76 69 43 04 22
2703  TMC541  86 00 92 76 14 43 01 92 76 15 43 02 92 76 18 53 53
2720  TMC541  43 07 85 43 01 85 43 02 54 55 02 54 42 06 53 43 06
2737  TMC541  65 53 43 06 75 43 07 54 65 53 43 06 75 43 01 54 65
2754  TMC541  53 43 06 75 43 02 54 54 34 92 76 11 22 86 00 22 86
2771  TMC541  01 29 42 01 38 77 48 23 76 48 43 01 92 76 12 22 86
2788  TMC541  00 22 86 01 29 42 02 77 88 23 43 02 76 88 92 76 13
2805  TMC541  42 03 92 76 14 42 04 86 00 86 01 92 76 16 87 00 57
2822  TMC541  53 43 03 55 43 02 54 42 01 92 76 57 70 53 53 43 04
2839  TMC541  55 02 55 43 02 54 22 38 65 02 54 42 01 92 76 17 87
2856  TMC541  01 68 53 43 03 55 43 01 54 42 02 92 76 68 53 43 69
2873  TMC541  35 65 43 04 54 42 02 92 76 69 70 53 53 43 01 55 02
2890  TMC541  54 38 65 02 54 92 76 18 53 43 01 65 43 02 54 92 76
2907  TMC541  19 71 69 65 43 02 54 92 76 15 53 43 02 33 85 43 01
2924  TMC541  55 02 54 92 76 10 70 53 43 01 65 43 02 33 55 02 75
2941  TMC541  43 02 33 55 02 65 43 01 38 54 92 76 11 22 86 01 29
2958  TMC541  77 87 94 86 01 76 87 53 42 03 33 22 23 65 02 65 89
2975  TMC541  54 34 35 42 01 92 76 12 93 02 03 01 06 04 01 09 49
2992  TMC541  03 01 44 03 43 03 35 53 53 42 02 45 04 65 01 93 03
3009  TMC541  03 00 02 07 04 04 02 09 75 43 02 45 03 65 01 93 04
3026  TMC541  02 01 02 05 05 09 07 08 85 43 02 45 02 65 01 93 07
3043  TMC541  08 01 04 07 07 09 03 07 75 43 02 65 93 03 05 06 05
3060  TMC541  06 03 07 08 02 85 93 03 01 04 03 08 01 05 03 54 65
3077  TMC541  43 02 65 43 01 54 87 01 69 92 76 69 53 04 85 01 54
3094  TMC541  92 76 88 53 53 02 04 02 09 08 65 43 09 85 09 09 09
3111  TMC541  09 01 54 55 01 09 09 00 01 07 42 07 54 53 53 53 22
3128  TMC541  59 65 43 07 54 42 09 55 43 07 65 05 22 28 54 49 55
3145  TMC541  05 22 28 54 92 76 13 71 88 53 24 65 53 43 11 75 43
3162  TMC541  10 54 76 37 85 43 10 54 42 07 78 43 07 92 76 18 70
3179  TMC541  71 88 42 08 71 88 53 53 24 65 02 65 89 54 39 65 53
3196  TMC541  43 08 23 65 02 94 54 34 65 43 11 61 37 76 10 36 01
3213  TMC541  71 25 92 76 15 42 09 92 76 11 42 10 92 76 12 42 11
3230  TMC541  92 76 13 29 67 79 74 89 43 01 49 04 97 01 89 76 38
3247  TMC541  43 04 87 01 39 92 76 14 29 67 79 19 97 02 14 61 38
3264  TMC541  76 15 29 67 79 19 43 02 22 49 04 97 02 15 61 38 76
3281  TMC541  79 01 42 04 61 38 76 11 32 22 86 01 01 42 04 42 03
3298  TMC541  32 76 17 29 77 87 86 01 50 76 87 72 03 32 71 03 59
3315  TMC541  67 88 86 01 76 88 72 03 92 76 39 00 35 43 04 02 76
3332  TMC541  19 43 01 49 04 01 22 44 01 92 76 12 32 02 42 03 32
3349  TMC541  17 32 43 01 77 30 00 35 92 76 30 43 02 92 76 87 43
3366  TMC541  05 72 01 44 04 01 44 01 53 43 04 55 32 54 92 76 12
3383  TMC541  42 05 87 01 89 01 44 03 43 03 32 43 02 77 87 04 42
3400  TMC541  01 86 01 76 89 73 01 22 44 04 43 05 44 04 72 01 01
3417  TMC541  44 01 43 01 32 53 43 02 85 05 54 77 77 06 42 01 76
3434  TMC541  77 53 43 04 55 43 02 54 92 76 79 00 35 92 76 10 22
3451  TMC541  86 01 06 42 01 00 42 03 42 04 92 76 11 29 67 79 22
3468  TMC541  77 79 42 02 32 43 02 59 22 67 79 92 76 16 53 53 43
3485  TMC541  09 45 43 01 75 42 12 01 54 55 43 08 54 92 76 17 53
3502  TMC541  16 65 43 09 54 92 76 18 53 16 55 43 12 54 92 76 19
3519  TMC541  18 53 24 65 43 09 54 92 76 10 29 58 02 92 76 71 53
3536  TMC541  43 04 55 43 03 54 92 76 25 53 71 21 55 13 09 23
3553  TMC541  54 42 01 92 76 11 67 25 42 01 92 76 22 53 01 00 00
3570  TMC541  75 24 65 71 71 22 45 43 01 54 94 67 15 76 12 67 22
```

TABLE VIII

```
BCD      CHIP    PROGRAM CODES→
ADDRESS
 3587 TMC541  76 15 42 02 53 24 55 01 00 00 85 42 08 01 54 42 09
 3604 TMC541  43 02 92 76 23 53 43 04 55 43 09 45 43 01 54 42 03
 3621 TMC541  92 76 13 67 23 42 03 92 76 24 53 43 03 65 43 09 45
 3638 TMC541  43 01 54 42 04 92 76 14 67 24 42 04 92 76 11 61 03
 3655 TMC541  78 76 12 61 02 92 76 13 61 04 43 76 18 61 05 01 76
 3672 TMC541  15 61 05 39 01 42 09 07 94 22 28 32 53 43 04 55 43
 3689 TMC541  03 54 42 10 87 03 01 36 87 04 01 36 53 24 55 43 01
 3706 TMC541  33 75 43 10 35 54 42 08 44 09 36 18 16 42 14 87 01
 3723 TMC541  00 80 53 24 65 43 09 54 53 24 75 43 10 54 42 13 53
 3740 TMC541  43 18 55 43 08 75 43 01 65 43 12 55 43 09 55 43 08
 3757 TMC541  54 87 01 01 20 53 24 65 43 09 75 43 10 54 22 49 13
 3774 TMC541  43 13 44 08 44 09 50 77 00 65 61 02 80 53 43 05 55
 3791 TMC541  43 03 85 02 14 43 01 49 14 75 43 10 54 42 08 53 43
 3808 TMC541  01 85 33 55 02 85 43 14 55 43 01 54 87 03 01 84 53
 3825 TMC541  43 11 85 33 55 02 85 43 14 54 22 49 08 43 08 44 09
 3842 TMC541  36 18 18 02 04 87 03 02 06 53 24 65 43 09 54 53 24
 3859 TMC541  85 43 10 55 43 01 55 43 12 75 43 10 54 42 13 53 43
 3876 TMC541  06 55 43 08 75 43 01 55 43 12 55 43 09 55 43 08 54
 3893 TMC541  87 03 02 55 53 24 65 43 09 85 43 06 54 53 24 85 43
 3910 TMC541  14 55 43 12 55 43 09 54 22 49 13 43 13 44 08 44 09
 3927 TMC541  50 77 01 01 53 43 08 65 01 00 00 54 29 67 02 05 67
 3944 TMC541  00 25 58 04 36 18 15 92 68 43 03 02 11 02 10 43 09
 3961 TMC541  87 02 03 19 87 04 03 19 01 49 11 49 10 53 43 04 65
 3978 TMC541  43 08 54 87 01 03 54 87 02 03 54 94 44 10 53 43 05
 3995 TMC541  65 43 08 54 94 44 11 61 03 56 44 11 43 11 23 42 11
 4012 TMC541  43 10 23 94 44 11 43 09 23 35 49 11 43 11 67 03 81
 4029 TMC541  67 03 01 42 01 94 42 11 94 58 09 68 92 68 87 01 04
 4046 TMC541  22 87 02 04 16 87 03 04 10 36 18 19 61 04 25 36 18
 4063 TMC541  18 61 04 25 36 18 17 61 04 25 36 18 16 53 24 55 53
 4080 TMC541  43 04 75 43 05 55 43 12 54 54 35 67 04 46 67 03 91
 4097 TMC541  42 03 58 02 68 92 68 87 01 04 83 87 02 04 77 87 03
 4114 TMC541  04 71 36 18 19 61 04 86 36 18 18 61 04 86 36 18 17
 4131 TMC541  61 04 86 36 18 16 53 24 65 43 03 85 43 05 55 43 12
 4148 TMC541  54 67 05 04 67 04 52 42 04 58 02 68 92 68 36 18 19
 4165 TMC541 ·87 04 05 21 36 18 18 53 53 24 65 43 03 75 43 04 54
 4182 TMC541  94 65 43 12 54 67 05 42 67 05 10 42 05 58 02 68 92
 4199 TMC541  76 16 86 01 92 76 17 86 02 92 76 18 86 03 92 76 19
 4216 TMC541  86 04 92 76 10 22 86 01 22 86 02 22 86 03 22 86 04
 4233 TMC541  00 42 05 58 09 29 92 76 78 53 93 04 65 43 01 85 02
 4250 TMC541  93 03 54 59 94 85 61 77 76 79 00 35 92 76 10 53 42
 4267 TMC541  01 20 22 77 79 22 50 22 44 01 65 04 22 28 58 42 03
 4284 TMC541  32 01 05 08 01 77 79 03 02 32 53 53 43 01 55 01 00
 4301 TMC541  00 54 42 01 22 59 22 44 01 65 01 00 00 54 42 02 77
 4318 TMC541  79 01 03 32 43 01 77 79 53 03 06 05 65 43 03 85 43
 4335 TMC541  02 85 03 01 65 43 01 75 03 01 85 03 32 43 01 77 78
 4352 TMC541  01 22 44 03 76 77 53 43 03 55 04 54 59 75 53 93 07
 4369 TMC541  05 85 53 43 03 55 01 00 00 54 59 65 93 07 05 54 59
 4386 TMC541  54 92 76 11 10 42 04 00 92 76 12 10 42 05 00 92 76
 4403 TMC541  13 53 43 05 75 43 04 54 02 76 14 53 53 10 42 01 90
 4420 TMC541  55 07 54 59 65 07 85 43 01 54 92 76 13 32 01 04 04
 4437 TMC541  53 12 75 43 03 54 42 05 53 35 50 45 43 05 54 02 76
 4454 TMC541  18 94 76 17 32 01 22 44 02 53 02 45 43 02 85 32 54
 4471 TMC541  50 92 76 12 53 36 15 71 88 65 01 00 02 03 85 01 54
 4488 TMC541  59 42 03 00 42 04 92 76 14 24 43 04 92 76 16 09 02
 4505 TMC541  02 05 01 02 98 92 76 19 53 01 00 75 43 02 54 92 76
 4522 TMC541  11 42 09 92 76 10 87 00 05 61 44 76 45 04 76 44
 4539 TMC541  42 10 73 10 92 76 13 94 76 12 53 24 85 10 54 72 10
 4556 TMC541  92 76 11 10 92 76 16 22 76 17 86 00 58 02 92 76 18
 4573 TMC541  42 07 92 76 19 53 35 65 43 07 54 29 36 18 17 92 76
 4590 TMC541  14 29 36 18 11 43 06 42 03 29 36 18 71 24 42 06 92
 4607 TMC541  76 15 87 00 34 42 05 92 76 34 42 06 92 76 12 53 88
 4624 TMC541  85 76 15 43 01 54 53 24 85 53 24 55 50 54 24 45 05
 4641 TMC541  94 22 28 54 22 88 58 04 92 76 13 53 24 65 61 15 76
 4658 TMC541  14 53 35 65 61 15 76 11 58 09 88 42 01 92 76 11 53
 4675 TMC541  24 65 02 03 05 04 54 92 76 12 53 24 65 93 03 00 04
 4692 TMC541  08 54 92 76 13 53 24 65 93 09 01 00 00 54 92 76 14
 4709 TMC541  53 24 65 01 93 06 00 09 03 04 04 54 92 76 15 53 24
 4726 TMC541  65 93 08 04 08 09 07 06 02 04 54 92 76 18 35 11 35
 4743 TMC541  92 76 17 35 12 35 92 76 18 35 13 35 92 76 19 35 14
 4760 TMC541  35 92 76 10 35 15 35 92 76 11 53 53 24 75 03 02 54
 4777 TMC541  65 05 55 09 54 92 76 12 53 24 65 93 00 02 09 05 07
 4794 TMC541  03 05 02 09 06 54 92 76 13 53 24 65 03 93 07 08 05
 4811 TMC541  04 01 01 07 08 04 54 92 76 14 53 24 65 02 08 93 03
 4828 TMC541  04 09 05 02 03 01 03 54 92 76 15 53 24 65 93 04 05
 4845 TMC541  03 05 09 02 03 07 54 92 76 16 53 24 65 01 93 08 85
 4862 TMC541  03 02 54 92 76 17 35 12 35 92 76 18 35 13 35 92 76
 4879 TMC541  19 35 14 35 92 76 10 35 15 35 92 61 11 92 92 92 92
 4896 TMC541  92 92 92 92 92 92 92 92 92 92 92 92 92 92 92 92 92
 4913 TMC541  92 92 92 92 92 92 92 92 92 92 92 92 92 92 92 92 92
 4930 TMC541  92 92 92 92 92 92 92 92 92 92 92 92 92 92 92 92 92
 4947 TMC541  92 92 92 92 92 92 92 92 92 92 92 92 92 92 92 92 92
 4964 TMC541  92 92 92 92 92 92 92 92 92 92 92 92 92 92 92 92 92
 4981 TMC541  92 92 92 92 92 92 92 92 92 92 92 92 92 92 92 92 92
 4998 TMC541  92 92
```

What is claimed is:

1. In an electronic microprocessor system, having a keyboard, output means for outputting data, a data memory for storing data, an arithmetic unit for performing arithmetic operations on the data stored in said data memory, and a first nonvolatile memory for storing groups of instructiion words for controlling the arithmetic operations performed by said arithmetic unit, the combination which comprises:
   (a) a second non-volatile memory for storing a plurality of sets of program codes, each program code being effective for addressing a preselected group of instruction words stored in first non-volatile memory, said second non-volatile memory being disposed in a module having a plurality of electrical contacts;
   (b) a receptacle for temporarily interconnecting the contacts on said module with said microprocessor system;
   (c) keyboard logic means for decoding inputs received at said keyboard;
   (d) means for addressing said second non-volatile memory to read out preselected sets of program codes, said means for addressing said second memory including a counter responsive to selected instructions outputted from said first memory;
   (e) means for addressing said first non-volatile memory in response to the program codes read out of said second non-volatile memory, said means for addressing said first memory including a first program counter selectively responsive to said keyboard logic means and said program codes outputted from said second memory.

2. The electronic microprocessor system according to claim 1, wherein said first and second non-volatile memory are first and second read-only-memories, respectively.

3. The electronic microprocessor system according to claim 1, further including means for loading said counter in said means for addressing said second read-only-memory with a multibit number stored in said data memory.

4. The electronic microprocessor system according to claim 3, wherein said data memory comprises a plurality of registers and a multibit register coupled to the output of said arithmetic unit.

5. The electronic microprocessor system according to claim 4, wherein said keyboard logic means includes a keyboard register, the contents of which are loaded into said first program counter in response to a particular instruction word outputted from said first read-only-memory and loaded into said counter addressing second read-only-memory in response to another instruction word outputted from said first read-only-memory.

6. The microprocessor system according to claim 5, further including means for loading said keyboard register means with the contents of said multibit register connected to the output of said arithmetic unit in response to a given instruction word outputted from said first read-only-memory, whereby said arithmetic unit, multibit register connected to the output thereof, keyboard register means, and means for loading said keyboard register means provides said means for loading said counter addressing said second read-only-memory with a multibit number stored in said data money.

7. The electronic microprocessor system according to claim 6, further including random access memory means for storing a user defined program comprising of a selected sequence of key pushes at said keyboard, said selected sequence of key pushes being stored as a sequence of program codes therein and means for loading said program codes stored in said random access memory means into said first program counter.

8. The electronic microprocessor system according to claim 7, wherein said electronic microprocessor system is provided in a programmable calculator.

9. The electronic microprocessor system according to claim 1, further including random access memory means for storing a user defined program comprising of a selected sequence of key pushes at said keyboard, said selected sequence of key pushes being stored as a sequence of program codes therein and means for loading said program codes stored in said random access memory means into said first program counter.

10. The electronic microprocessor system according to claim 9, further including means for loading said counter in said means for addressing said second read-only-memory with a multibit number stored in said data memory.

11. The electronic microprocessor system according to claim 10, wherein said keyboard logic means includes keyboard register means for loading said first program counter in response to a particular instruction word outputted from said first read-only-memory and for loading said counter addressing second read-only-memory in response to another instruction word outputted from said first read-only-memory.

12. The electronic microprocessor system according to claim 10, wherein said keyboard logic means includes keyboard registers, the contents of which are loaded into said first program counter in response to a particular instruction word outputted from said first read-only-memory and loaded into said counter addressing second read-only-memory in response to another instruction word outputted from said first read-only-memory.

13. The electronic microprocessor system according to claim 1, wherein said keyboard logic means includes keyboard register, the contents of which are loaded into said first program counter in response to a particular instruction word outputted from said first read-only-memory and loaded into said counter addressing second read-only-memory in response to another instruction word outputted from said first read-only-memory.

14. The electronic microprocessor system according to claim 13, further including random access memory means for storing a user defined program comprising of a selected sequence of key pushes at said keyboard, said selected sequence of key pushes being stored as a sequence of program codes therein and means for loading said program codes stored in said random access memory means into said first program counter.

15. The electronic microprocessor system according to claim 1, wherein a plurality of said second non-volatile memories are provided in a plurality of modules, each one of said plurality of second-non-volatile memories storing different sequences of program codes, at least one of said modules including the second non-volatile memory disposed therein, being receivable in said receptacle at any given time.

16. The electronic microprocessor system according to claim 15, wherein said electronic mircoprocessor system is provided in a programmable calculator.

17. The programmable calculator according to claim 16, wherein said calculator includes a case in which said data memory, arithmetic unit receptacle and first non-volatile memory are disposed, said case having an opening adjacent to said receptacle for temporarily receiving at least a selected one of said modules.

18. The programmable calculator according to claim 17, wherein said first and second non-volatile memory are first and second read-only-memories, respectively.

19. The programmable calculator according to claim 17, further including a magnetic card reader for reading magnetic cards providing storage for programs including a plurality of program codes, a program memory for storing program codes read by said magnetic card reader, means for reading out of said program memory said program codes and means for addressing said first non-volatile memory in response to the program codes read out of said program memory.

20. The programmable calculator according to claim 19, wherein said input means includes a keyboard and wherein said calculator may be selectively placed in a learn mode or run mode at said keyboard and wherein said calculator further includes means for storing the program codes according to the keys depressed at said keyboard in said program memory when said calculator is in said learn mode.

21. An electronic microprocessor system, having input means for receiving data and for receiving input commands, said input means including a keyboard, output means for outputting data, a data memory for storing data received and data to be outputted, an arithmetic unit for performing arithmetic operations on data stored in said data memory, and a first non-volatile memory for storing groups of instruction words for controlling the arithmetic operations performed by said arithmetic unit, the combination which comprises:
  (a) a second non-volatile memory for storing a plurality of sets of program codes, each program code being effective for addressing a preselected group of instruction words stored in said first non-volatile memory;
  (b) keyboard logic means for decoding inputs received at said keyboard;
  (c) means for addressing said second non-volatile memory to read-out preselected sets of program codes in response thereto, said means for addressing said second memory including a counter responsive to selected instructions outputted from said first memory;
  (d) means for addressing said first non-volatile memory in response to the program codes read-out of said second non-volatile memory, said means for addressing said first memory including a first program counter selectively responsive to said keyboard logic and to said program codes outputted from said second memory;
  (e) magnetic card reader means for receiving program codes stored on magnetic cards;
  (f) program memory means for storing program codes received by said magnetic card reader means;
  (g) means for addressing said first non-volatile memory in response to the program codes read-out of said program memory means; and
  (h) wherein said means for addressing said first memory is further responsive to the program codes outputted from said program memory.

22. The system according to claim 21, wherein said first and second non-volatile memories are first and second read-only-memories respectively.

23. In an electronic microprocessor system of the type having a keyboard, an arithmetic unit for performing numerical operations on data, a first memory for storing a plurality of groups of instruction words, a first address register for addressing the first memory, keyboard logic means for inserting addresses into said first address register in response to key depressions at said keyboard and instruction word decoder means for controlling the arithmetic unit in response to instruction words outputted from the first memory, the combination which comprises:
  (a) a second memory for storing a plurality of sets of program codes, each program code being effective for addressing a preselected group of instruction words stored in the first memory, the second memory being disposed in a module having a plurality of electrical contacts;
  (b) a receptacle for temporarily interconnecting the contents on said module with said microprocessor system;
  (c) a second address register for addressing the second memory;
  (d) means for inserting a preselected address into said second address register in response to the depression of a "program" key at said keyboard;
  (e) means for comparing the program code stored at said preselected address with a numerical value inputted at said keyboard after the depression of said "program" key; and
  (f) means for displaying an error condition when the results of the comparison indicate that the numerical value inputted after the depression of the "program" key is greater than the numerical value of the program code stored at the preselected address.

24. The system as defined in claim 23, wherein said first and second memories are first and second read-only-memories.

25. An integrated circuit disposed in a module, the module being temporarily receivable in a receptacle of a calculator and the calculator including an instruction word memory for controlling the operations performed by the calculator, the integrated circuit comprising:
  (a) a program memory for storing a plurality of program codes, each program code having two four-bit digits and being adapted for use by said calculator to address said instruction word memory;
  (b) an address register for addressing the program memory;
  (c) an instruction decoder responsive to bit serial instructions generated by said calculator;
  (d) first means coupled to said program memory for outputting the four most significant bits of the addressed program code in serial to said calculator in response to said instruction decoder decoding a "FETCH HIGH" instruction from said calculator; and
  (e) second means coupled to said program memory for outputting the four least significant bits of the addressed program code in serial to said calculator in response to said instruction decoder decoding a "FETCH" instruction from said calculator.

26. The system according to claim 25, further including means for incrementing the address in said address register in response to a decoded "FETCH" instruction.

27. The system according to claim 26, wherein said address register stores a four digit address and further including means for outputting to said calculator in serial the contents of a sequentially different digit position of said address register each time said instruction decoder decodes an "UNLOAD PC" instruction from said calculator.

* * * * *